United States Patent [19]

Batchelor et al.

[11] 4,062,061

[45] Dec. 6, 1977

[54] ERROR LOG FOR ELECTROSTATOGRAPHIC MACHINES

[75] Inventors: Phillip J. Batchelor, Fairport; Robert L. Traister, Rochester; Gary A. Gray; Joseph A. Marino, both of Fairport, all of N.Y.

[73] Assignee: Xerox Corporation, Stamford, Conn.

[21] Appl. No.: 677,111

[22] Filed: Apr. 15, 1976

[51] Int. Cl.[2] .................... G06F 11/00; G03G 15/00

[52] U.S. Cl. .................... 364/900; 235/92 SB; 235/304; 355/14

[58] Field of Search .................... 340/172.5; 235/92 SB, 235/92 PD, 92 QD, 92 PL, 153 AC, 153 AK, 92 SD; 355/3 R, 14

[56] References Cited

U.S. PATENT DOCUMENTS

| | | | |
|---|---|---|---|
| 3,627,995 | 12/1971 | Warner et al. | 235/92 PL |
| 3,704,363 | 11/1972 | Salmassy et al. | 235/153 AK |
| 3,893,175 | 7/1975 | Solomon | 340/172.5 X |
| 3,906,454 | 9/1975 | Martin | 340/172.5 |
| 3,934,123 | 1/1976 | Maurer et al. | 235/92 PD |

*Primary Examiner*—Raulfe B. Zache

[57] ABSTRACT

A xerographic type copying or reproduction machine incorporating a programmable controller to operate the various machine components in an integrated manner to produce copies is disclosed. The controller carries a master program bearing machine operating parameters from which an operating program for the specific copy run desired is formed and used to operate the machine components to produce the copies programmed. A fault flag array is routinely scanned, each flag comprising the array being associated with an operating component or area of such machine such that on a fault or malfunction thereof, the fault flag corresponding thereto is set. On detection of a fault flag, a machine fault is declared. Display means are provided to visually identify the fault location. A permanent record of certain faults and machine operations are stored in memory for future use.

4 Claims, 58 Drawing Figures

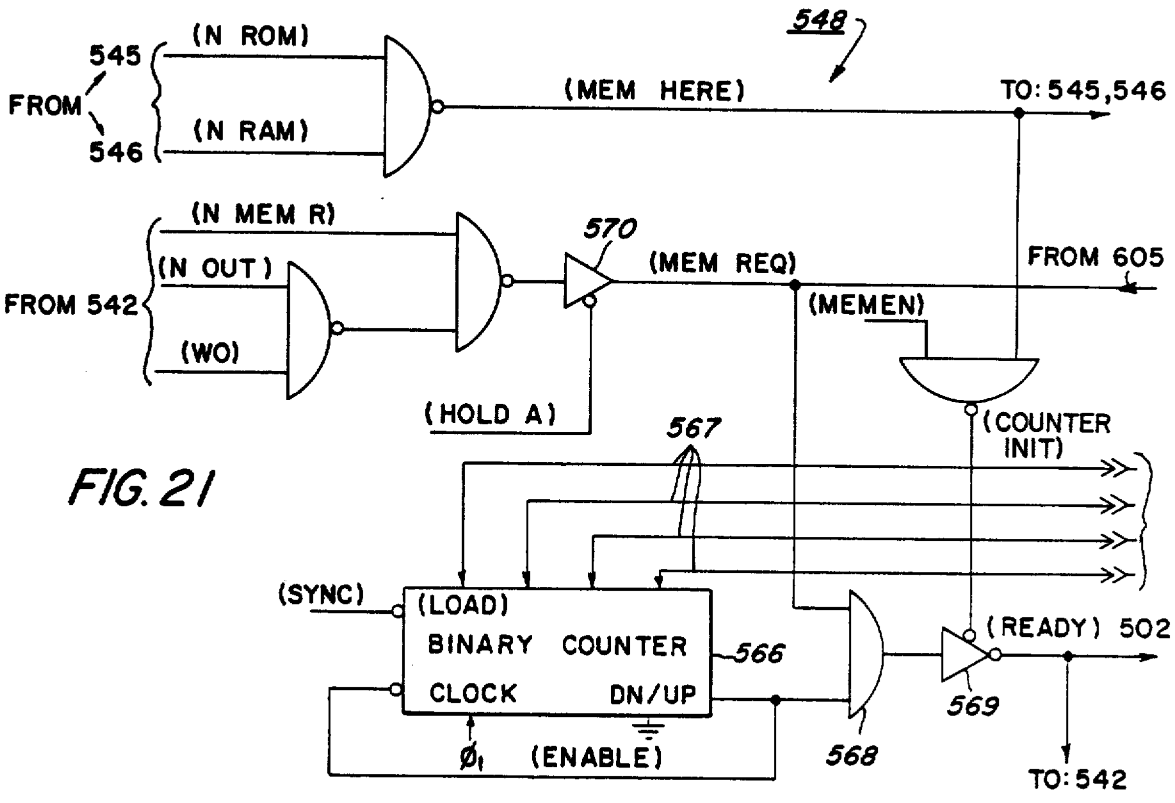
FIG. 21
MEMORY READY
FIG. 24
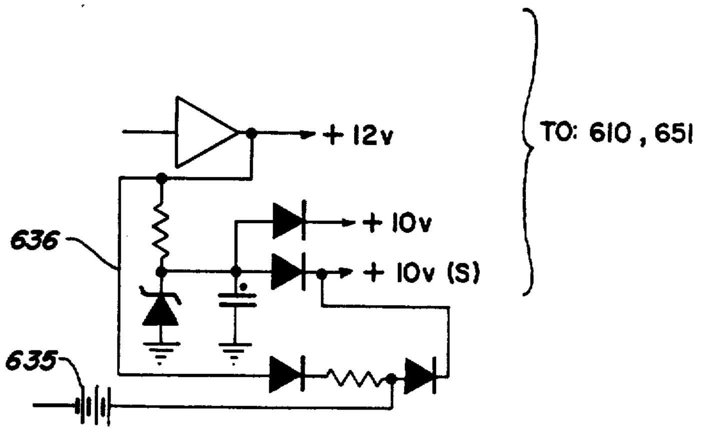

PITCH RESET CLOCK
640
645
OPT ISO
646
DIGITAL FILTER
641
FROM: 202
(EN)
MACH. CLOCK
648
649
PHASE LOOP LOCK
(LOCK)
642
FROM: 206
(EN)
DOC. HAND CLOCK
652
653
PHASE LOOP LOCK
(LOCK)
FROM:601
(LOAD)
658
FROM:570
REAL TIME CLOCK
643
621
REGISTER
508
RESET
FROM: FUNCTION DECODE SECTION 601
EDGE TRIGGER FLIP-FLOP & STORAGE
647
651
654
656
D2
D3
D4
D5
D6
D7
612
659
PRIORITY CHIP
(INT)
(INT) TO: PROCESSOR 542
508
D0-D7
RESTART
660
LATCH
(INTA) FROM: PROCESSOR 542
524
FROM HOST MACHINE 10

LEGEND:

FLT-FAULT
ADDR-ADDRESS
TBL-TABLE
CNT-COUNT
INR-INCREMENT
CDPL-CODE / PANEL LAMPS
DCR-DECREMENT PRESS-PRESS
FCD-FAULT CODE
TOT-TOTAL

LEGEND:

FLT - FAULT
WILE - WHILE
ADDR - ADDRESS
INCR - INCREMENT
FLG - FLAG
TBL - TABLE

LEGEND:

FLT - FAULT
DCTL - DISPLAY CODE TABLE
NUM - NUMBER
DISP - DISPLAY
TBL - TABLE
FC - FAULT CODE

LEGEND

JSW– JAM SWITCH
ADDR– ADDRESS
FLG– FLAGE
DCR– DECREMENT
INX– INCREMENT

ERROR LOG FOR ELECTROSTATOGRAPHIC MACHINES

This invention relates to xerographic type reproduction machine, and more particularly, to an improved fault detection system for such machines.

The advent of higher speed and more complex copiers and reproduction machines has brought with it a corresponding increase in the complexity in the machine control wiring and logic. While this complexity manifests itself in many ways, perhaps the most onerous involves the inflexibility of the typical control logic/wiring systems. For as can be appreciated, simple unsophisticated machines with relatively simple control logic and wiring can be altered and modified easily to incorporate changes, retrofits, and the like. Servicing and repair of the control logic is also fairly simple. On the other hand, some modern high speed machines, which often include sorter, a document handler, choice of copy size, multiple paper trays, jam protection and the like have extremely complex logic systems making even the most minor changes and improvements in the control logic difficult, expensive and time consuming. And servicing or repairing the machine control logic paper handling systems, electromechanical components, etc. may similarly entail substantial difficulty, time and expense.

To mitigate problems of the type alluded to, a programmable controller may be used, to operate the machine. However, the complexity and operational seed of such machines makes the identification and handling of machine faults and malfunctions difficult. For example, in the event of a paper jam, the jam must be located from among a maze of paper transports. Otherwise, the entire paper path must be accessed and every transport device checked, through inspection or actual operation a time consuming job, and particularly annoying in a high speed, high volume reproduction machine.

It is therefore an object of the present invention to provide a new and improved fault detection system for xerographic type reproduction machines.

It is a further object of the present invention to provide a system for detecting and visually identifying a fault or malfunction in the operation of an electrostatic type copying machine.

It is an object of the present invention to provide display arrangement for identifying by coded representation the point at which a malfunction has occurred in a xerographic machine.

The invention relates to a reproduction system having a plurality of copy processing components cooperable to produce copies and a controller for operating said components in accordance with a program to produce copies, the program incorporating an array of fault flags associated with individual ones of the components and means for setting individual fault flags in the array in response to a fault in the machine component associated therewith, means to scan the array of fault flags, and display means to identify the associated with any fault flag in the array that has been set.

Other objects and advantages will be apparent from the ensuing description and drawings in which:

FIG. 1*a* is a schematic representation of an exemplary reproduction apparatus incorporating the control system of the present invention;

FIG. 1*b* is a schematic illustration of a typical exterior door for the reproduction apparatus;

Figure 18A:
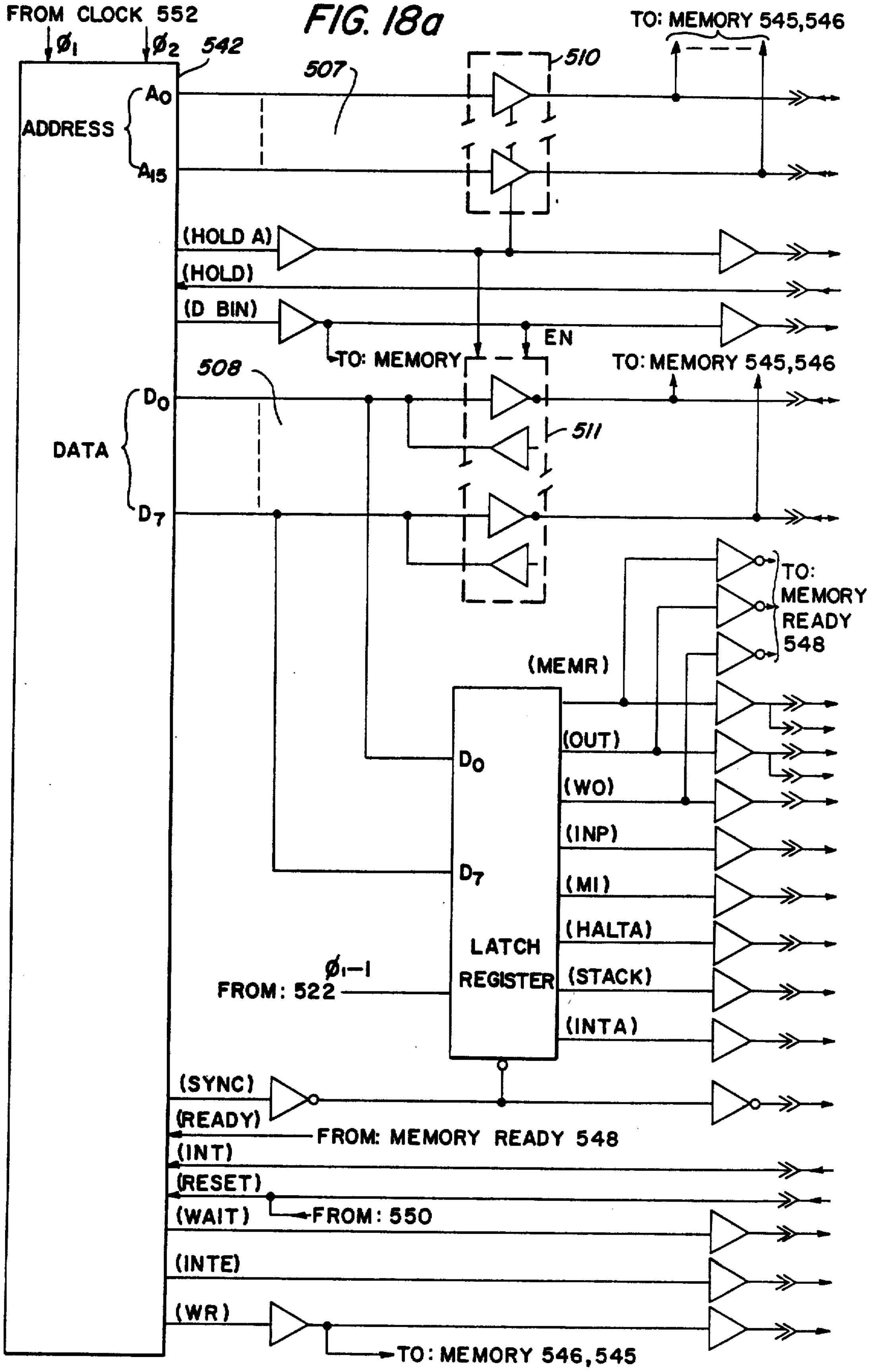
Figure 18B:
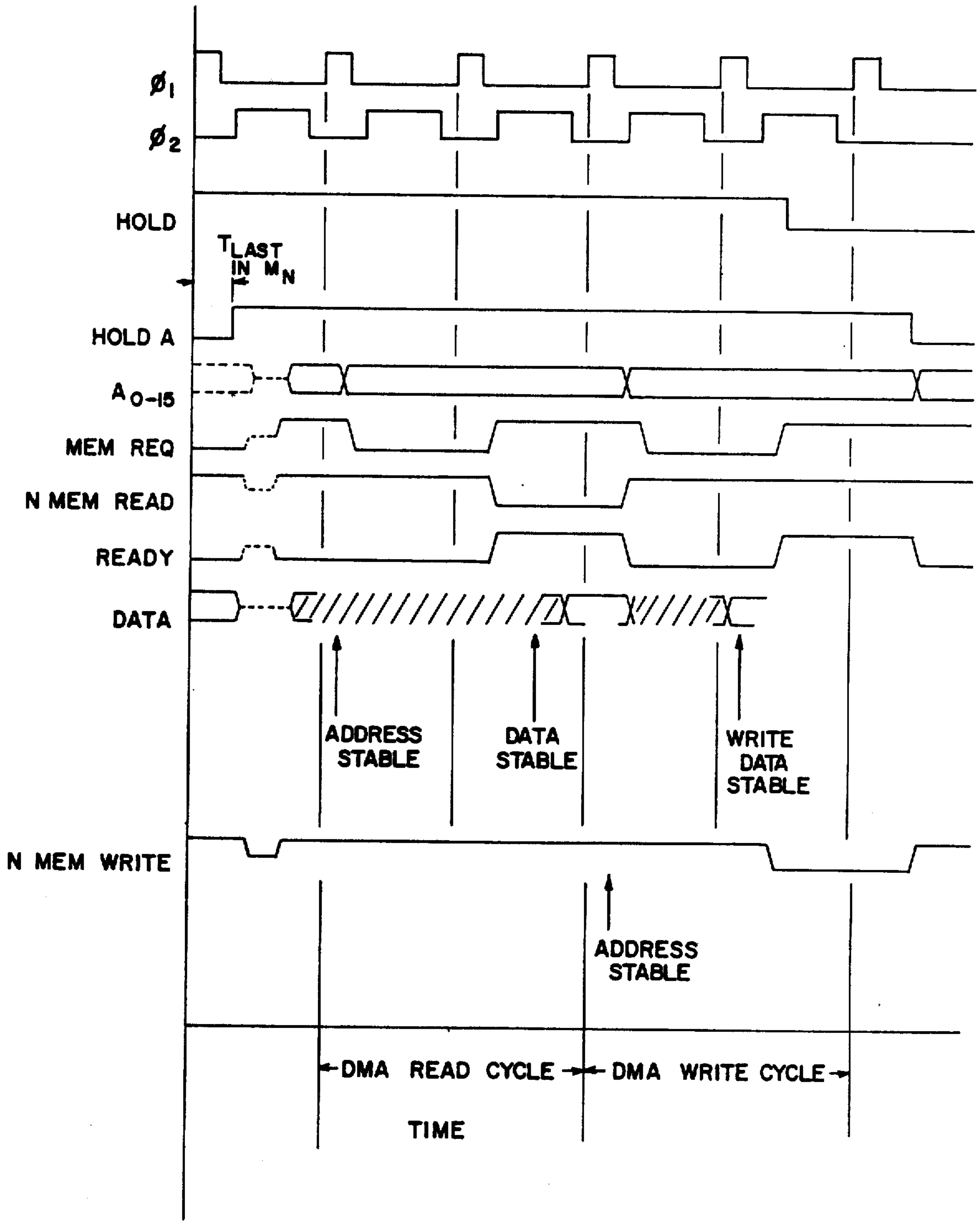
Figure 19A:
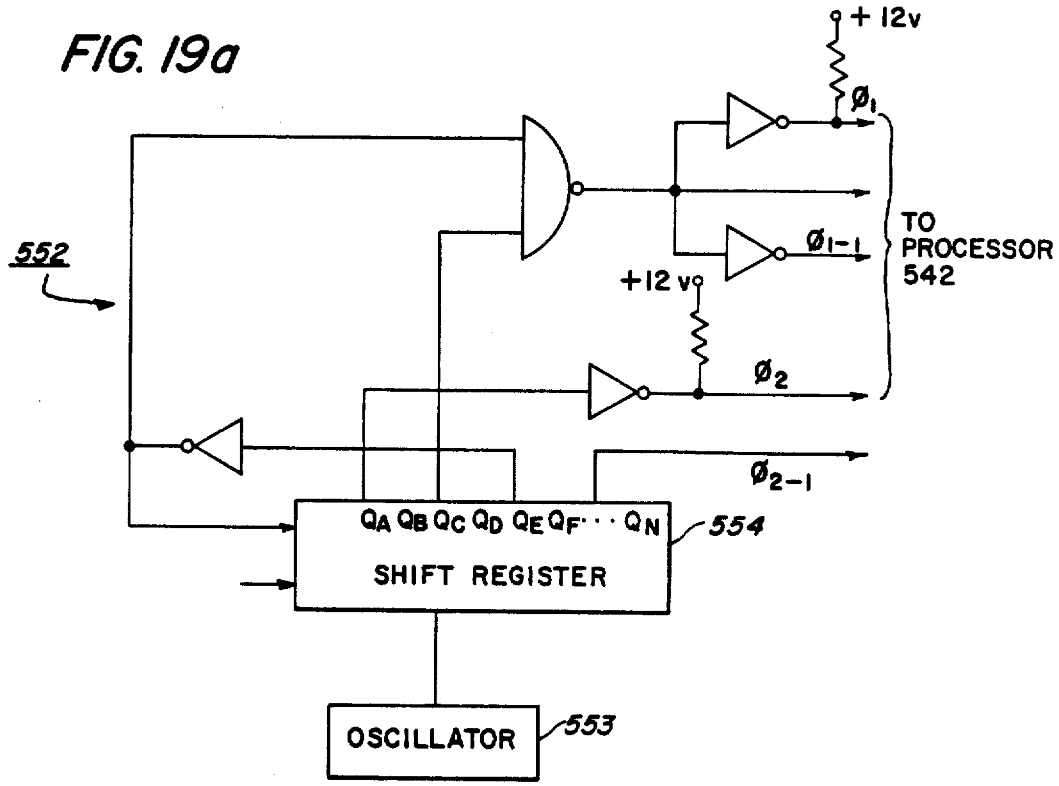
Figure 19B:
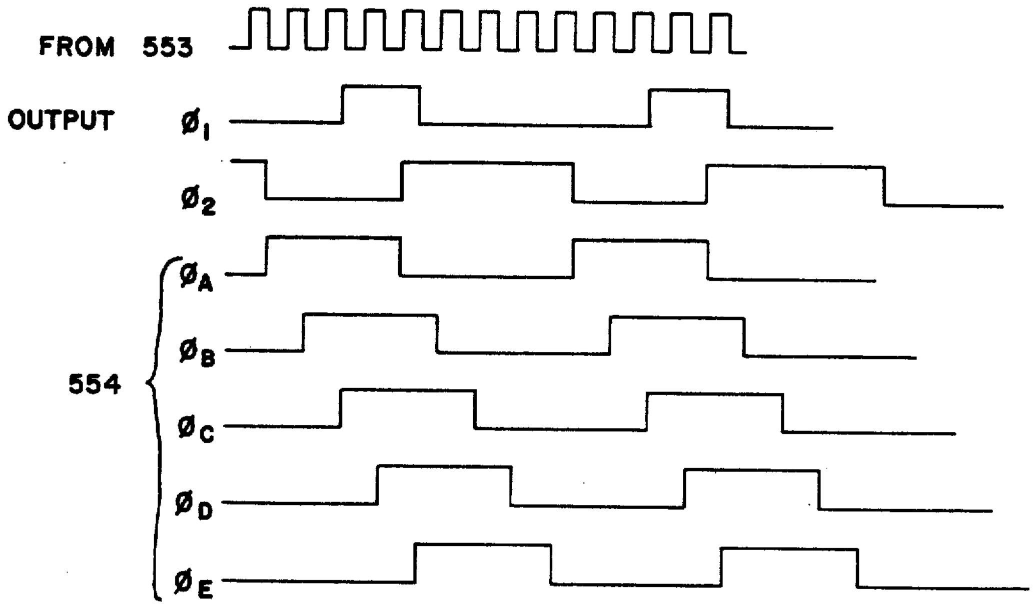

FIG. 18*a* is a block diagram showing the CPU microprocessor input/output connections;

FIG. 18*b* is a timing chart of Direct Memory Access (DMA) Read and Write cycles;

FIG. 19*a* is a logic schematic of the CPU clock;

FIG. 19*b* is a chart illustrating the output wave form of the clock shown in FIG. 19*a;*

Figure 1A:
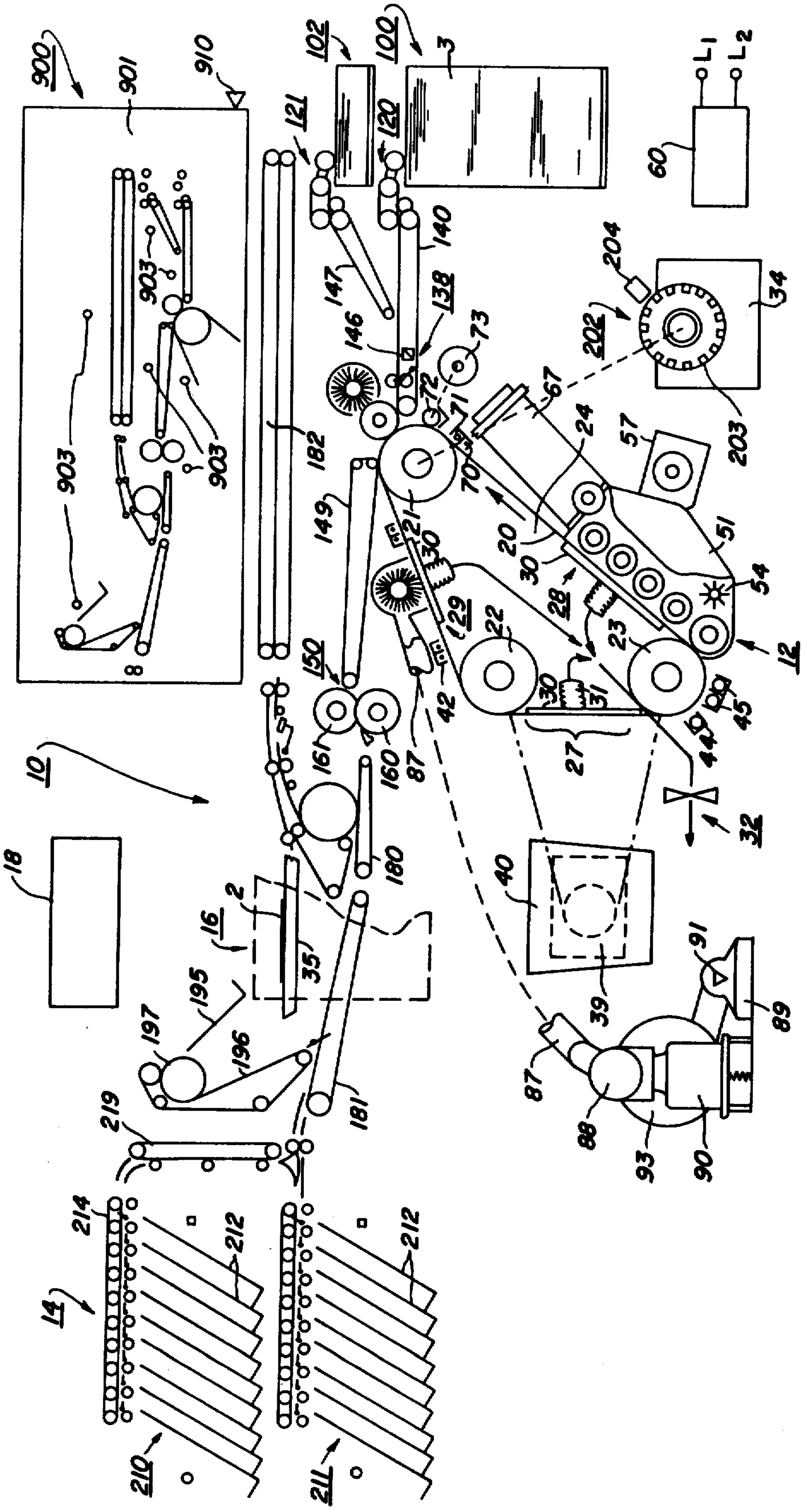
Figure 20:
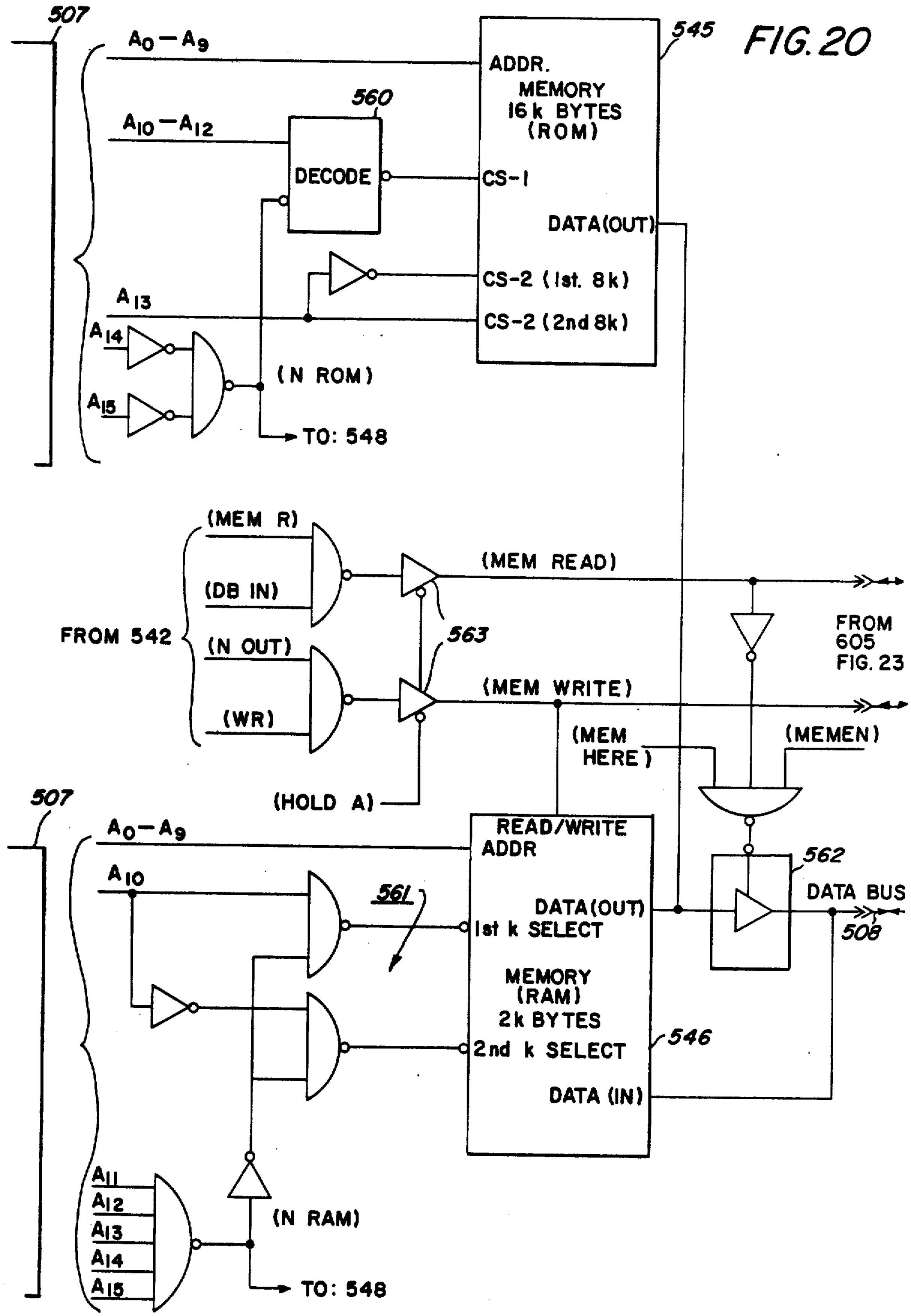
Figure 22A:
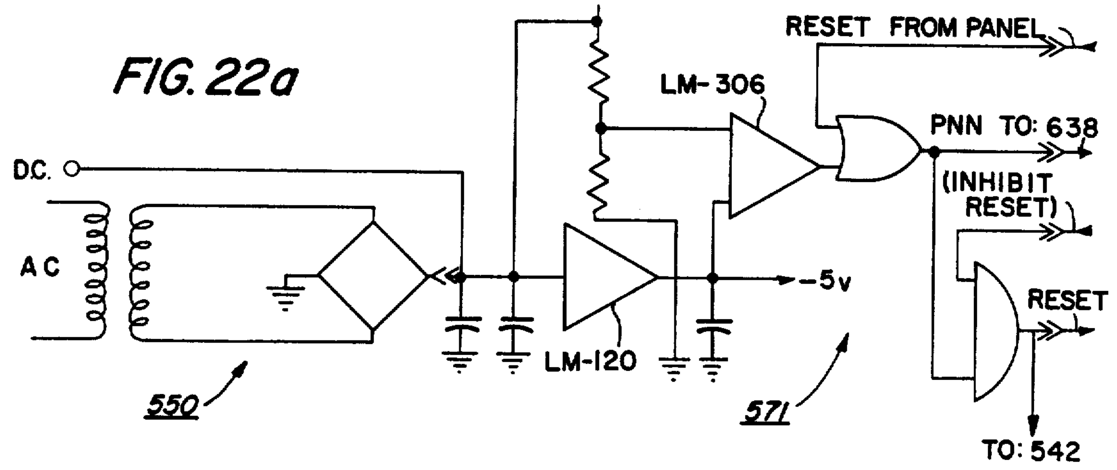
Figure 22B:
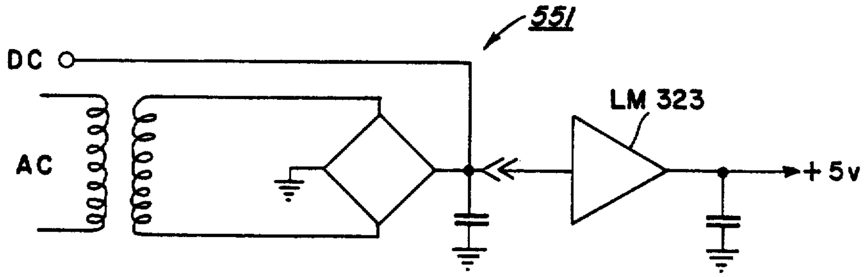
Figure 22C:
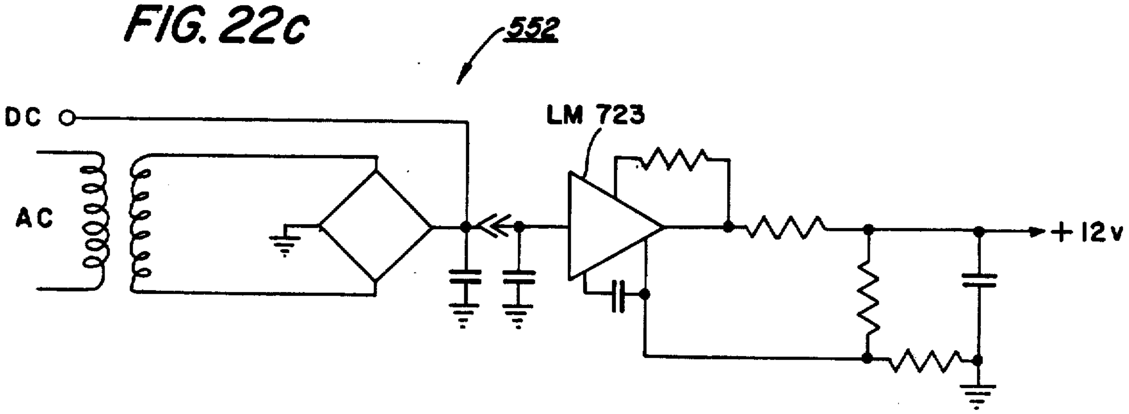
Figure 23A:
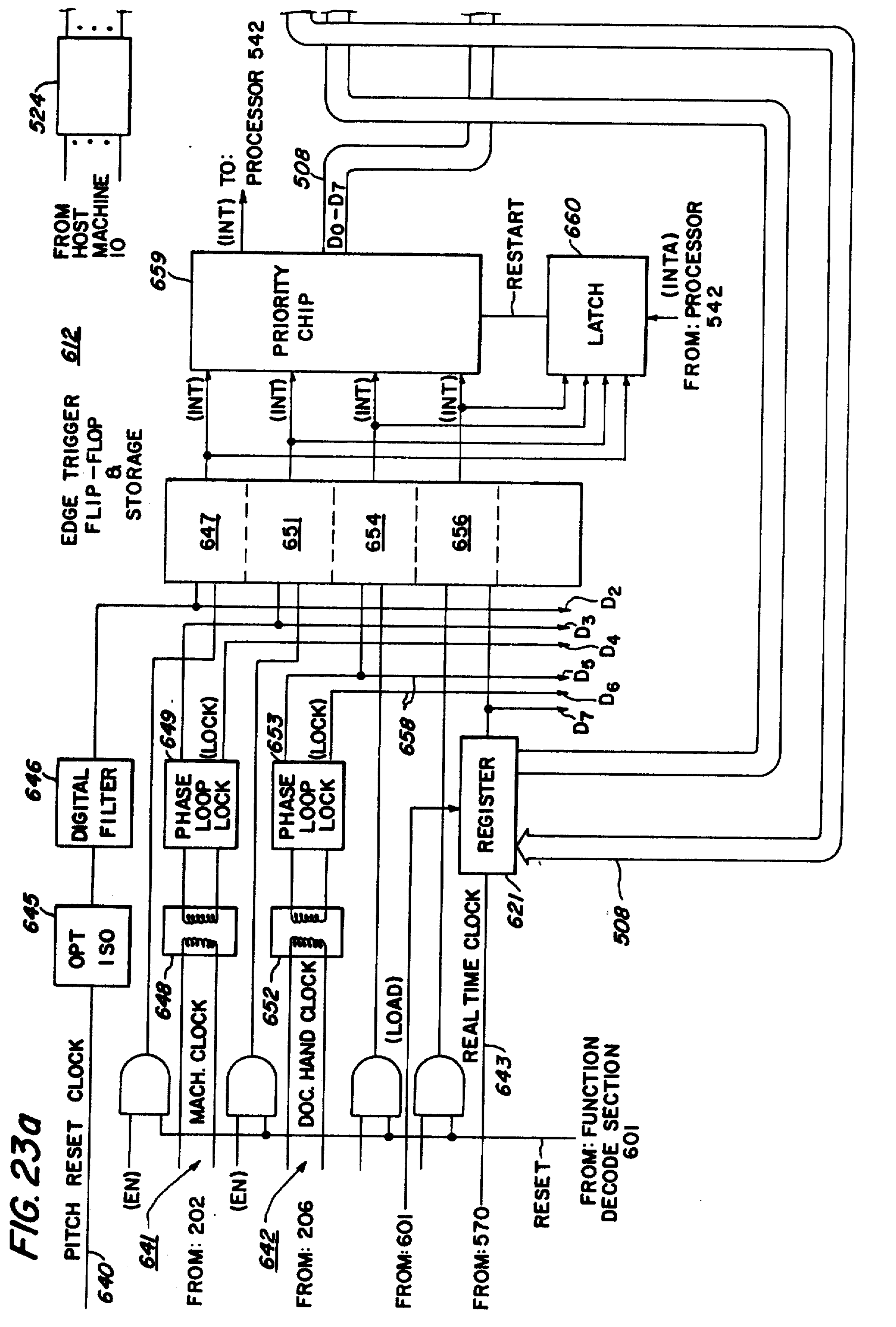
Figure 23B:
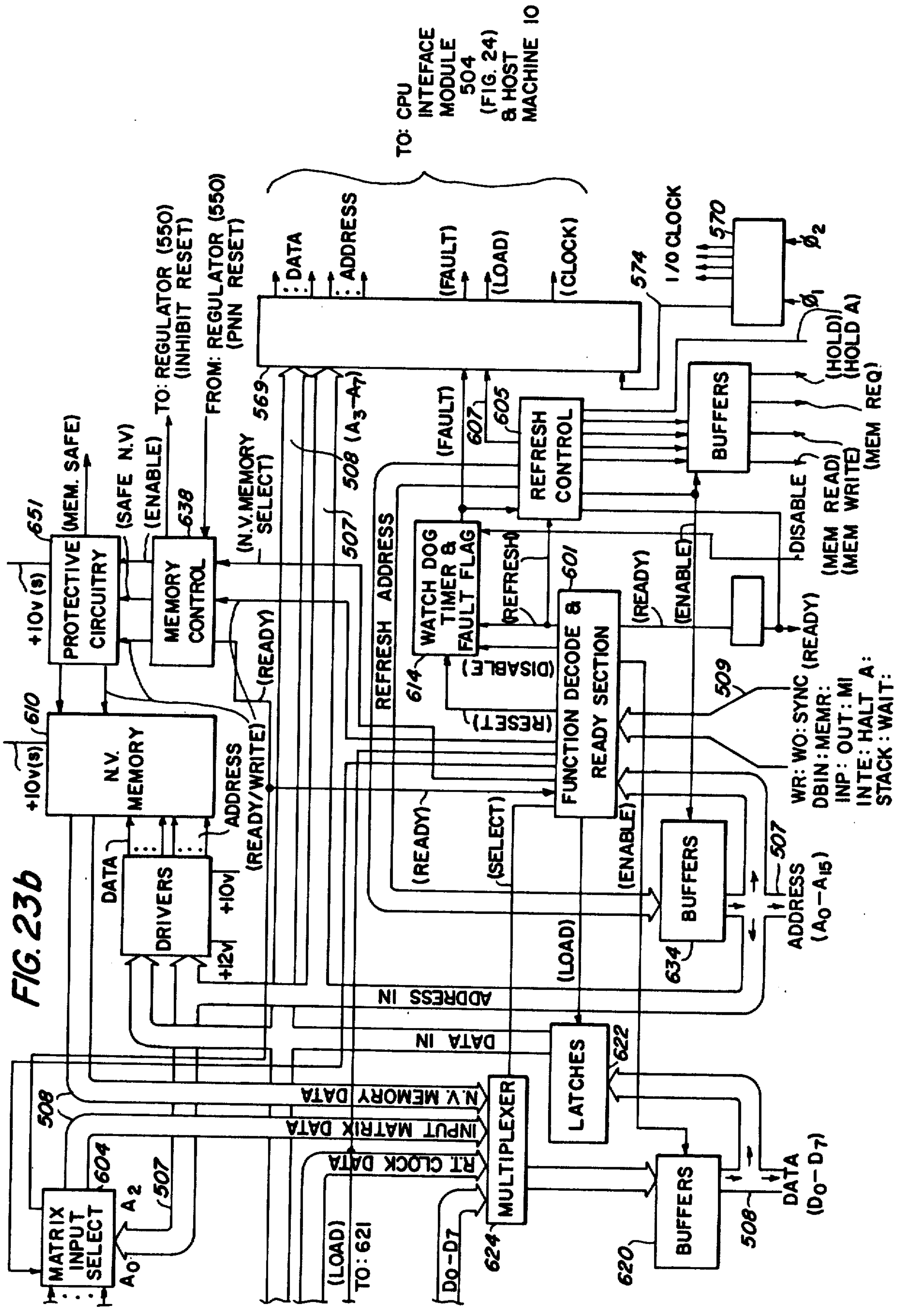
Figure 25:
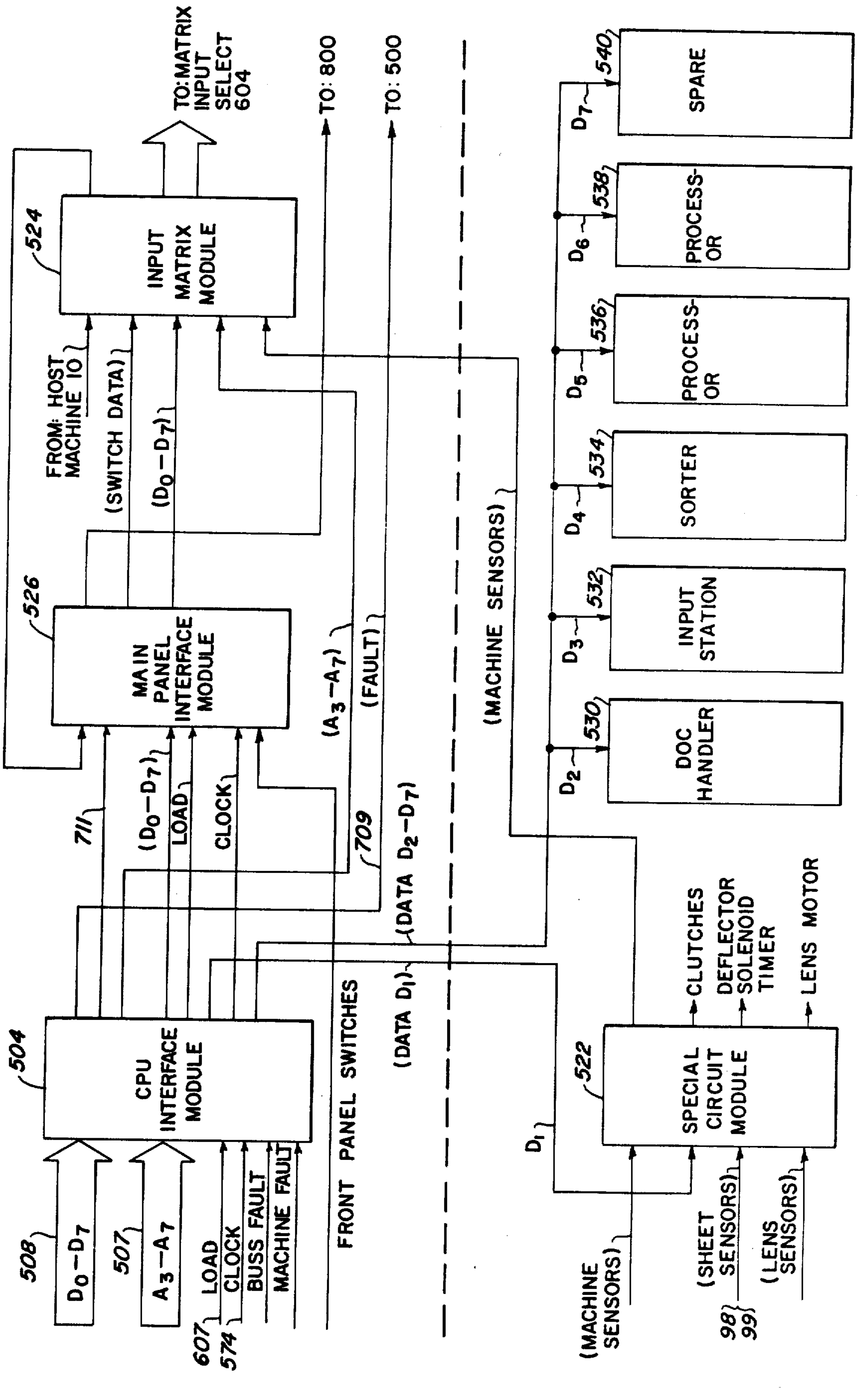
Figure 26:
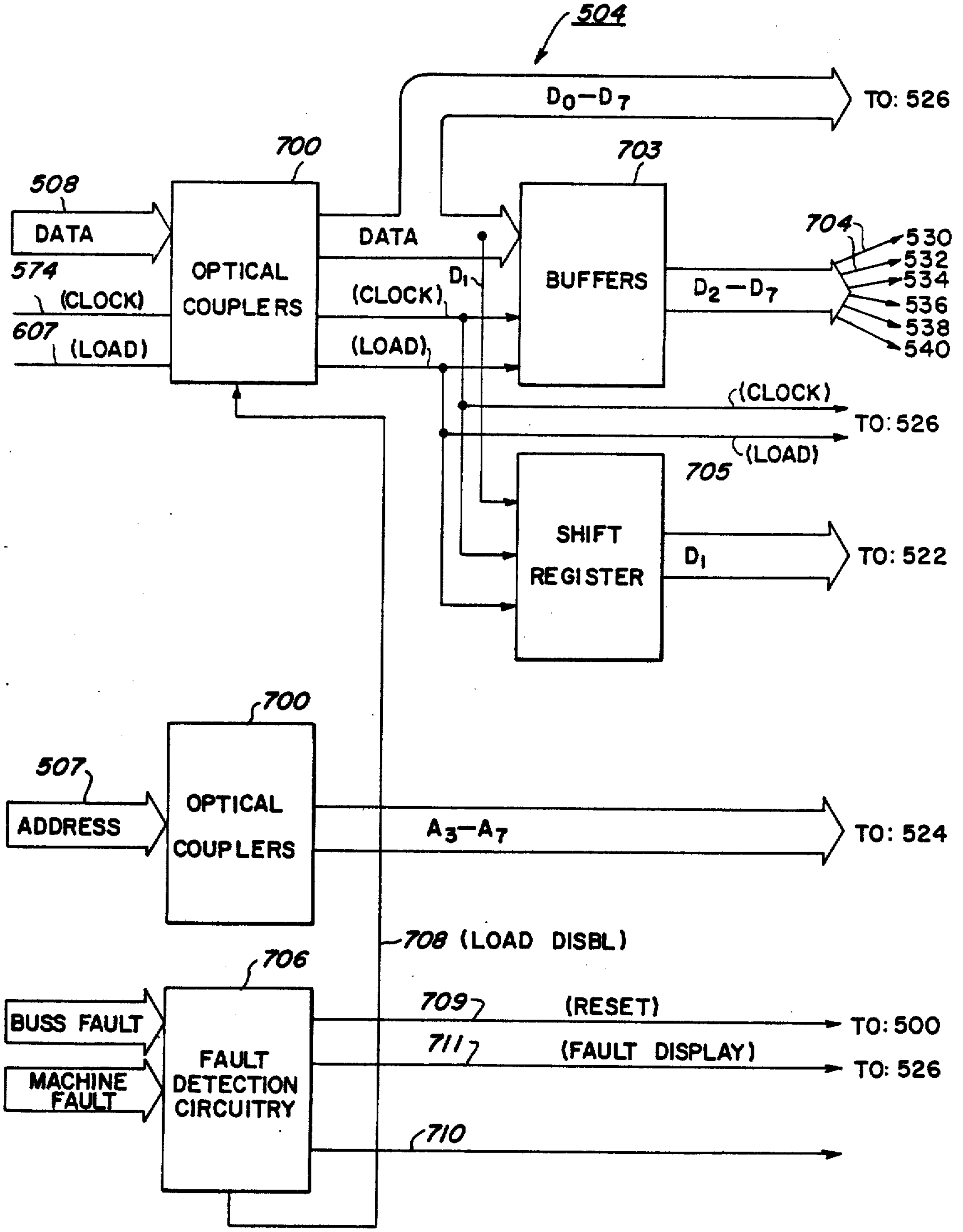
Figure 27:
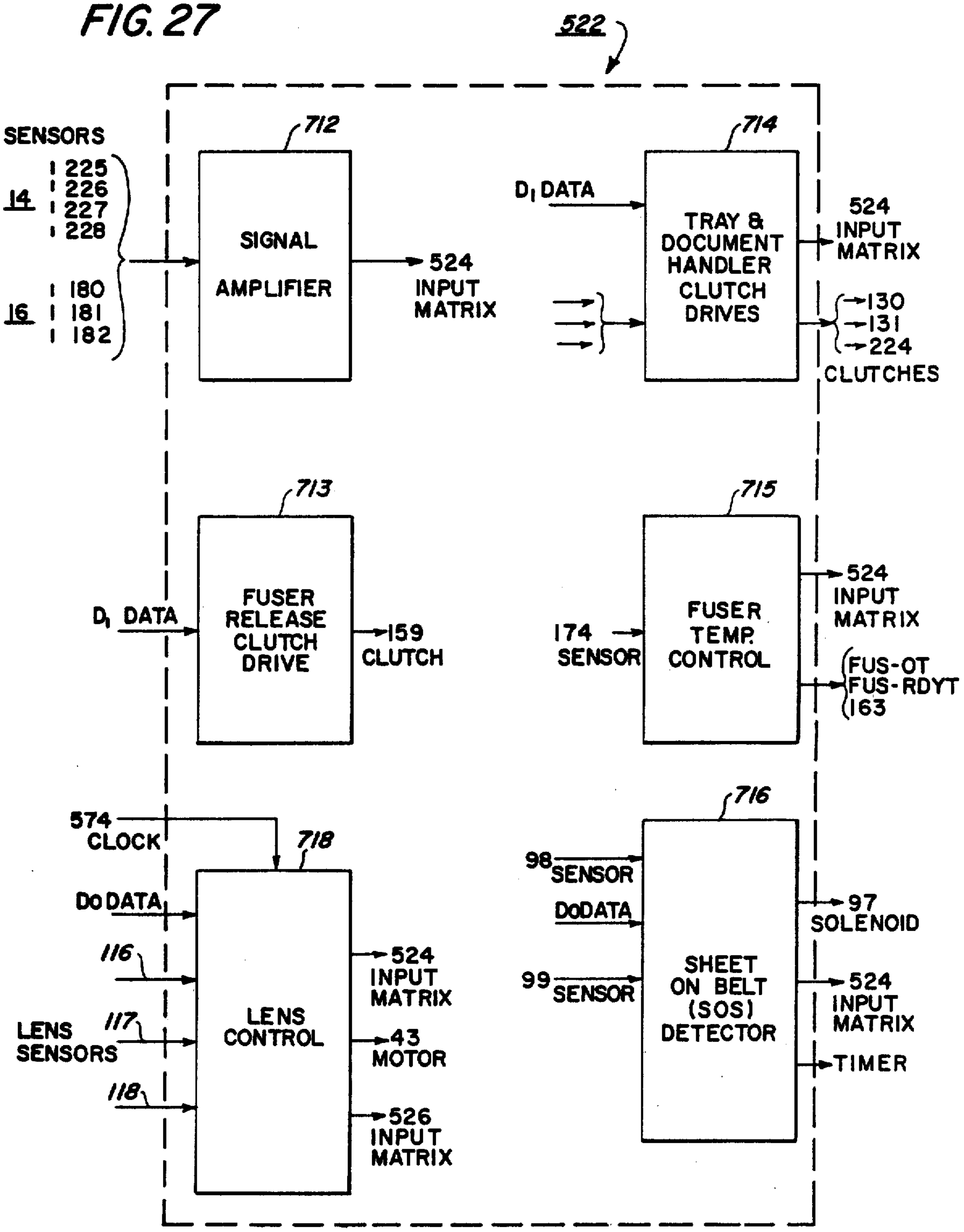
Figure 28:
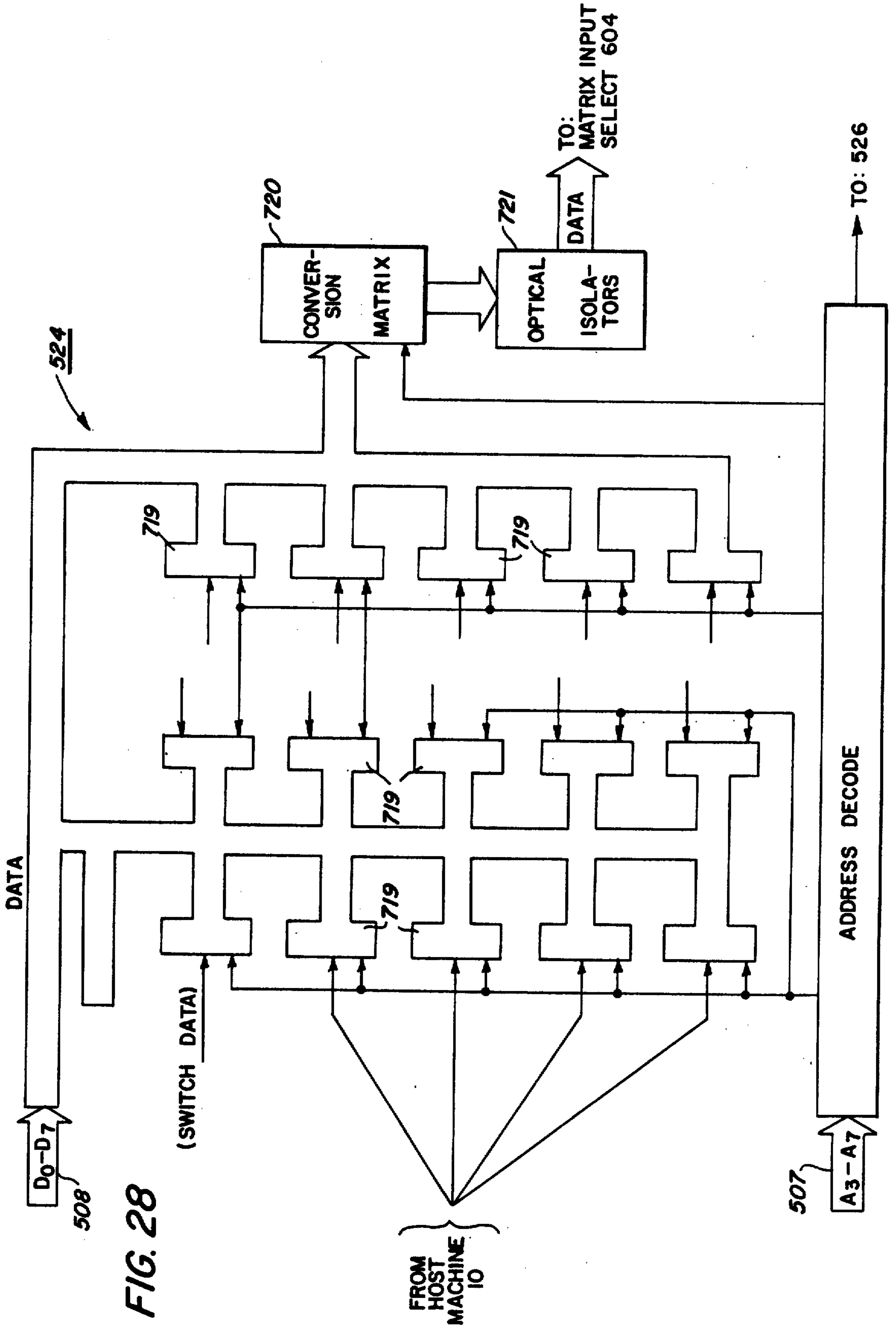
Figure 29:
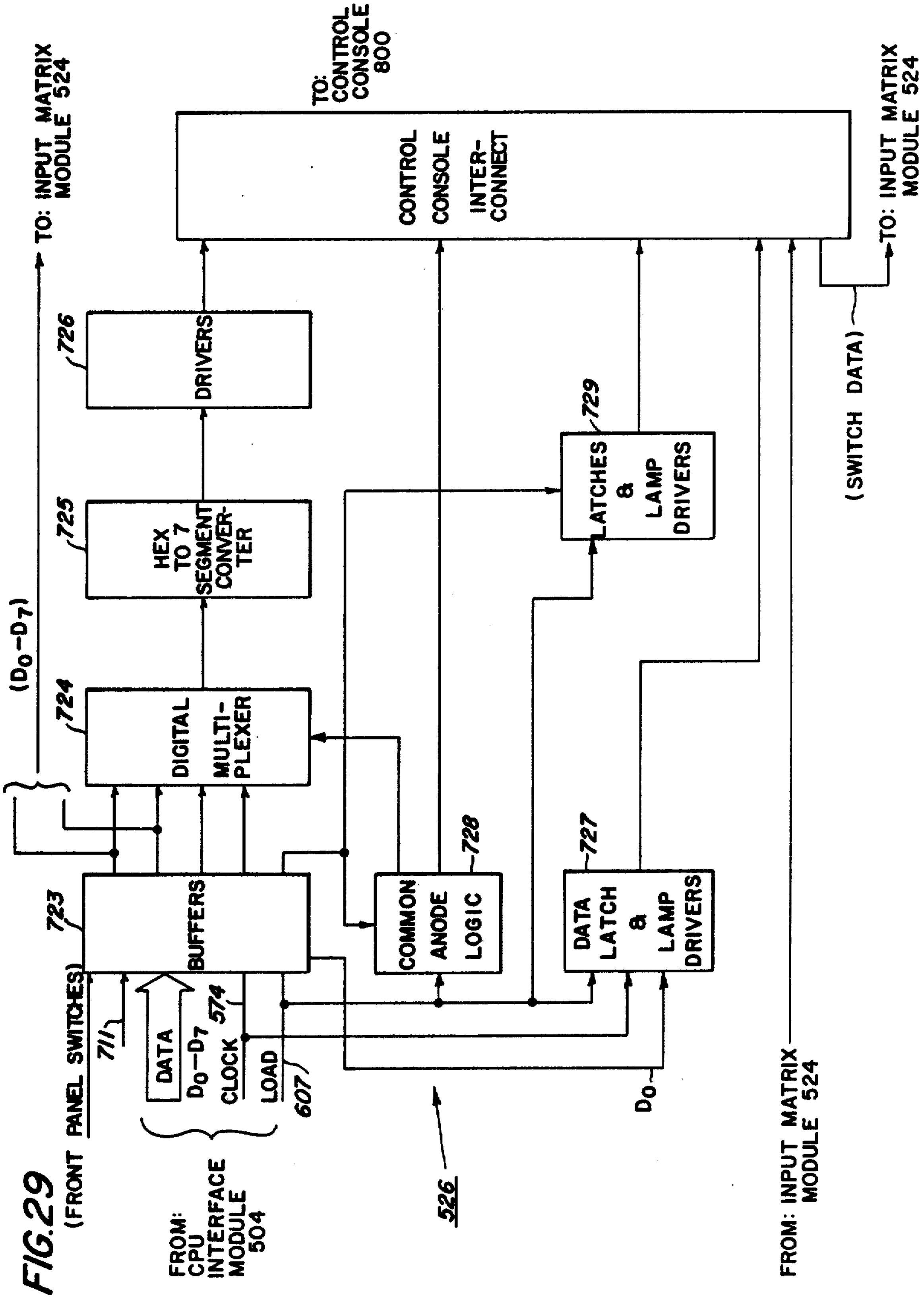
Figure 30:
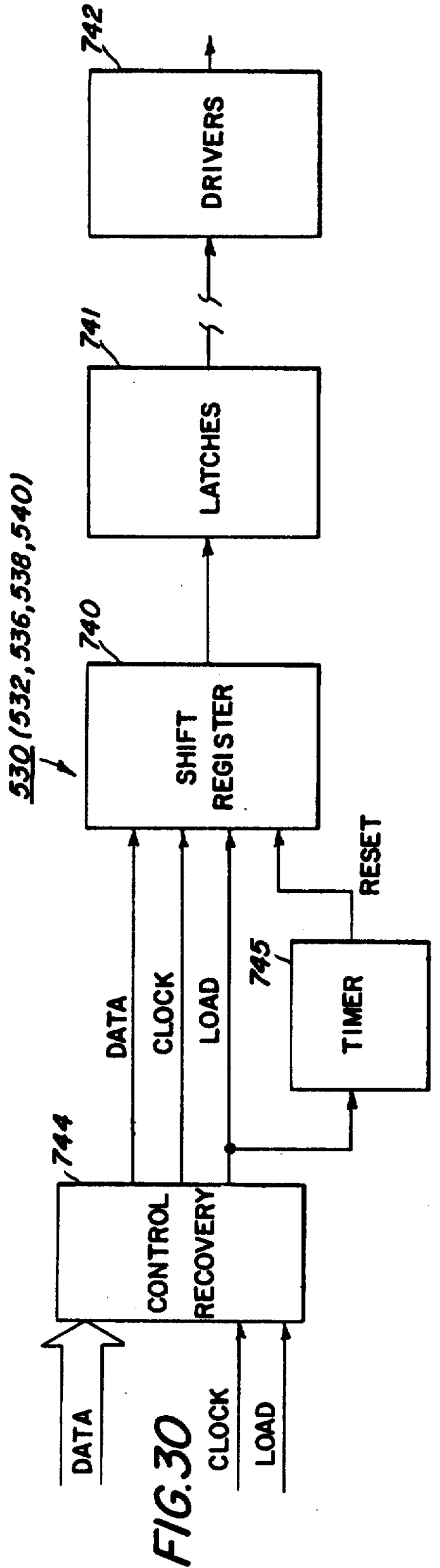
Figure 31:
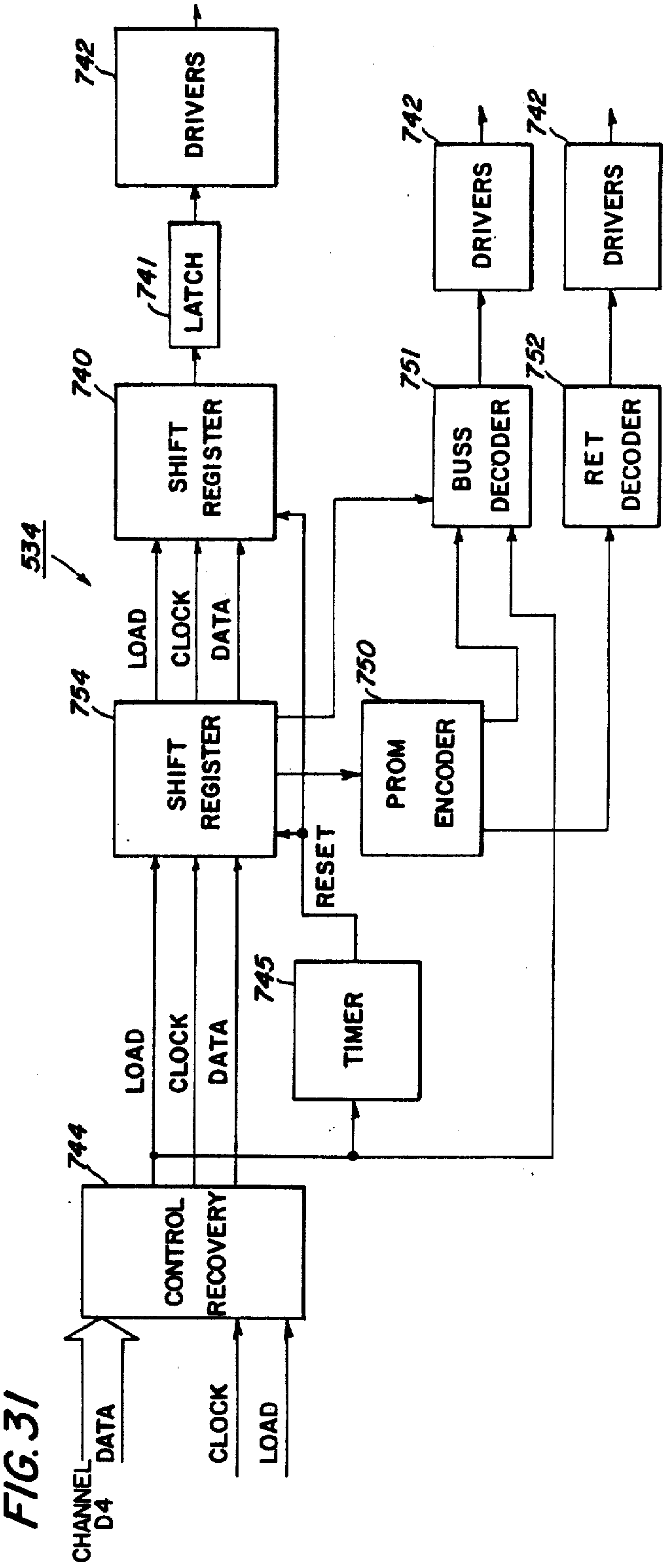
Figure 32:
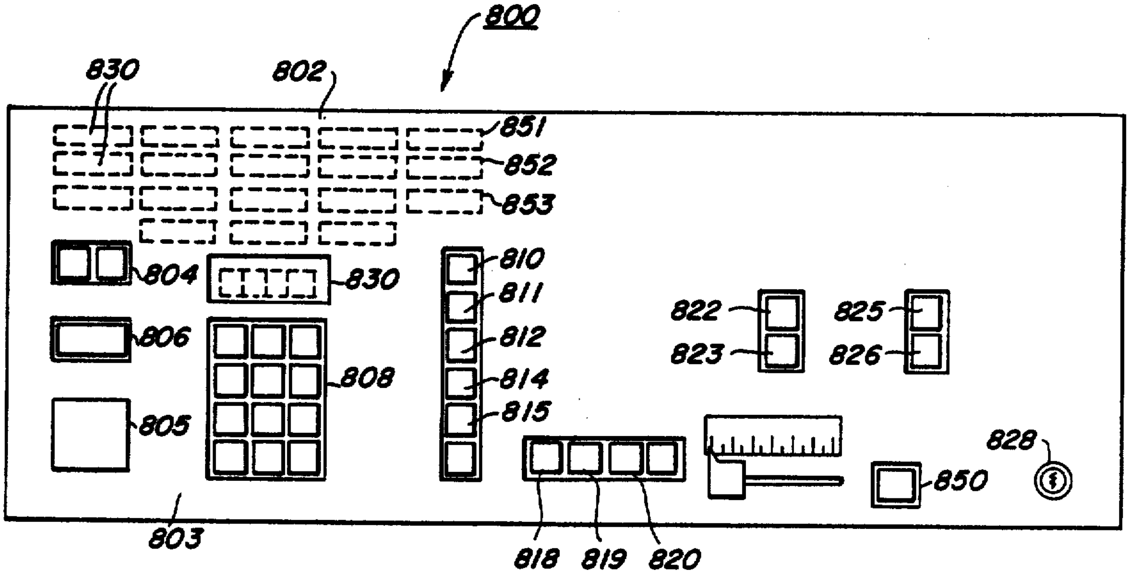

FIG. 20 is a logic schematic of the CPU memory;

FIG. 21 is a logic schematic of the CPU memory ready;

FIGS. 22*a*, 22*b*, 22*c* are logic schematics of the CPU power supply stages;

FIGS. 23*a* and 23*b* comprise a block diagram of the controller I/O module;

FIG. 24 is a logic schematic of the nonvolatile memory power supply;

FIG. 25 is a block diagram of the apparatus interface and remote output connections;

FIG. 26 is a block diagram of the CPU interface module;

FIG. 27 is a block diagram of the apparatus special circuits module;

FIG. 28 is a block diagram of the main panel interface module;

FIG. 29 is a block diagram of the input matrix module;

FIG. 30 is a block diagram of a typical remote;

FIG. 31 is a block diagram of the sorter remote;

FIG. 32 is a view of the control console for inputting copy run instructions to the apparatus shown in FIG. 1*a;*

Figure 33:
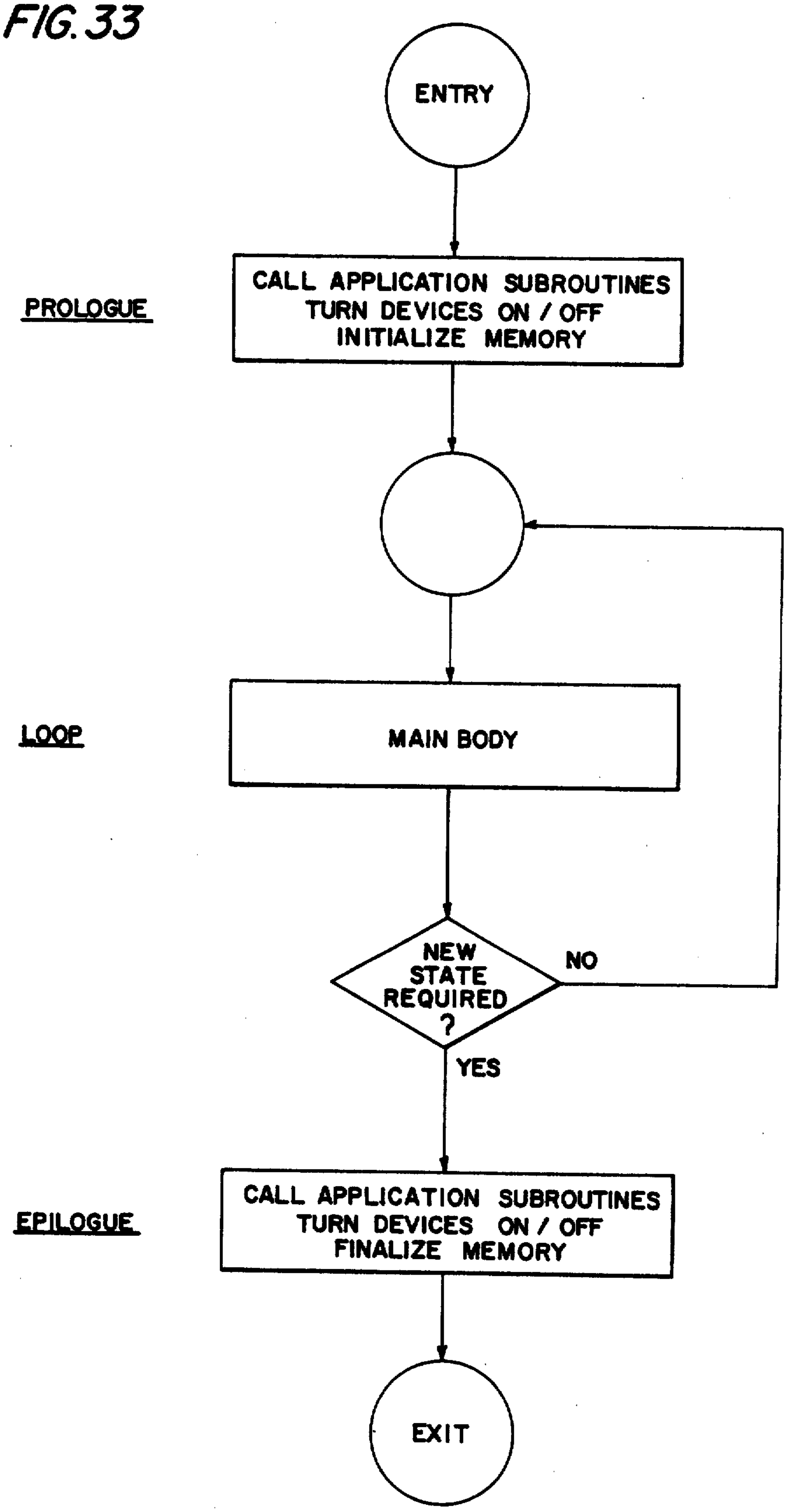
Figure 34A:
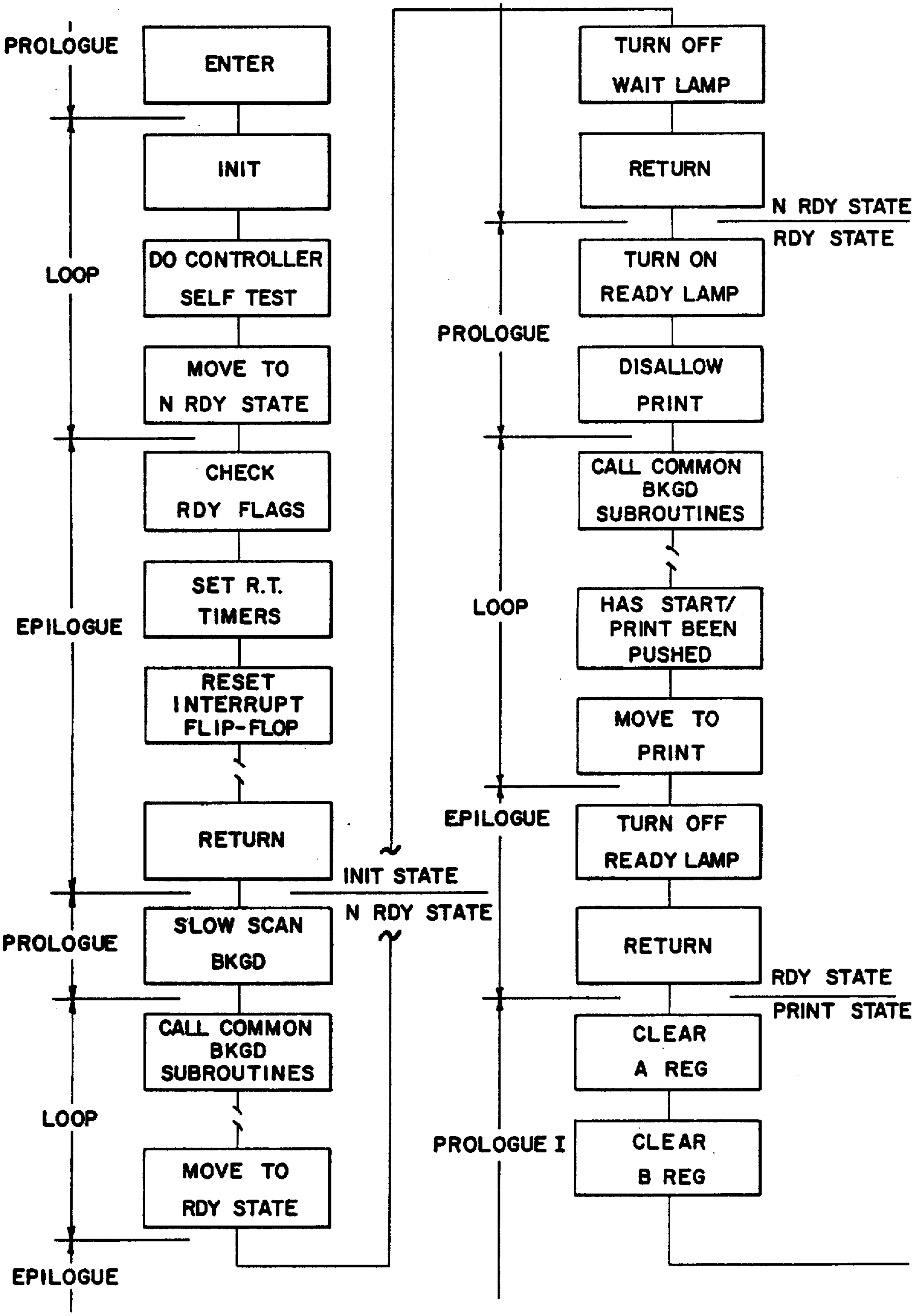
Figure 34B:
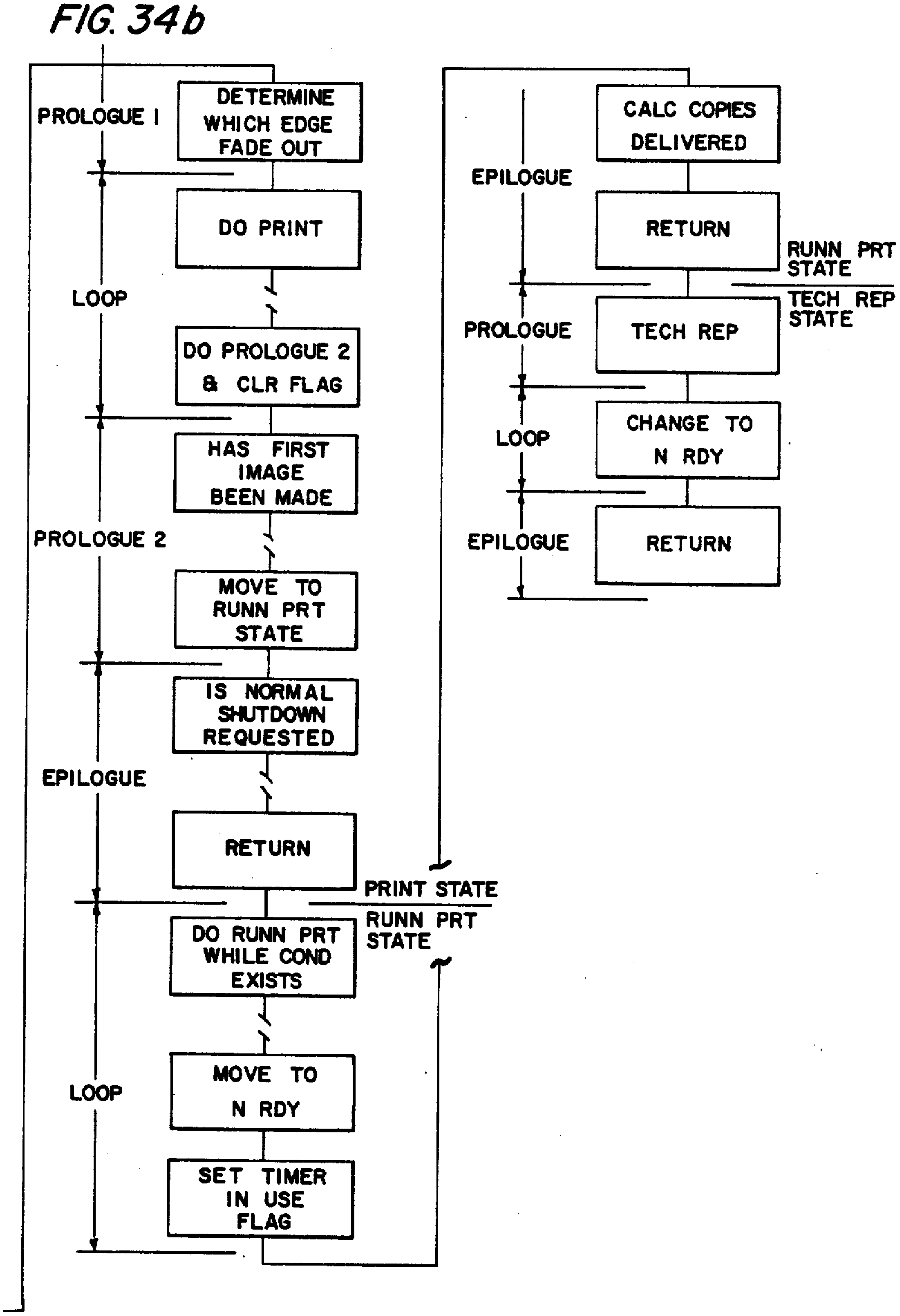
Figure 35:
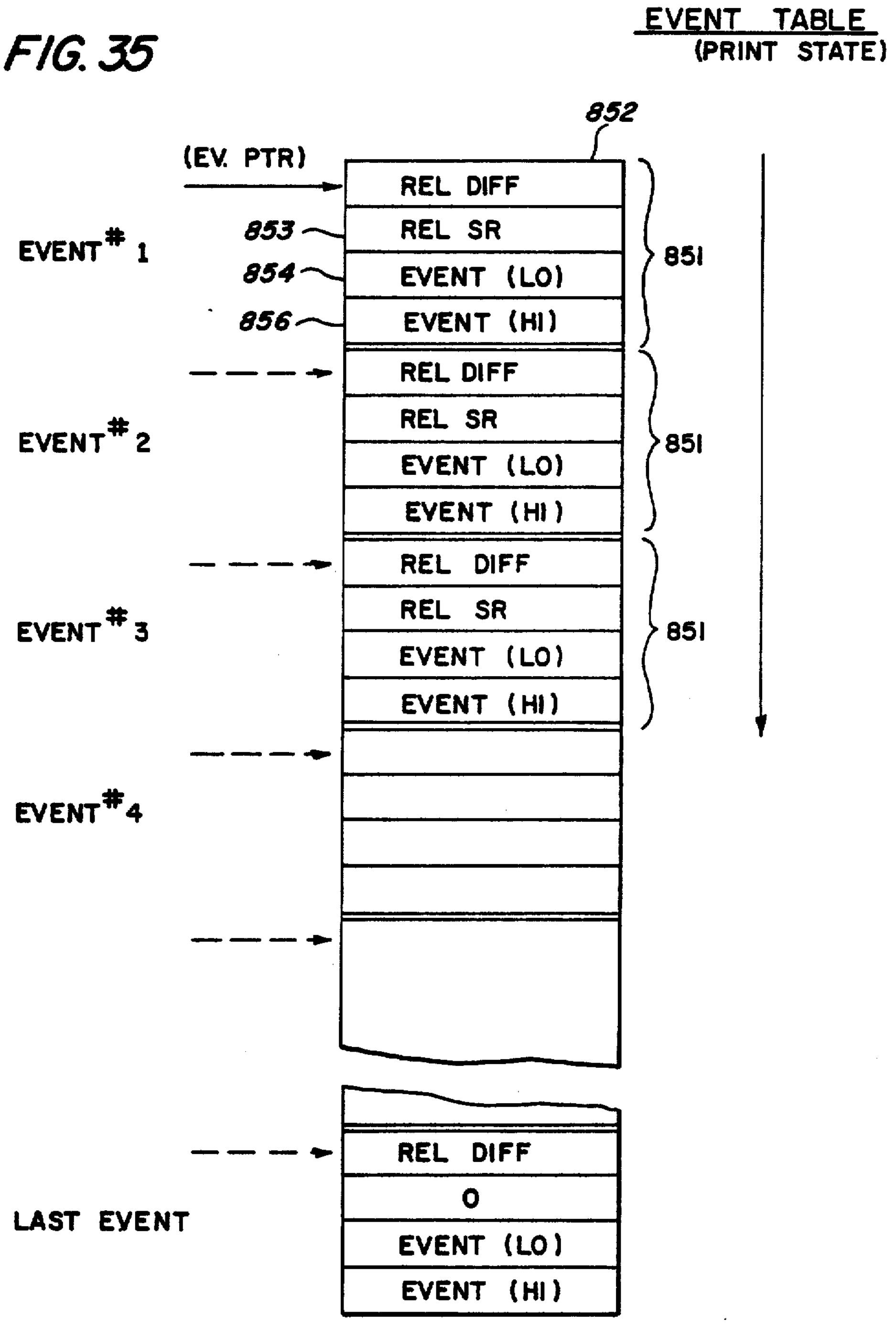
Figure 36:
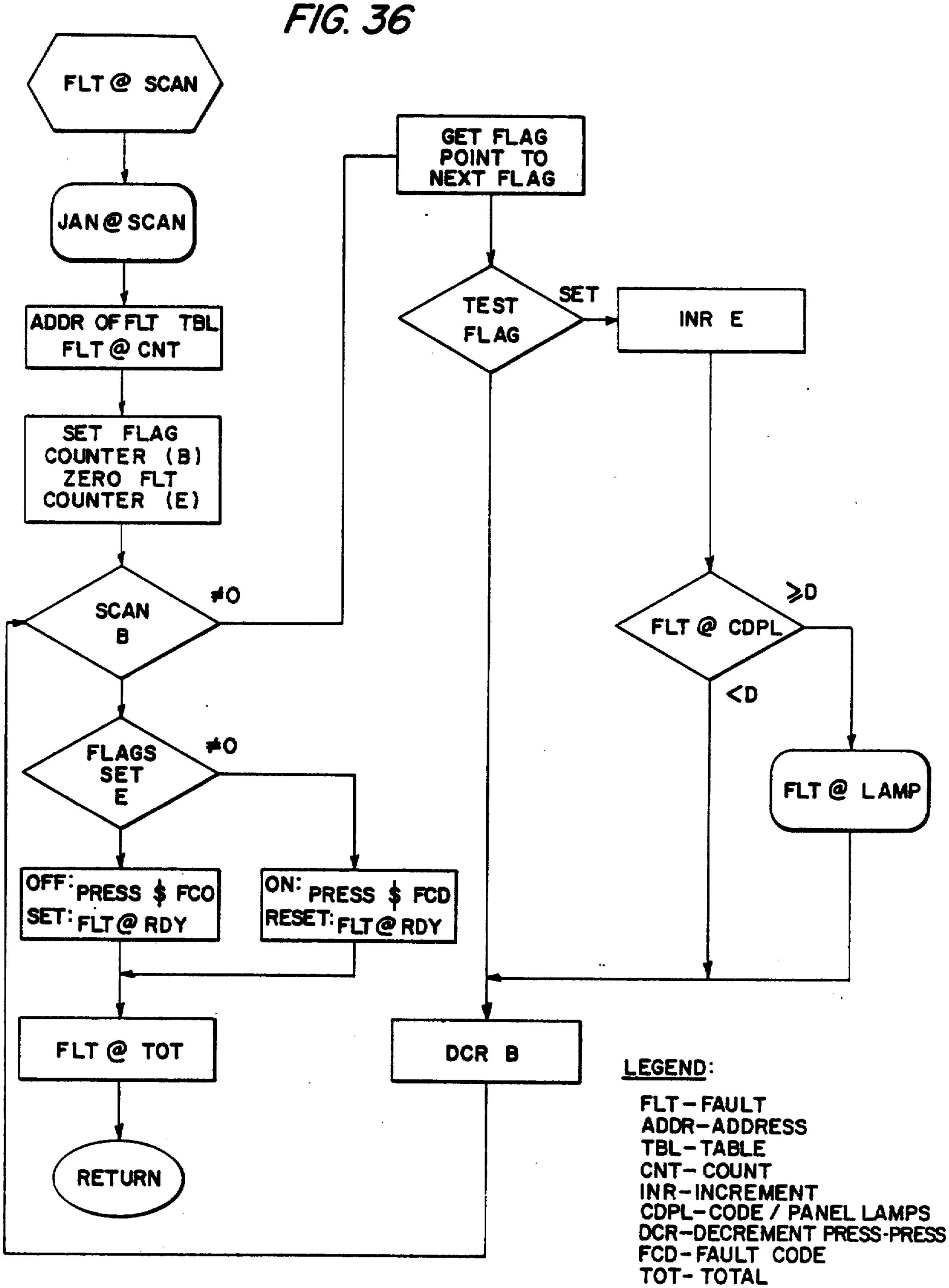
Figure 37:
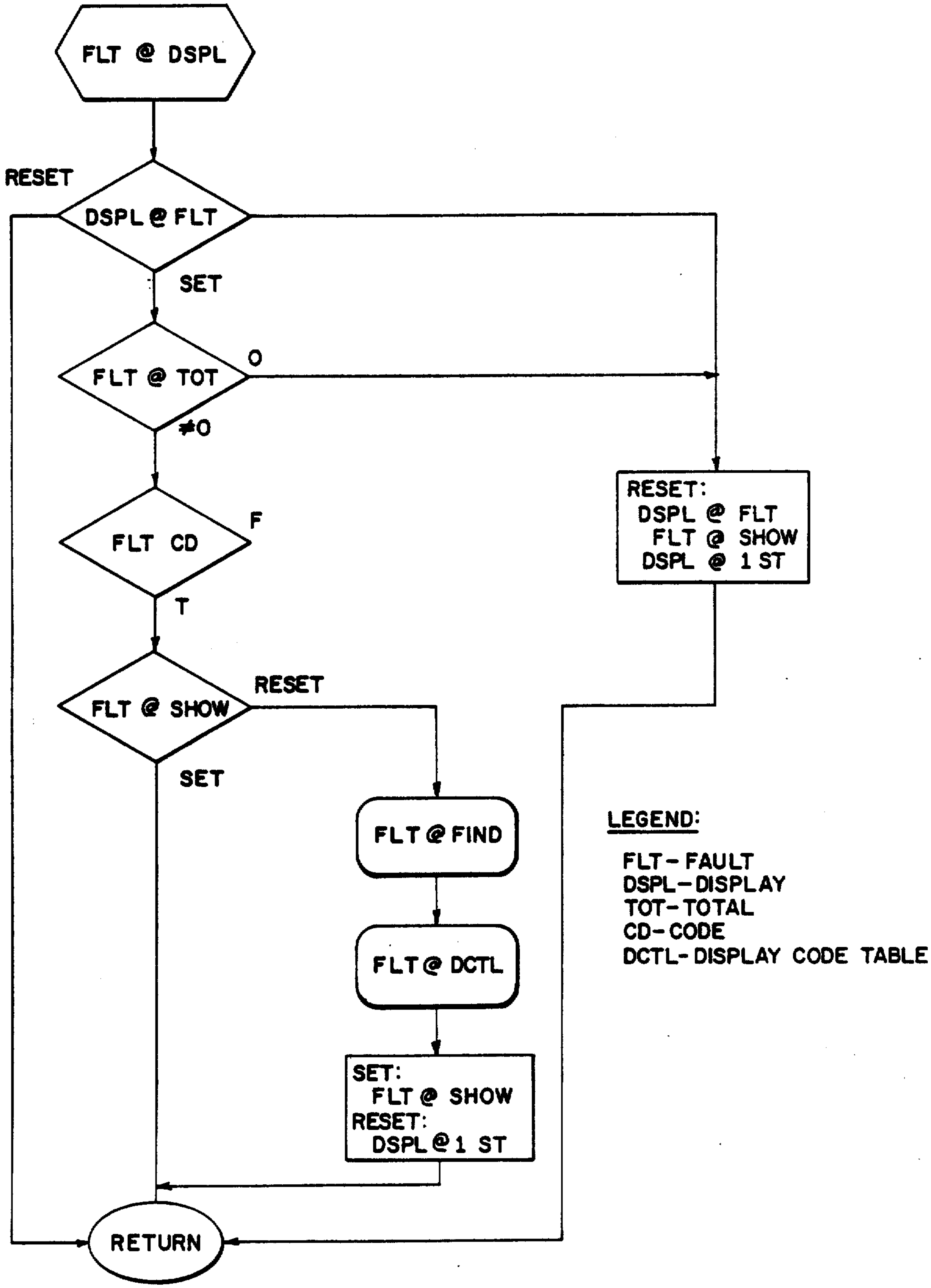
Figure 38:
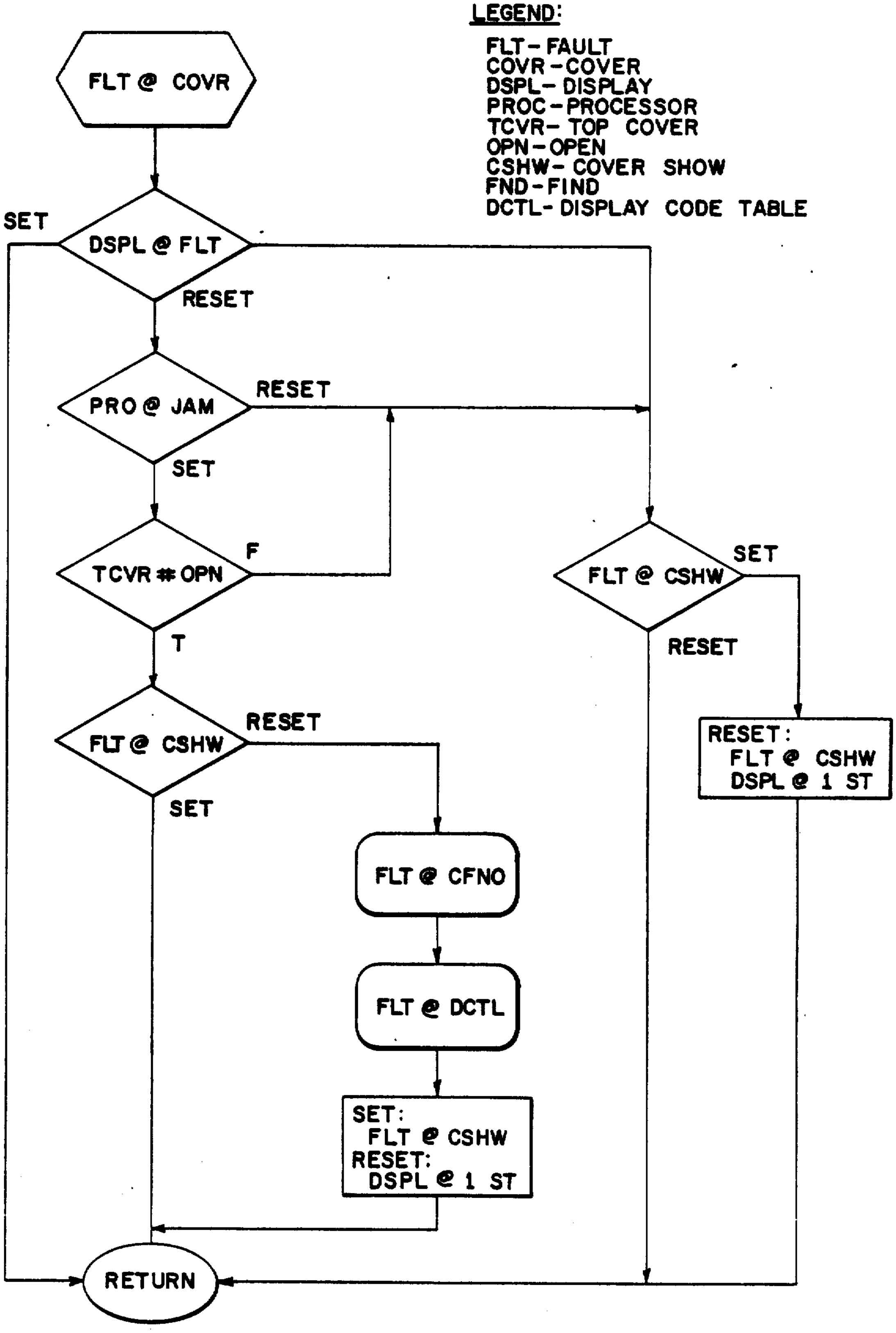
Figure 39A:
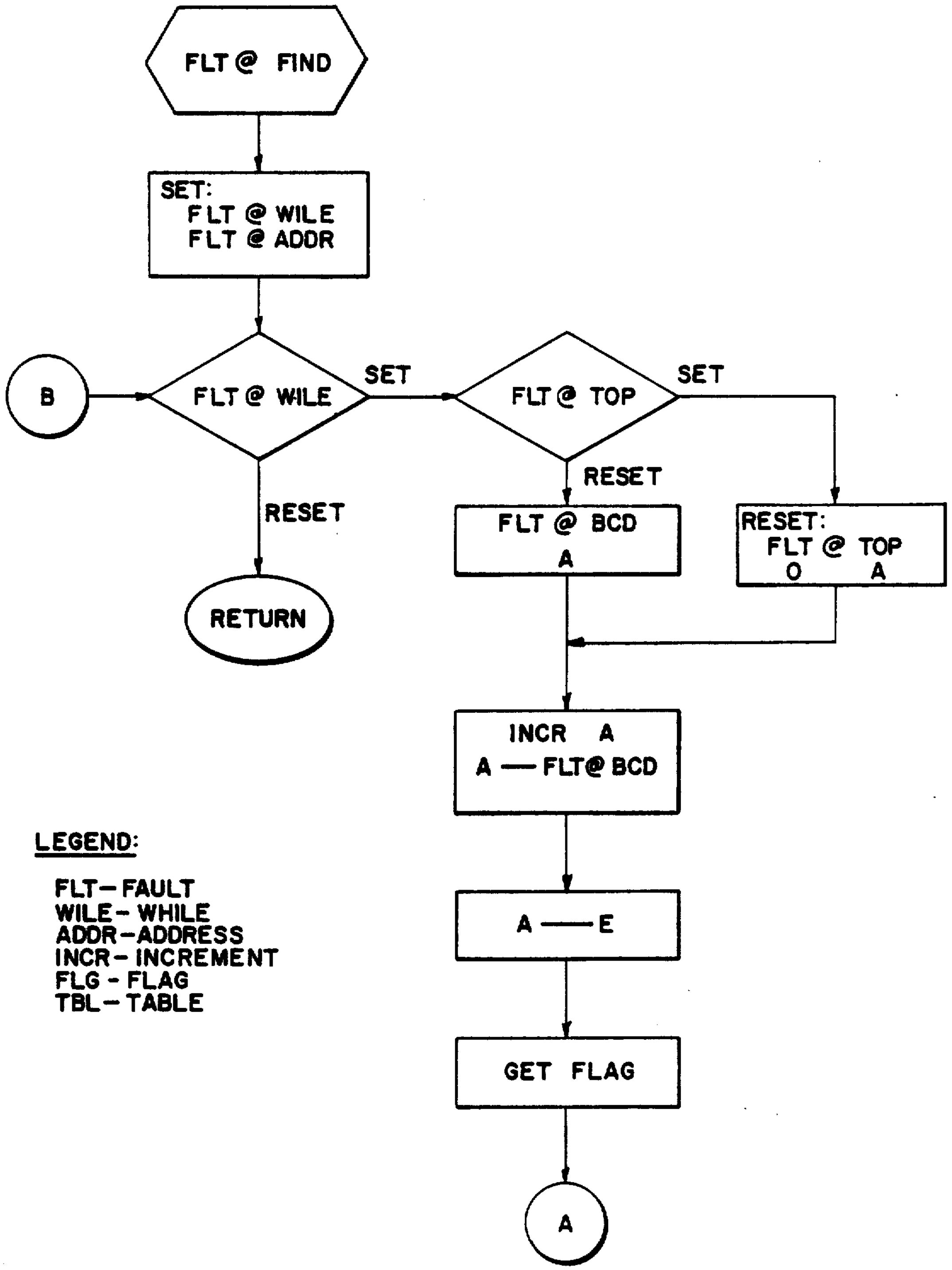
Figure 40:
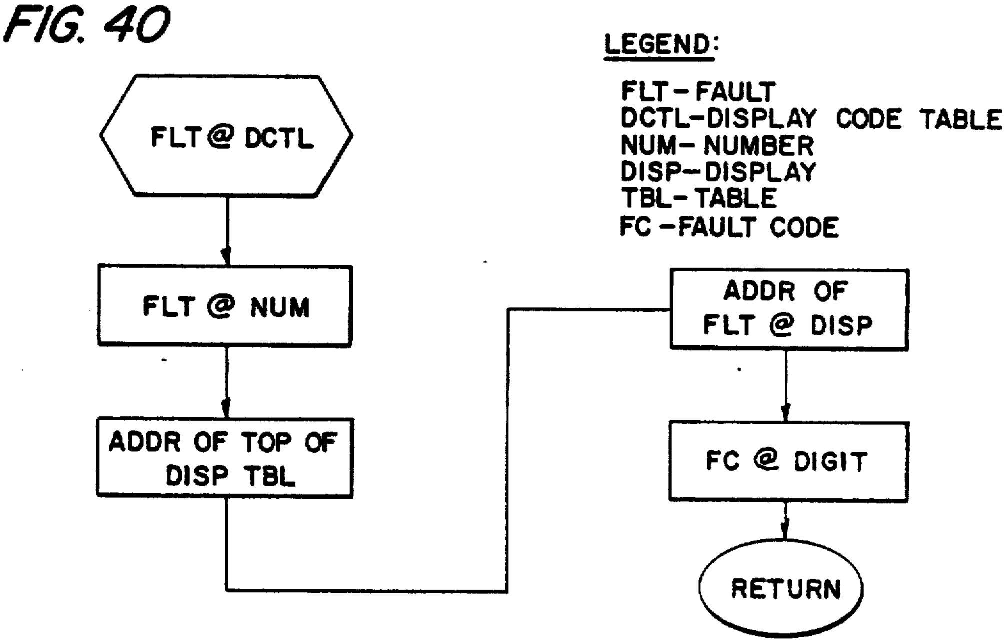
Figure 41:
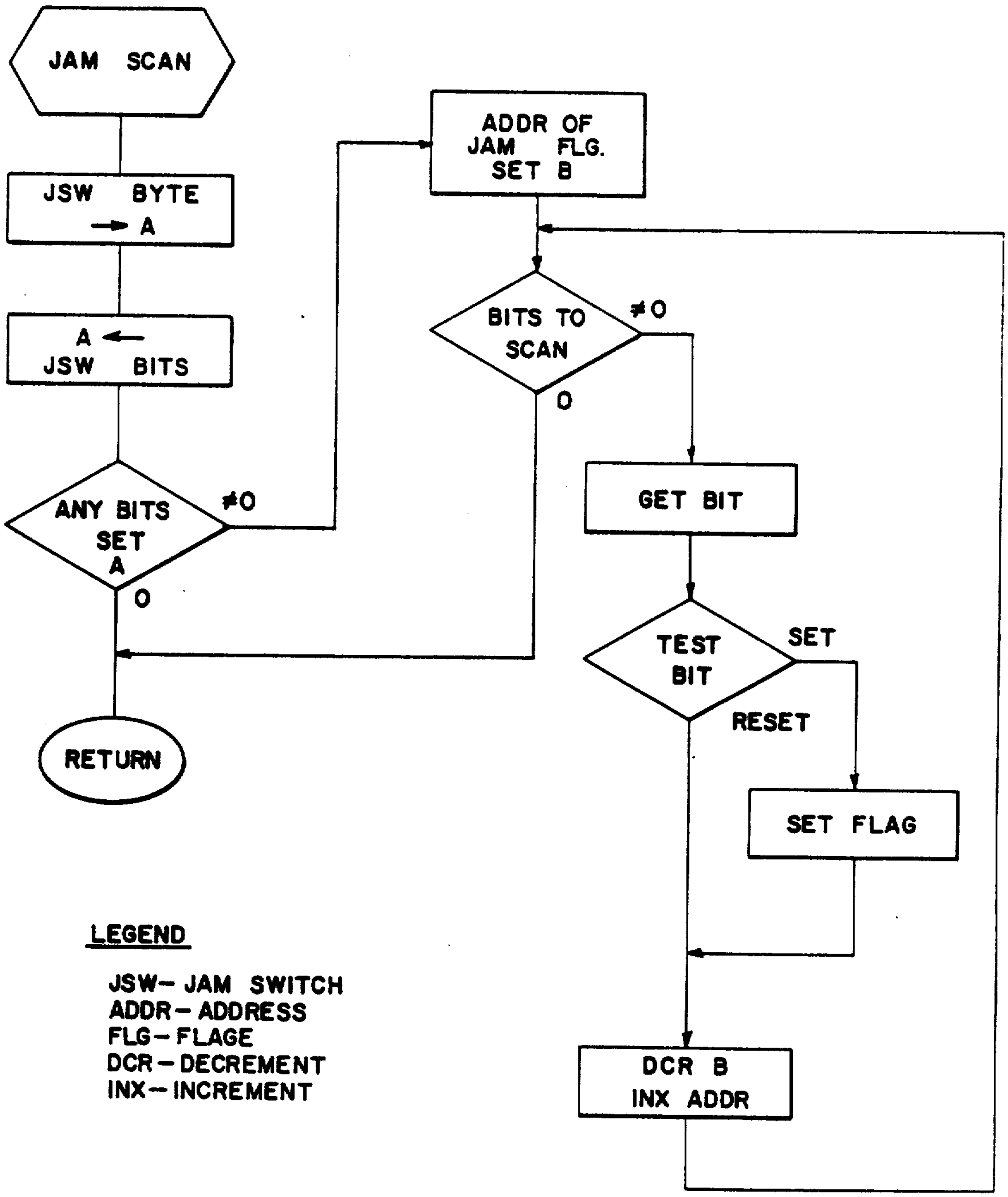
Figure 42:
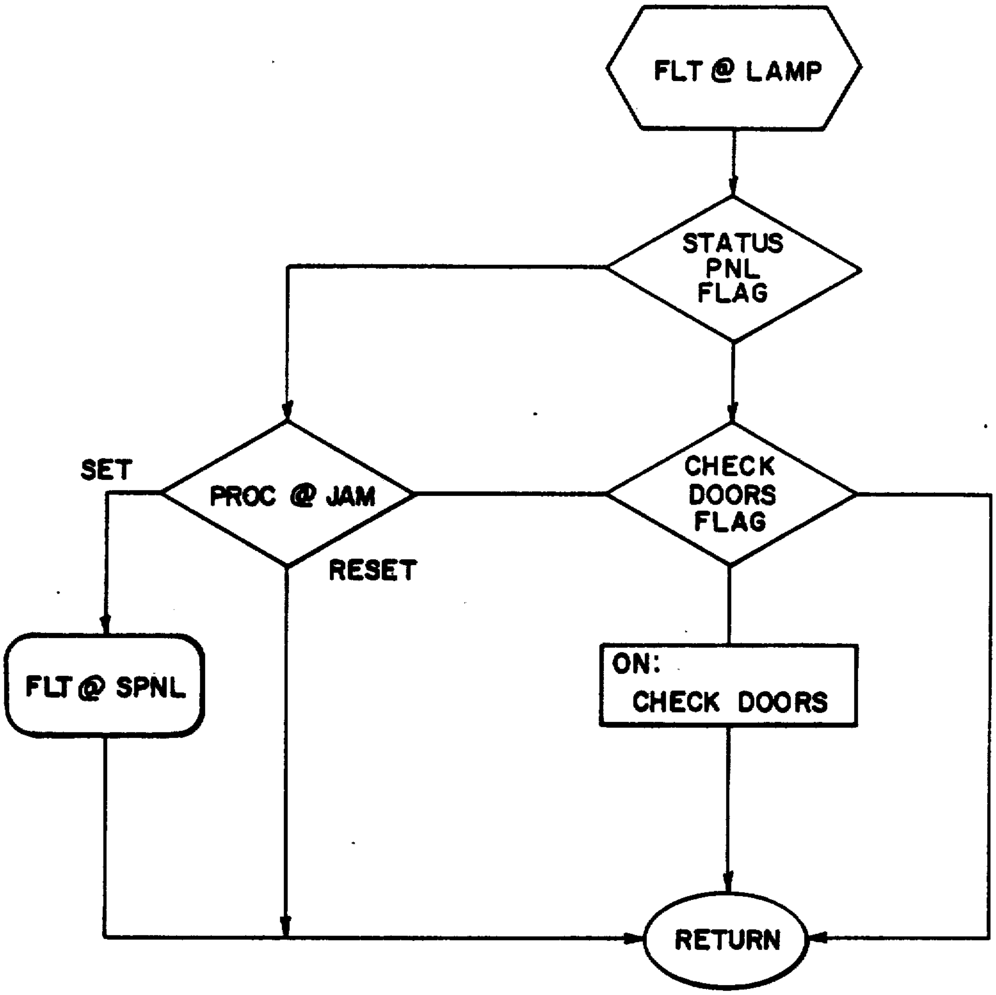
Figure 43:
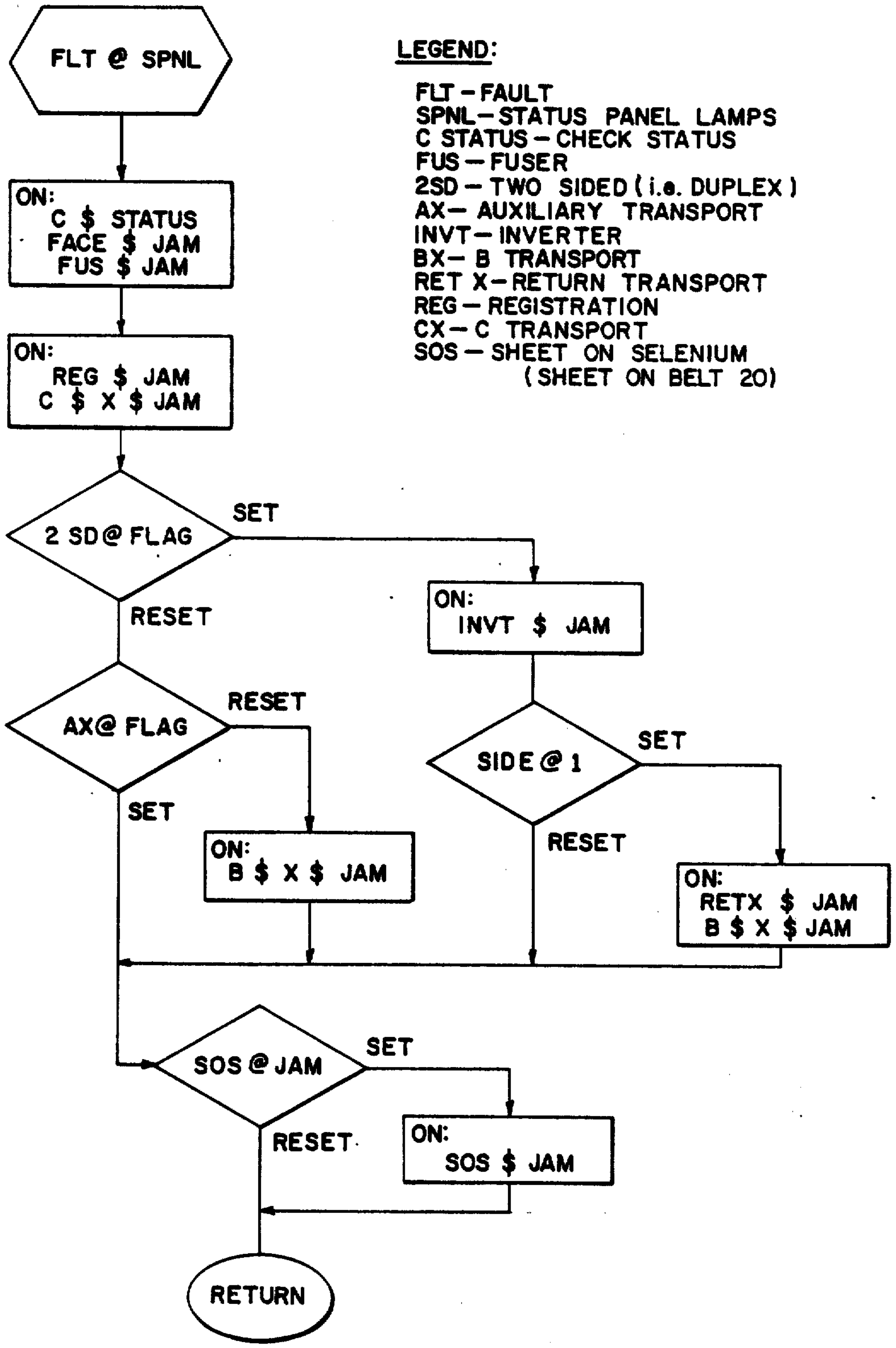
Figure 44A:
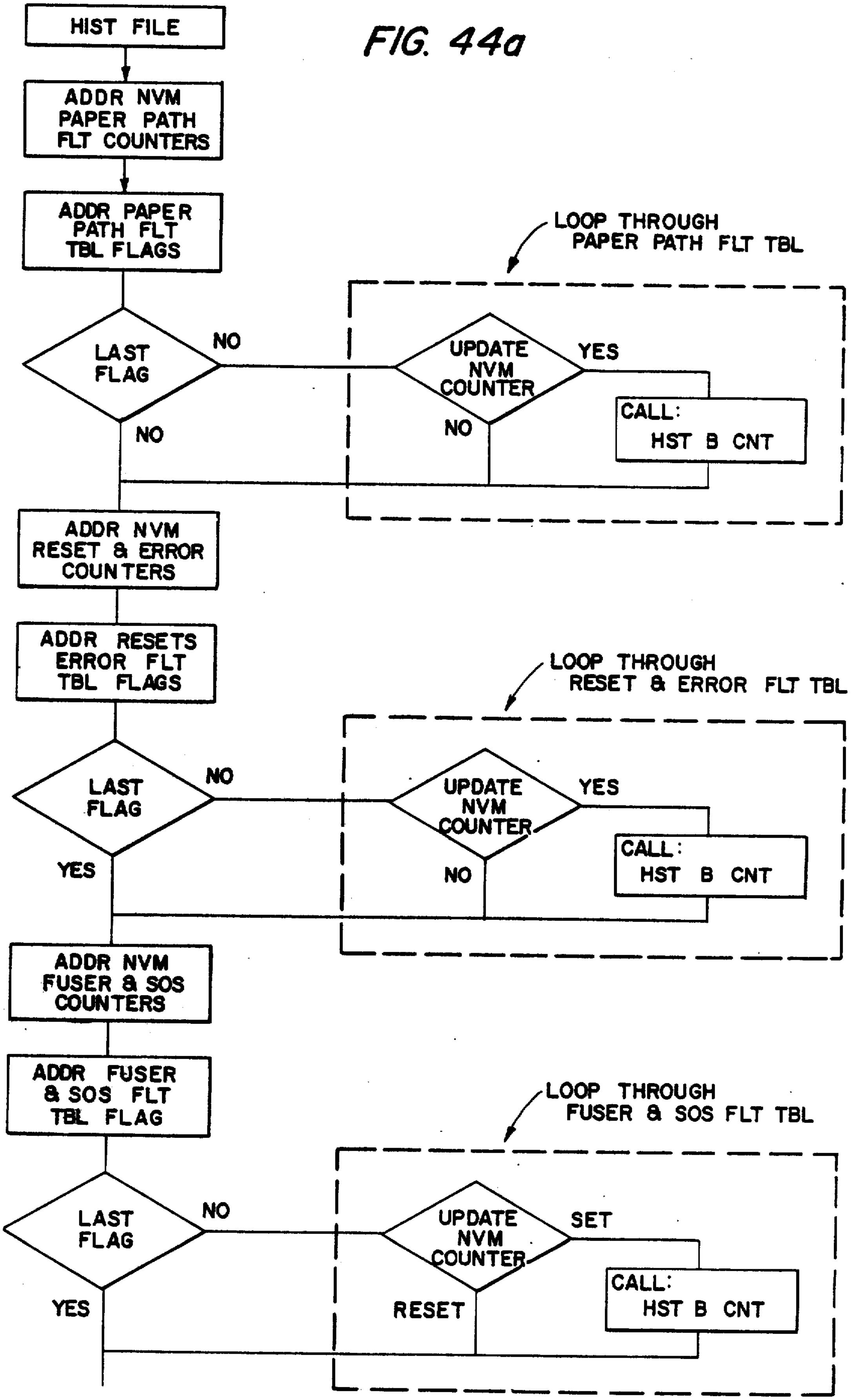
Figure 44B:
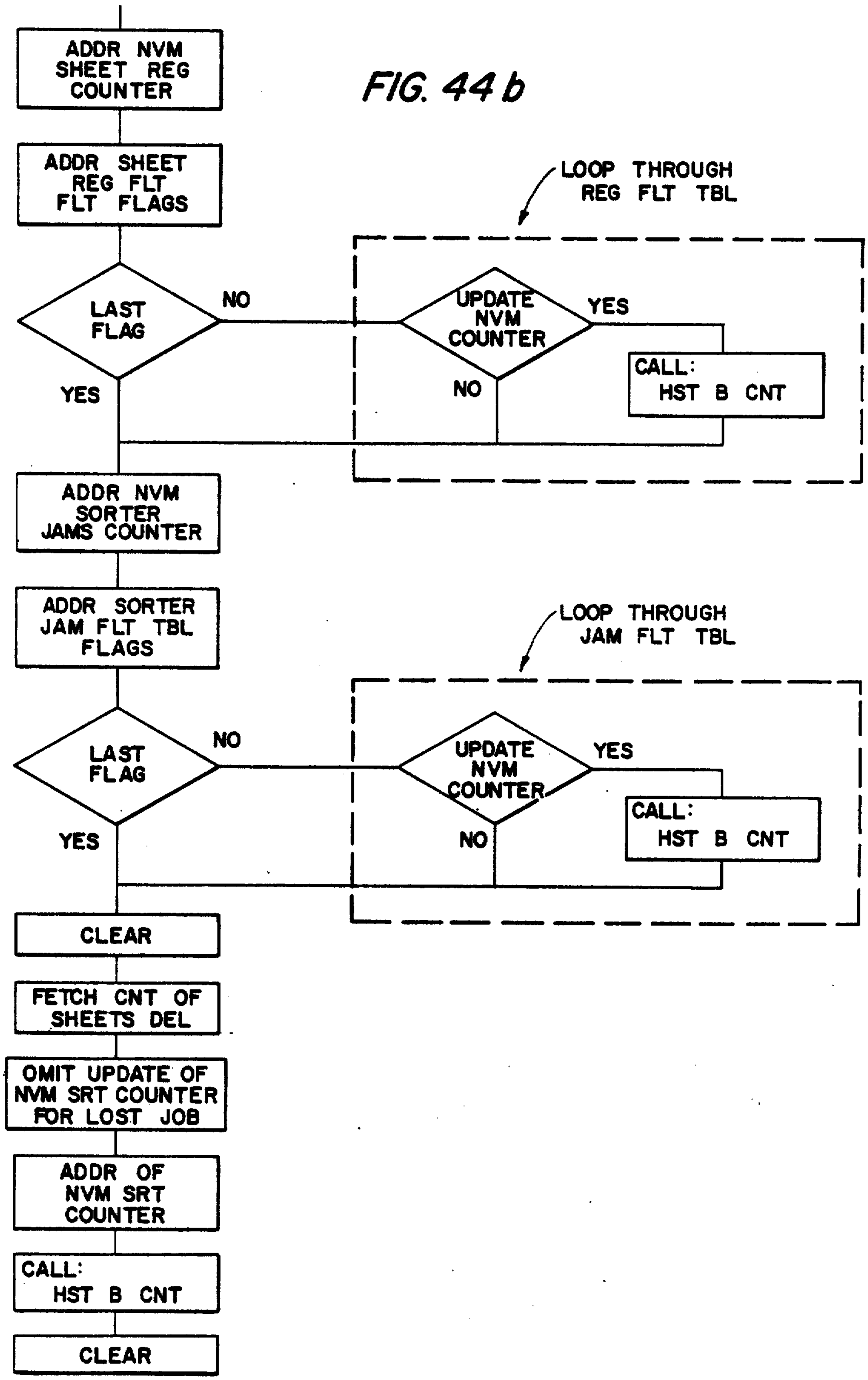
Figure 44C:
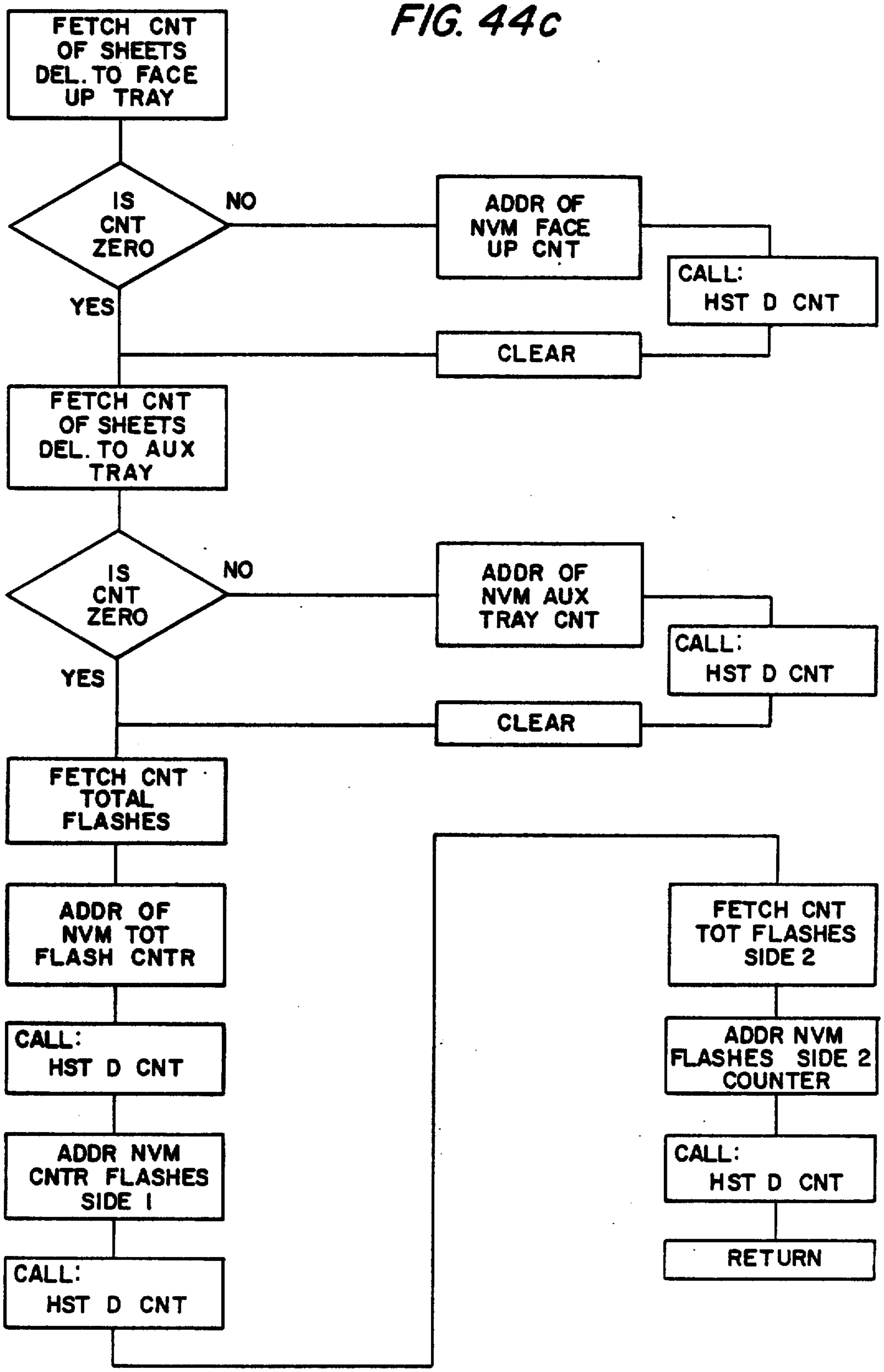
Figure 45:
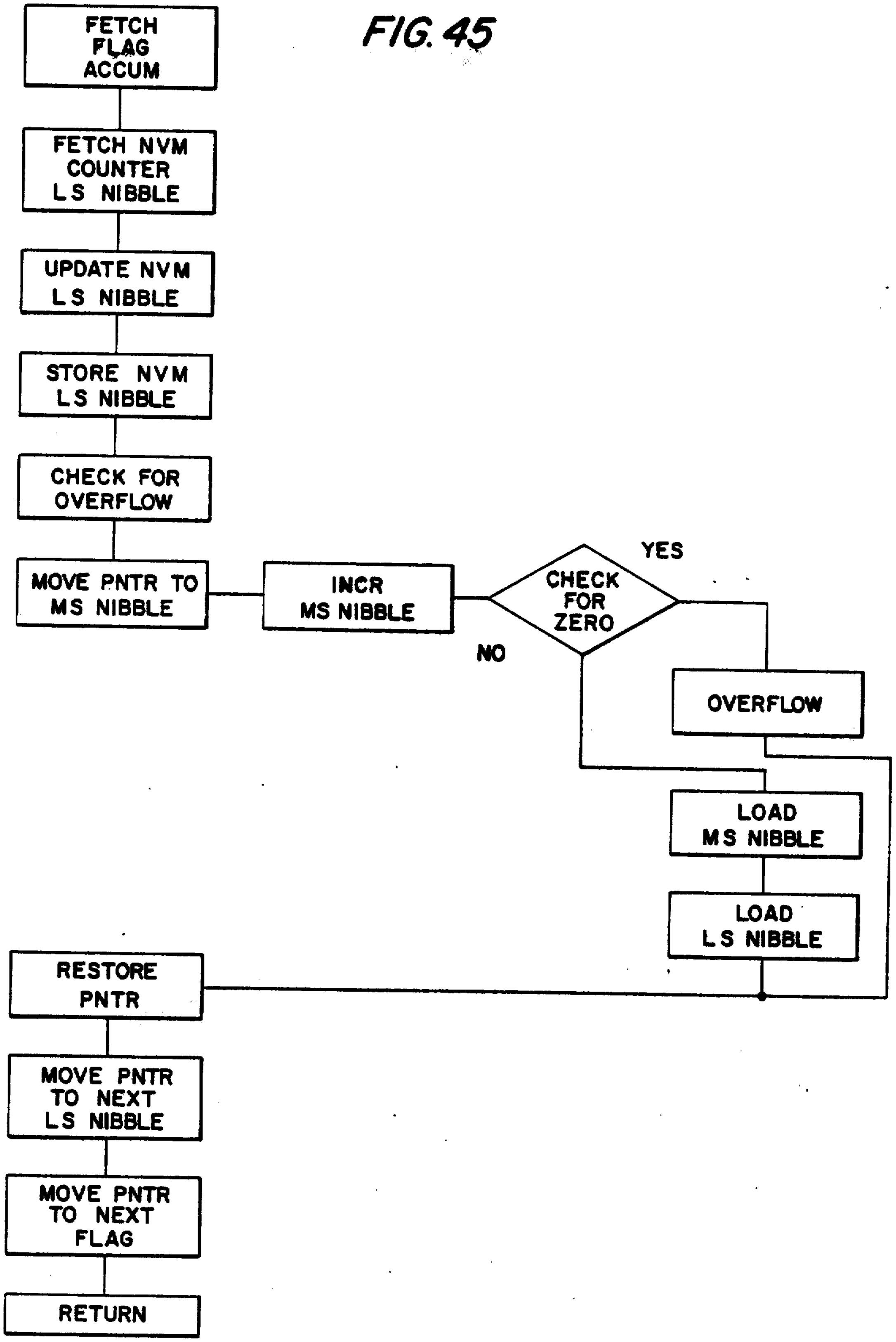

FIG. 33 is a flow chart illustrating a typical machine state;

FIG. 34*a* and 34*b* are a flow chart of the machine state routine;

FIG. 35 is a view showing the event table layout;

FIG. 36 is a flow chart of the fault scanning routine;

FIG. 37 is a flow chart of the fault display routine;

FIG. 38 is a flow chart of the cover actuated fault display routine;

FIGS. 39*a* and *b* are flow charts of the fault find routine;

FIG. 40 is a flow chart of the fault code digit fetch routine;

FIG. 41 is a flow chart of the jam scan routine;

FIG. 42 is a flow chart of the fault lamp control routine;

FIG. 43 is a flow chart of the fault status panel lamp routine;

FIGS. 44*a*, *b* and *c* are flow charts of the non-volatile memory update routine;

FIG. 45 is a flow chart of the byte counter update routine; and

Figure 46A:
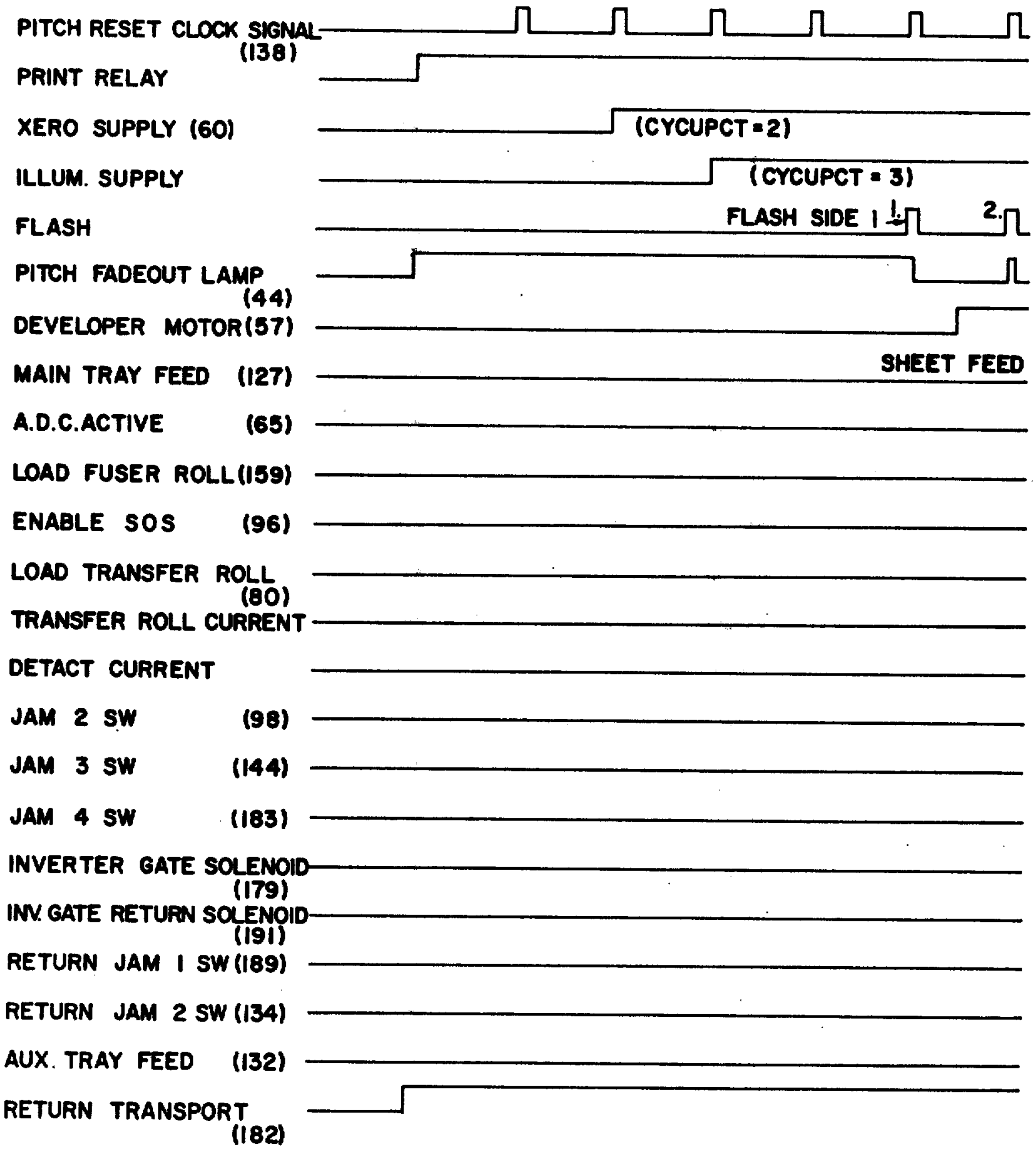
Figure 46B:
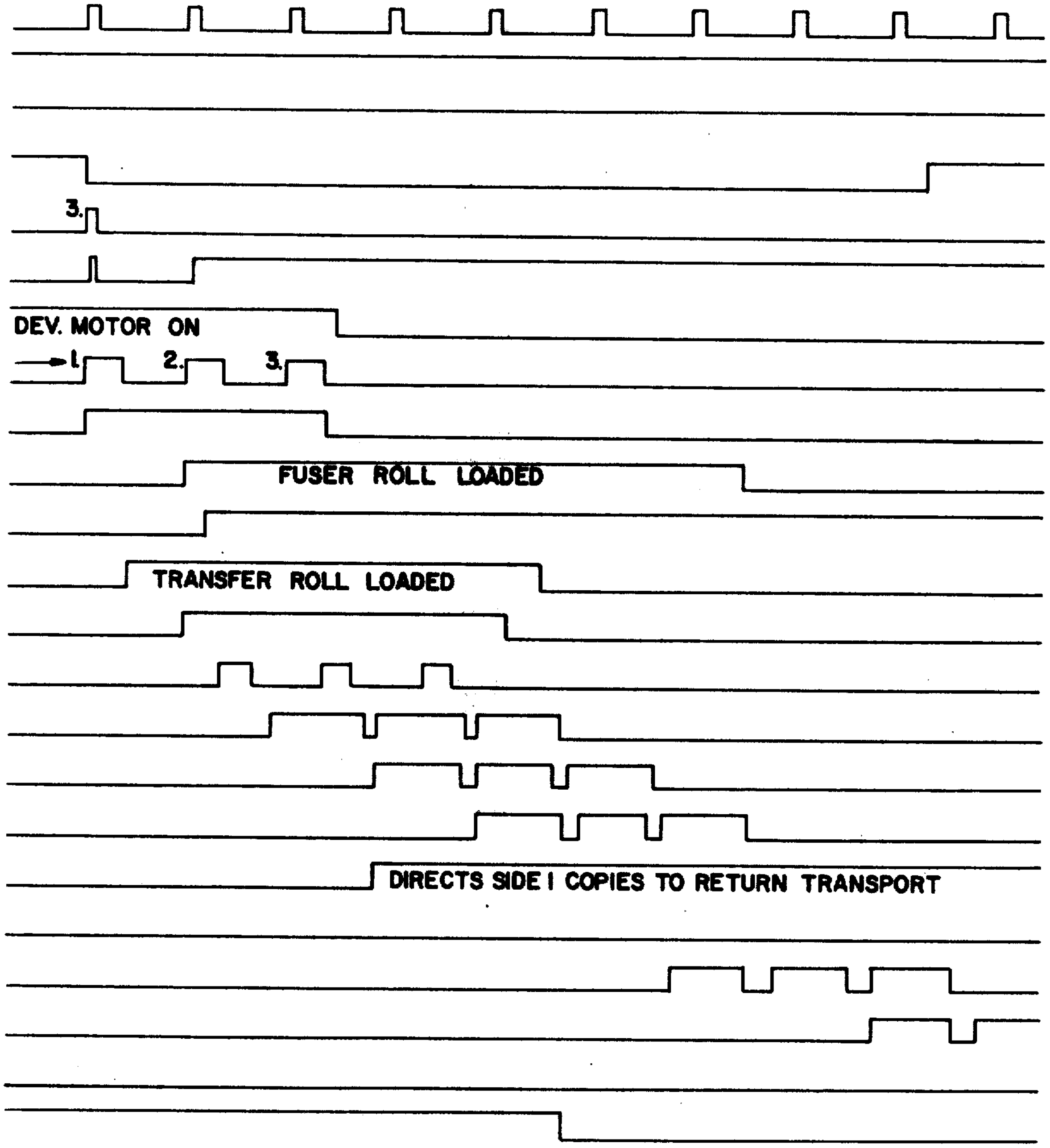
Figure 46C:
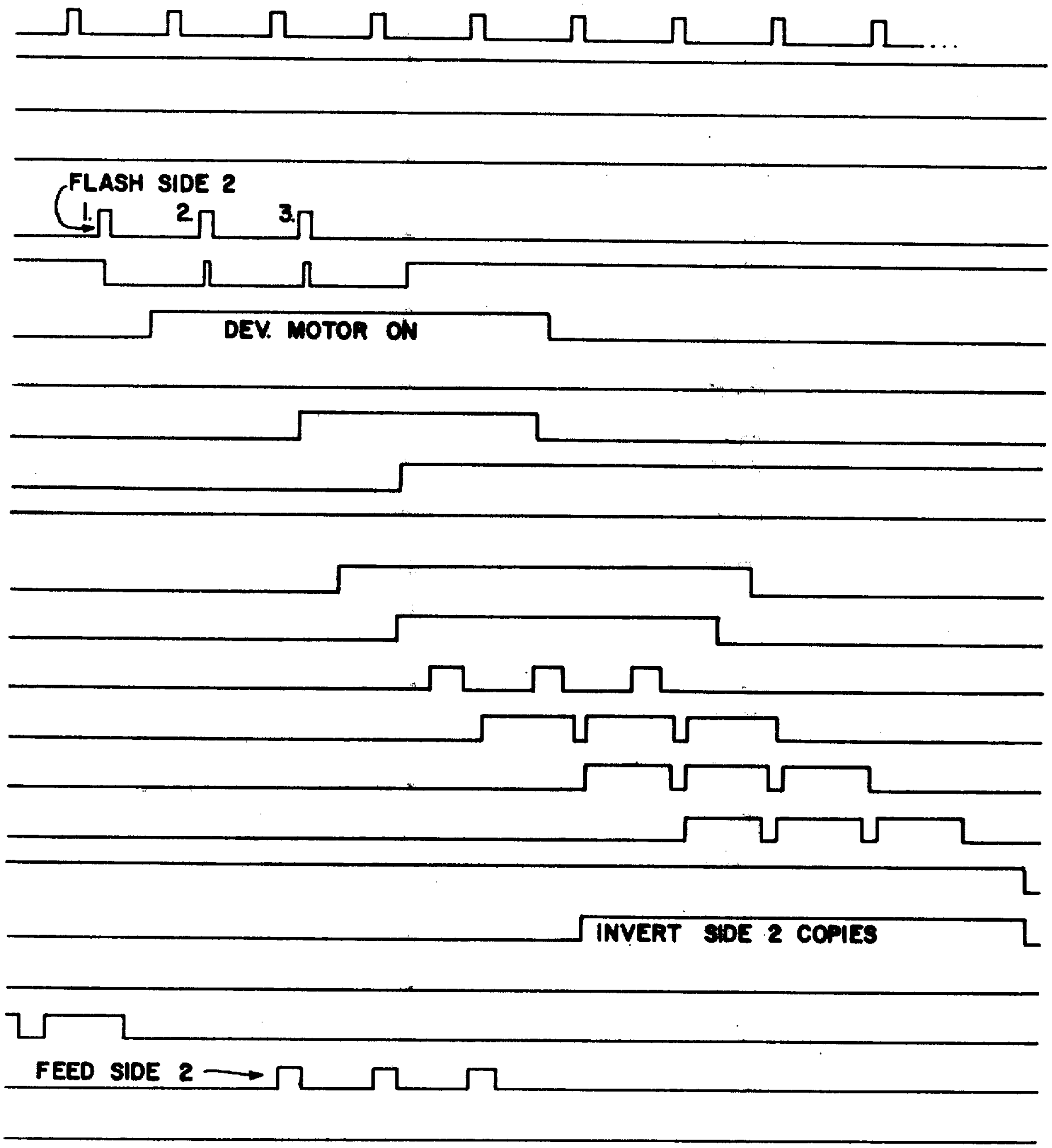

FIGS. 46*a*, *b* and *c* are timing charts illustrating an exemplary copy run.

Figure 2:
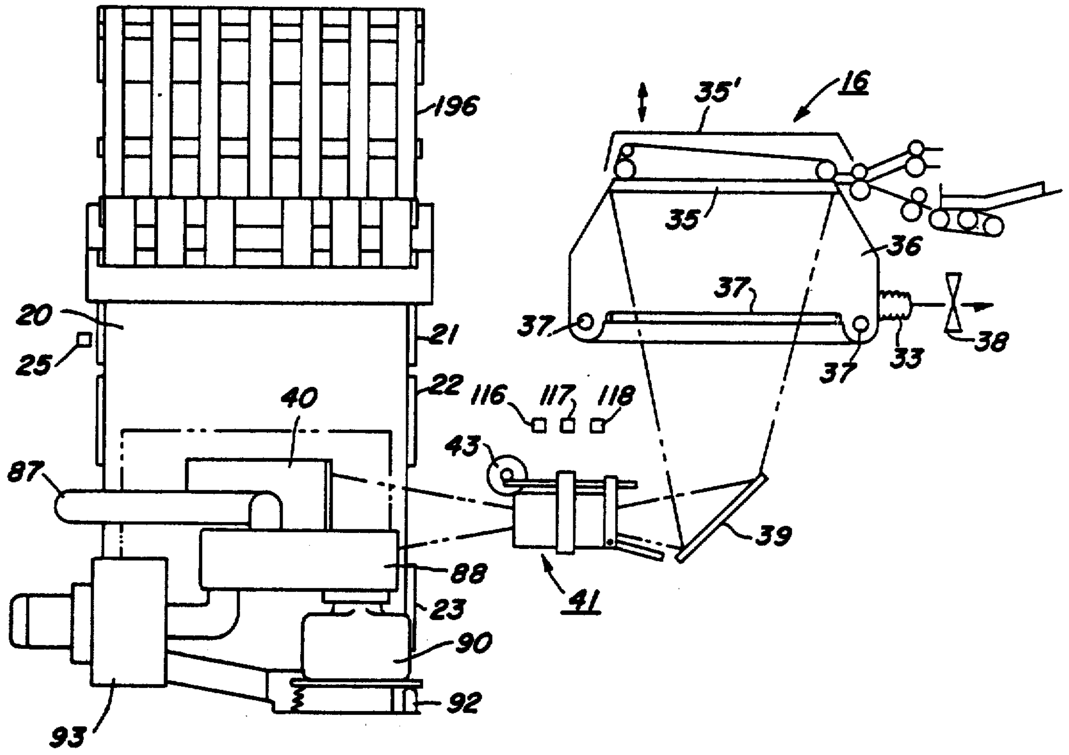
FIG. 2 is a vertical sectional view of the apparatus shown in FIG. 1*a* along the image plane.
Figure 3:
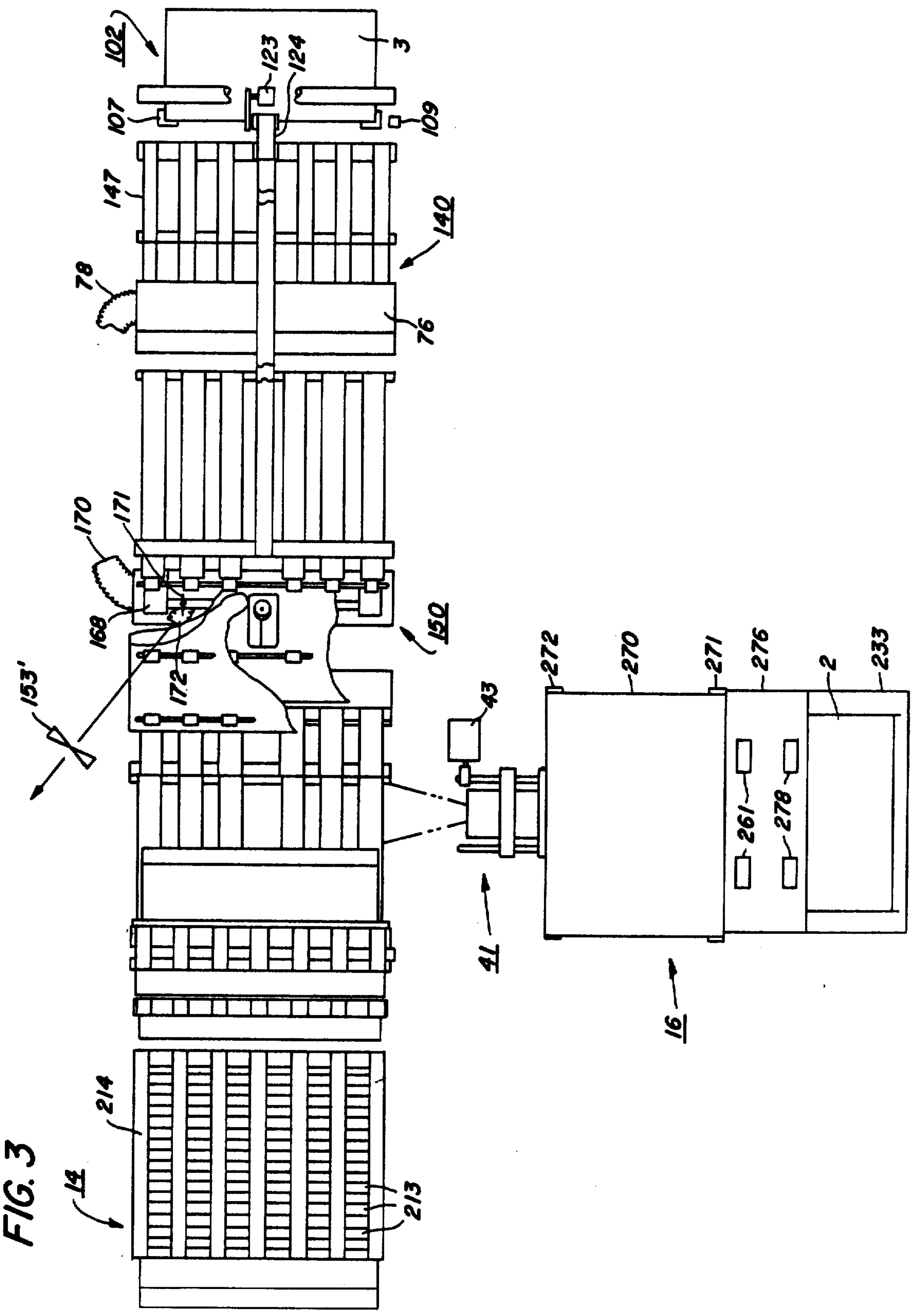
FIG. 3 is a top plane view of the apparatus shown in FIG. 31.

Referring particularly to FIGS. 1*a*, 2 and 3 of the drawings, there is shown, in schematic outline, an electrostatic reproduction system or host machine, identified by numeral 10, incorporating the control arrangement of the present invention. To facilitate description, the reproduction system 10 is divided into a main electrostatic xerographic processor 12, sorter 14, document handler 16, and controller 18. Other processor, sorter and/or document handler types and constructions, and different combinations thereof may instead be envisioned.

PROCESSOR

Processor 12 utilizes a photoreceptor in the form of an endless photoconductive belt 20 supported in generally triangular configuration by rolls 21, 22, 23. Belt supporting rolls 21, 22, 23 are in turn rotatably journaled on subframe 24.

In the exemplary processor illustrated, belt 20 comprises a photoconductive layer of selenium, which is the light receiving surface and imaging medium, on a conductive substrate. Other photoreceptor types and forms, such as comprising organic materials or of multilayers or a drum may instead be envisioned. Still other forms may comprise scroll type arrangements wherein webs of photoconductive material may be played in and out of the interior of supporting cylinders.

Figure 4:
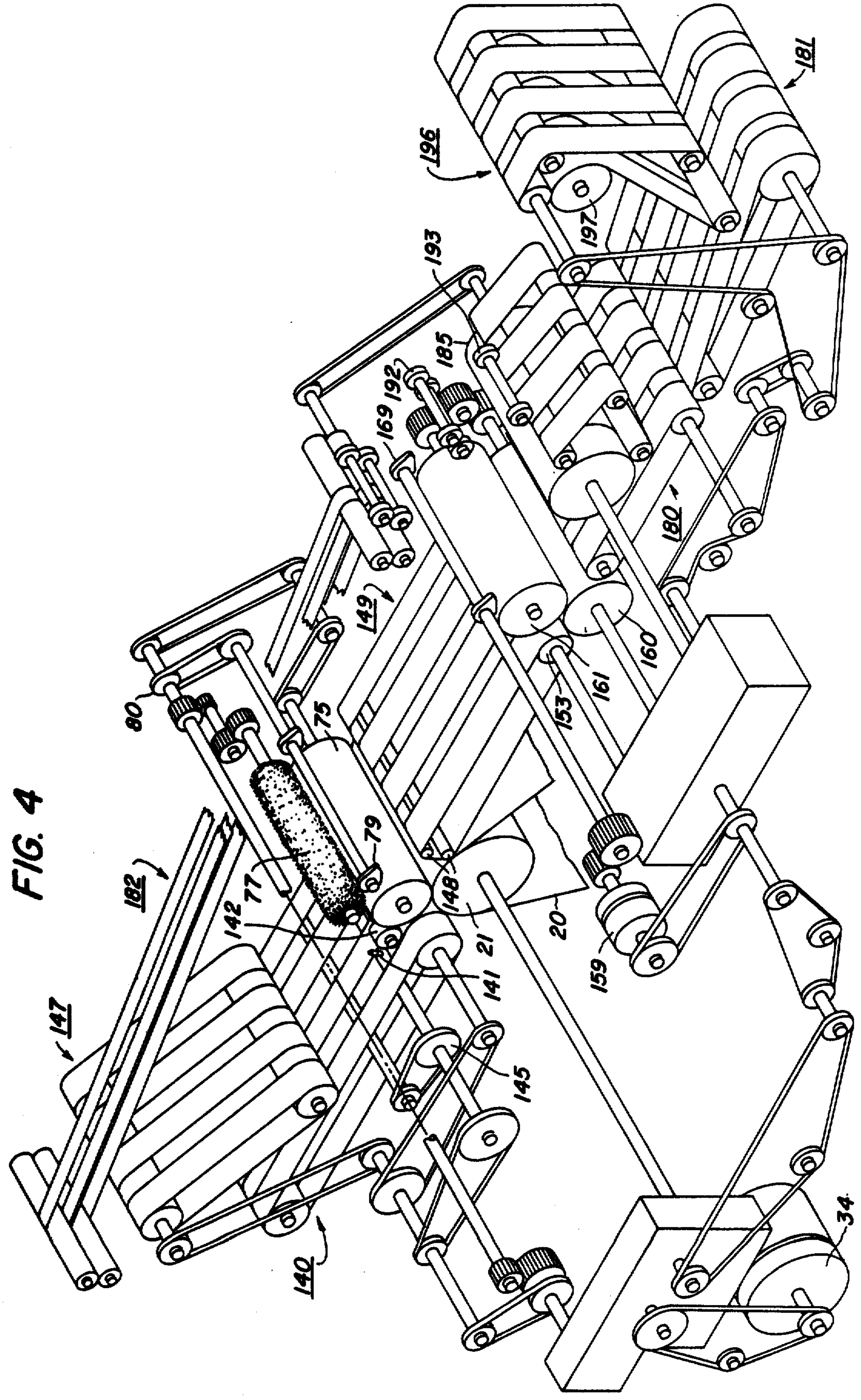
FIG. 4 is an isometric view showing the drive train for the apparatus shown in FIG. 1*a;*

Suitable biasing means (not shown) are provided on subframe 24 to tension the photoreceptor belt 20 and insure movement of belt 20 along a prescribed operating path. Belt tracking switch 25 (shown in FIG. 2) monitors movement of belt 20 from side to side. Belt 20 is supported so as to provide a trio of substantially flat belt runs opposite exposure, developing, and cleaning stations 27, 28, 29 respectfully. To enhance belt flatness at these stations, vacuum platens 30 are provided under belt 20 at each belt run. Conduits 31 communicate vacuum platens 30 with a vacuum pump 32. Photoconductive belt 20 moves in the direction indicated by the solid line arrow, drive thereto being effected through roll 21, which in turn is driven by main drive motor 34, as seen in FIG. 4.

Processor 12 includes a generally rectangular, horizontal transparent platen 35 on which each original 2 to be copied is disposed. A two or four sided illumination assembly, consisting of internal reflectors 36 and flash lamps 37 (shown in FIG. 2) disposed below and along at least two sides of platen 35, is provided for illuminating the original 2 on platen 35. To control temperatures within the illumination space, the assembly is coupled through conduit 33 with a vacuum pump 38 which is adapted to withdraw overly heated air from the space. To retain the original 2 in place on platen 35 and prevent escape of extraneous light from the illumination assembly, a platen cover may be provided.

The light image generated by the illumination system is projected via mirrors 39, 40 and a variable magnification lens assembly 41 onto the photoreceptive belt 20 at the exposure station 27. Reversible motor 43 is provided to move the main lens and add on lens elements that comprise the lens assembly 41 to different predetermined positions and combinations to provide the preselected image sizes corresponding to push button selectors 818, 819, 820 on operator module 800. (See FIG. 32) Sensors 116, 117, 118 signal the present disposition of lens assembly 41. Exposure of the previously charged belt 20 selectively discharges the photoconductive belt to produce on belt 20 an electrostatic latent image of the original 2. To prepare belt 20 for imaging, belt 20 is uniformly charged to a preselected level by charge corotron 42 upstream of the exposure station 27.

Figure 5:
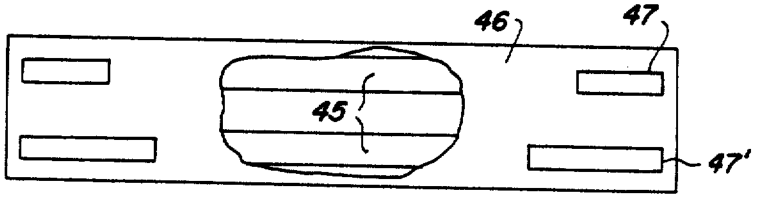
FIG. 5 is an enlarged view showing details of the photoreceptor edge fade-out mechanism for the apparatus shown in FIG. 1*a;*

To prevent development of charged but unwanted image areas, erase lamps 44, 45 are provided. Lamp 44, which is referred to herein as the pitch fadeout lamp, is supported in transverse relationship to belt 20, lamp 44 extending across substantially the entire width of belt 20 to erase (i.e. discharge) areas of belt 20 before the first image, between successive images, and after the last image. Lamps 45, which are referred to herein as edge fadeout lamps, serve to erase areas bordering each side of the images. Referring particularly to FIG. 5, edge fadeout lamps 45, which extend transversely to belt 20, are disposed within a housing 46 having a pair of transversely extending openings 47, 47' of differing length adjacent each edge of belt 20. By selectively actuating one or the other of the lamps 45, the width of the area bordering the sides of the image that is erased can be controlled.

Figure 6:
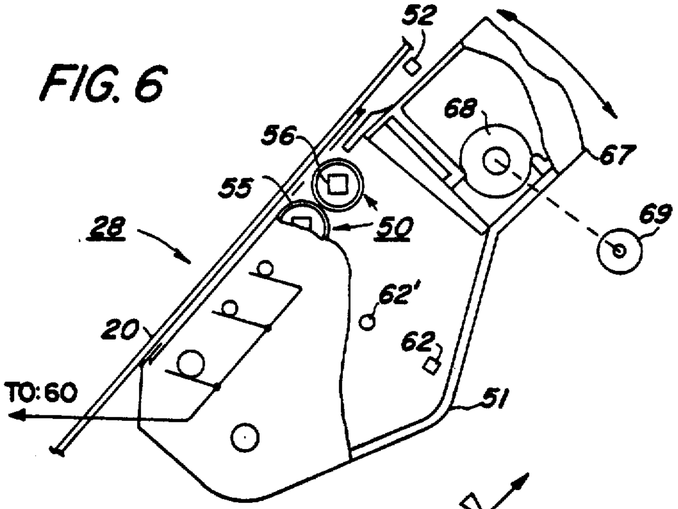
FIG. 6 is an enlarged view showing details of the developing mechanism for the apparatus shown in FIG. 1*a;*
Figure 7:
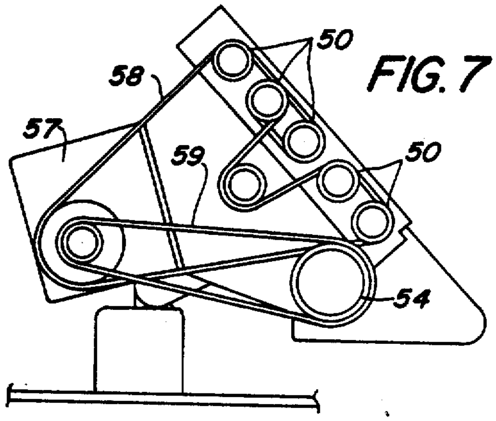
FIG. 7 is an enlarged view showing details of the developing mechanism drive.

Referring to FIGS. 1*a*, 6 and 7, magnetic brush rolls 50 are provided in a developer housing 51 at developing station 28. Housing 51 is pivotally supported adjacent the lower end thereof with interlock switch 52 to sense disposition of housing 51 in operative position adjacent belt 20. The bottom of housing 51 forms a sump within which a supply of developing material is contained. A rotatable auger 54 in the sump area serves to mix the developing material and bring the material into operative relationship with the lowermost of the magnetic brush rolls 50.

As will be understood by those skilled in the art, the electrostatically attractable developing material commonly used in magnetic brush developing appartus of the type shown comprises a pigmented resinous powder, referred to as toner, and larger granular beads referred to as carrier. To provide the necessary magentic properties, the carrier is comprised of a magnetizable material such as steel. By virtue of the magnetic fields established by developing rolls 50 and the interrelationship therebetween, a blanket of developing material is formed along the surfaces of developing rolls 50 adjacent the belt 20 and extending from one roll to another. Toner is attracted to the electrostatic latent image from the carrier bristles to produce a visible powder image on the surface of belt 20.

Magnetic brush rolls 50 each comprise a rotatable exterior sleeve 55 with relatively stationary magnet 56 inside. Sleeves 55 are rotated in unison and at substantially the same speed as belt 20 by a developer drive motor 57 through a belt and pulley arrangement 58. A second belt and pulley arrangement 59 drives auger 54.

To regulate development of the latent electrostatic images on belt 20, magnetic brush sleeves 55 are electrically biased. A suitable power supply 60 is provided for this purpose with the amount of bias being regulated by controller 18.

Figure 8:
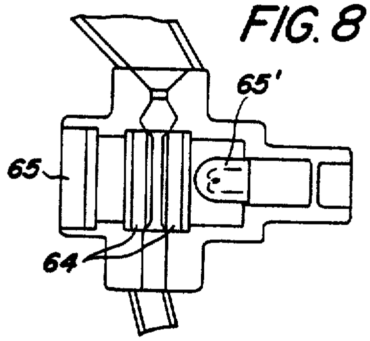
FIG. 8 is an enlarged view showing details of the developability control for the apparatus shown in FIG. 1*a;*
Figure 11:
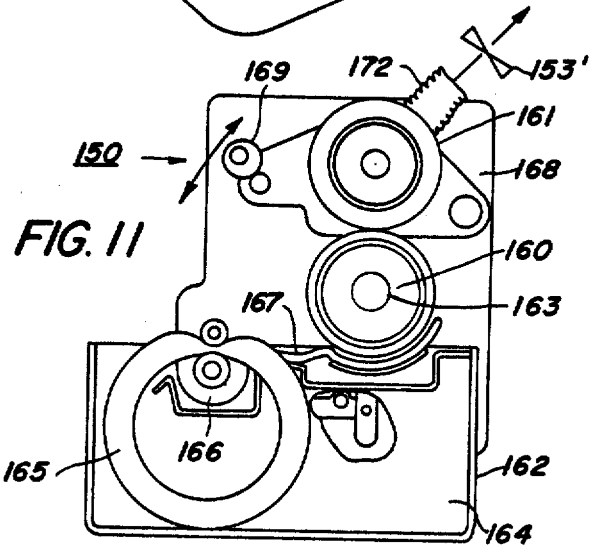
FIG. 11 is an enlarged view showing details of the fuser for the apparatus shown in FIG. 1*a;*

Developing material is returned to the upper portion of developer housing 51 for reuse and is accomplished by utilizing a photocell 62 which monitors the level of developing material in housing 51 and a photocell lamp 62' spaced opposite to the photocell 62 in cooperative relationship therewith. The disclosed machine is also provided with automatic developability control which maintains an optimum proportion of toner-to-carrier material by sensing toner concentration and replenishing toner, as needed. As shown in FIG. 8, the automatic developability control comprises a pair of transparent plates 64 mounted in spaced, parrallel arrangement in developer housing 51 such that a portion of the returning developing material passes therebetween. A suitable circuit, not shown, alternately places a charge on the plate 64 to attract toner thereto. Photocell 65 on one side of the plate pair senses the developer material as the material passes therebetween. Lamp 65' on the opposite side of plate pair 64 provides reference illumination. In this arrangement, the returning developing material is alternately attracted and repelled to and from plate 64. The accumulation of toner, i.e. density determines the amount of light transmitted from lap 62' to photocell 62. Photocell 65 monitors the density of the returning developing material with the signal output therefrom being used by controller 18 to control the amount of fresh or make-up toner to be added to developer housing 51 from toner supply container 67.

To discharge toner from container 67, rotatable dispensing roll 68 is provided in the inlet to developer housing 51. Motor 69 drives roll 68. When fresh toner is required, as determined by the signal from photocell 65, controller 18 actuates motor 69 to turn roll 68 for a timed interval. The rotating roll 68, which is comprised of a relatively porous sponge-like material, carries toner particles thereon into developer housing 51 where it is discharged. Pre-transfer corotron 70 and lamp 71 are provided downstream of magnetic brush rolls 50 to regulate developed image charges before transfer.

A magnetic pick-off roll 72 is rotatably supported opposite belt 20 downstream of pre-transfer lamp 71, roll 72 serving to scavenge leftover carrier from belt 20 preparatory to transfer of the developed image to the copy sheet 3. Motor 73 turns roll 72 in the same direction and at substantially the same speed as belt 20 to prevent scoring or scratching of belt 20. One type of magnetic pick-off roll is shown in U.S. Pat. No. 3,834,804, issued Oct. 10, 1974 to Bhagat et al.

Figure 9:
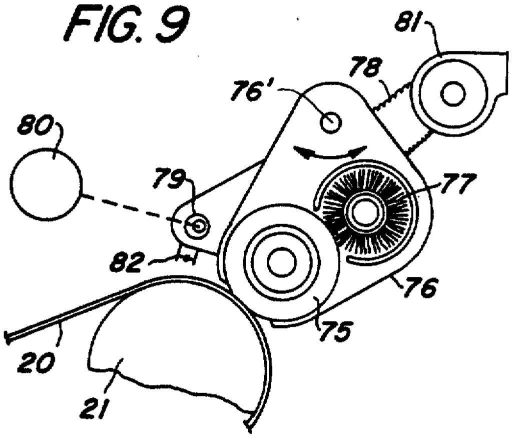
FIG. 9 is an enlarged view showing details of the transfer roll support mechanism for the apparatus shown in FIG. 1*a;*
Figure 12:
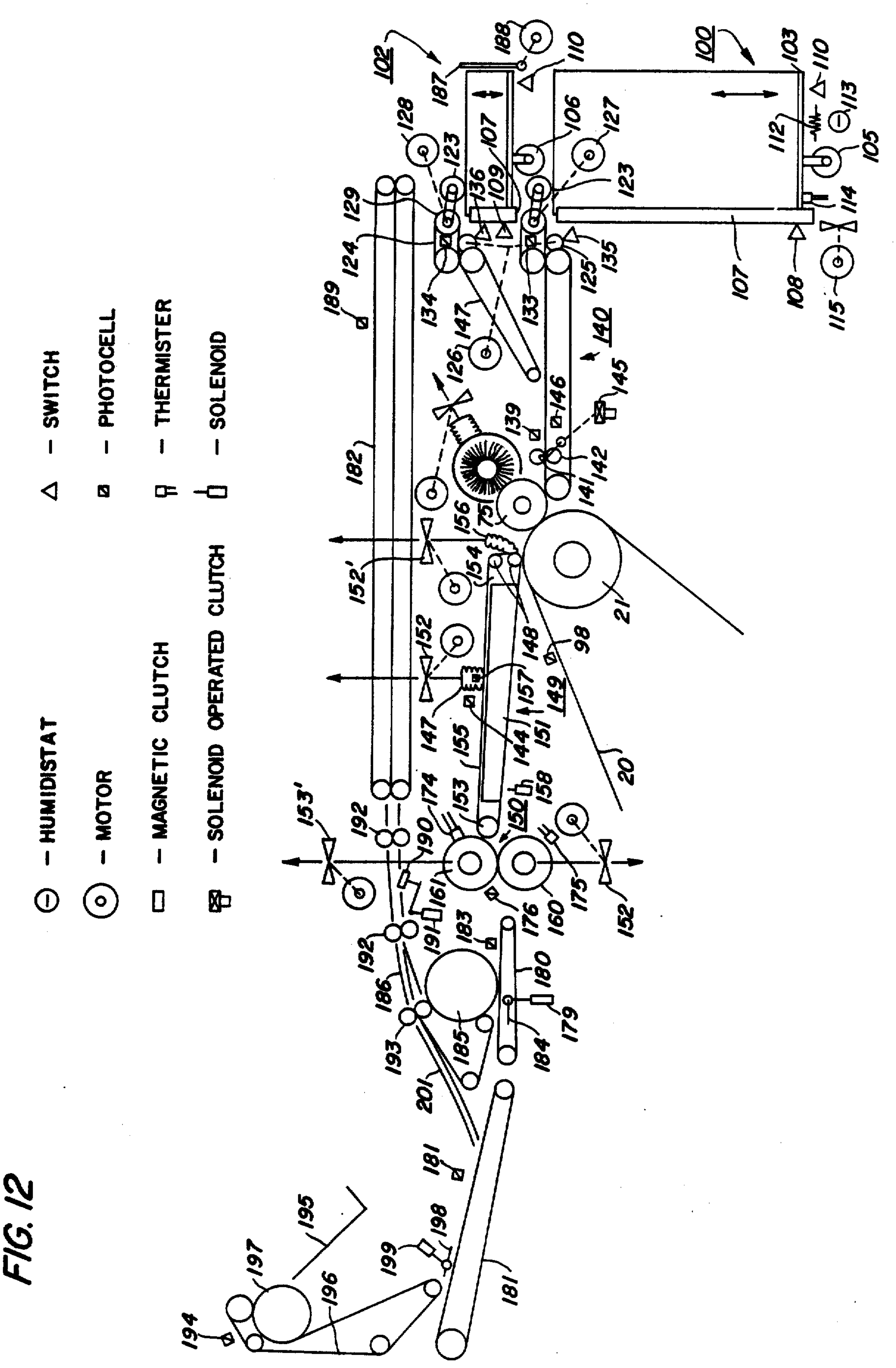
FIG. 12 is a schematic view showing the paper path and sensors of the apparatus shown in FIG. 1*a;*

Referring to FIGS. 4, 9 and 12, to transfer developed images from belt 20 to the copy sheets 3, a transfer roll 75 is provided. Transfer roll 75, which forms part of the copy sheet feed path, is rotatably supported within a transfer roll housing opposite belt support roll 21. Housing 76 is pivotally mounted to permit the transfer roll assembly to be moved into and out of operative relationship with belt 20. A transfer roll cleaning brush 77 is rotatably journalled in transfer roll housing 76 with the brush periphery in contact with transfer roll 90. Transfer roll 75 is driven through contact with belt 20 while cleaning brush 77 is coupled to main drive motor 34. To remove toner, housing 76 is connected through conduit 78 with vacuum pump 81. To facilitate and control transfer of the developed images from belt 20 to the copy sheets 3, a suitable electrical bias is applied to transfer roll 75.

To permit transfer roll 75 to be moved into and out of operative relationship with belt 20, cam 79 is provided in driving contact with transfer roll housing 76. Cam 79 is driven from motor 34 through an electromagnetically operated one revolution clutch 80. Spring means (not shown) serves to maintain housing 76 in driving engagement with cam 79.

To facilitate separation of the copy sheets 3 from belt 20 following transfer of developed images, a detack corotron 82 is provided. Corotron 82 generates a charge designed to neutralize or reduce the charges tending to retain the copy sheet on belt 20. Corotron 82 is supported on transfer roll housing 76 opposite belt 20 and downstream of transfer roll 75.

Figure 10:
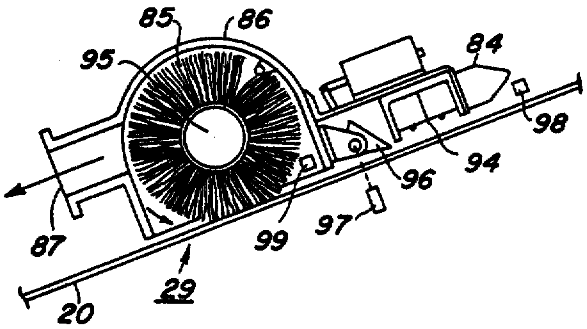
FIG. 10 is an enlarged view showing details of the photoreceptor cleaning mechanism for the apparatus shown in FIG. 1*a;*

Referring to FIGS. 1*a*, 2 and 10, to prepare belt 20 for cleaning, residual charges on belt 20 are removed by discharge lamp 84 and preclean corotron 94. A cleaning brush 85, rotatably supported within an evacuated semicircular shaped brush housing 86 at cleaning station 29, serves to remove residual developer from belt 20. Motor 95 drives brush 85, brush 85 turning in a direction opposite that of belt 20.

Vacuum conduit 87 couples brush housing 86 through a centrifugal type separator 88 with the suction side of vacuum pump 93. A final filter 89 on the outlet of motor 93 traps particles that pass through separator 88. The heavier toner particles separated by separator 88 drop into and are collected in one or more collecting bottles 90. Pressure sensor 91 monitors the condition of final filter 89 while a sensor 92 monitors the level of toner particles in collecting bottles 90.

To obviate the danger of copy sheets remaining on belt 20 and becoming entangled with the belt cleaning mechanism, a deflector 96 is provided upsteam of cleaning brush 85. Deflector 96, which is pivotally supported on the brush housing 86, is operated by solenoid 97. In the normal or off position, deflector 96 is spaced from belt 20 (the solid line position shown in the drawings). Energization of solenoid 97 pivots deflector 96 downwardly to bring the deflector leading edge into close proximity to belt 20.

Sensors 98, 99 are provided on each side of deflector 96 for sensing the presence of copy material on belt 20. A signal output from upstream sensor 98 triggers solenoid 97 to pivot deflector 96 into position to intercept the copy sheet on belt 20. The signal from sensor 98 also initiates a system shutdown cycle (mis strip jam) wherein the various operating components are, within a prescribed interval, brought to a stop. The interval permits any copy sheet present in fuser 150 to be removed, sheet trap solenoid 158 having been actuated to prevent the next copy sheet from entering fuser 150 and becoming trapped therein. The signal from sensor 99, indicating failure of deflector 96 to intercept or remove the copy sheet from belt 20, triggers an immediate or hard stop (sheet on selenium jam) of the processor. In this type of power to drive motor 34 is interrupted to bring belt 20 and the other components driven therefrom to an immediate stop.

Referring particularly to FIGS. 1a and 12, copy sheets 3 comprise precut paper sheets supplied from either main or auxiliary paper trays 100, 102. Each paper tray has a platform or base 103 for supporting in stack like fashion a quantity of sheets. The tray platforms 103 are supported for vertical up and down movement as motors 105, 106. Side guide pairs 107, in each tray 100, 102 delimit the tray side boundaries, the guide pairs being adjustable toward and away from one another in accommodation of different size sheets. Sensors 108, 109 respond to the position of each side guide pair 107, the output of sensors 108, 109 serving to regulate operation of edge fadeout lamps 45 and fuser cooling valve 171. Lower limit switches 110 on each tray prevent overtravel of the tray platform in a downward direction.

A heater 112 is provided below the platform 103 of main tray 100 to warm the tray area and enhance feeding of sheets therefrom. Humidstat 113 and thermostat 114 control operation of heater 112 in response to the temperature/humidity conditions of main tray 100. Fan 115 is provided to circulate air within tray 100.

To advance the sheets 3 from either main or auxiliary tray 100, 102, main and auxiliary sheet feeders 120, 121 are provided. Feeders 120, 121 each include a nudger roll 123 to engage and advance the topmost sheet in the paper tray forward into the nip formed by a feed belt 124 and retard roll 125. Retard rolls 125, which are driven at an extremely low speed by motor 126, cooperate with feed belts 124 to restrict feeding of sheets from trays 100, 102 to one sheet at a time.

Feed belts 124 are driven by main and auxiliary sheet feed motors 127, 128 respectively. Nudger rolls 123 are supported for pivotal movement about the axis of feed belt drive shaft 129 with drive to the nudger rolls taken from drive shaft 129. Stack height sensors 133, 134 are provided for the main and auxiliary trays, the pivoting nudger rolls 123 serving to operate sensors 133, 134 in response to the sheet stack height. Main and auxiliary tray misfeed sensors 135, 136 are provided at the tray outlets.

Main transport 140 extends from main paper tray 100 to a point slightly upstream of the nip formed by photoconductive belt 20 and transfer roll 75. Transport 140 is driven from main motor 34. To register sheets 3 with the images developed on belt 20, sheet register fingers 141 are provided, fingers 141 being arranged to move into and out of the path of the sheets on transport 140 once each revolution. Registration fingers 141 are driven from main motor 34 through electromagnetic clutch 145. A timing or reset switch 146 is set once on each revolution of sheet register fingers 141. Sensor 139 monitors transport 140 for jams. Further amplification of sheet register system may be found in U.S. Pat. No. 3,781,004, issued Dec. 25, 1973 to Buddendeck et al.

Pinch roll pair 142 is interspaced between transport belts that comprise main transport 140 on the downstream side of register fingers 141. Pinch roll pair 142 are driven from main motor 34.

Auxiliary transport 147 extends from auxiliary tray 102 to main transport 140 at a point upstream of sheet register fingers 141. Transport 147 is driven from motor 34.

To maintain the sheets in driving contact with the belts of transports 140, 147, suitable guides or retainers (not shown) may be provided along the belt runs.

The image bearing sheets leaving the nip formed by photoconductive belt 20 and transfer roll 75 are picked off by belts 155 of the leading edge of vacuum transport 149. Belts 155, which are perforated for the admission of vacuum therethrough, ride on forward roller pair 148 and rear roll 153. A pair of internal vacuum plenums 151, 154 are provided, the leading plenum 154 cooperating with belts 155 to pick up the sheets leaving the belt/transfer roll nip. Transport 149 conveys the image bearing sheets to fuser 150. Vacuum conduits 147, 156 communicate plenums 151, 154 with vacuum pump 152. A pressure sensor 157 monitors operation of vacuum pump 152. Sensor 144 monitors transport 149 for jams.

To prevent the sheet on transport 149 from being carried into fuser 150 in the event of a jam or malfunction, a trap solenoid 158 is provided below transport 149. Energization of solenoid 158 raises the armature thereof into contact with the lower face of plenum 154 to intercept and stop the sheet moving therepast.

Referring particulary to FIGS. 4, 10 and 12, fuser 150 comprises a lower heated fusing roll 160 and upper pressure roll 161. Rolls 160, 161 are supported for rotation in fuser housing 162. The core of fusing roll 160 is hollow for receipt of heating rod 163 therewithin.

Housing 162 includes a sump 164 for holding a quantity of liquid release agent, herein termed oil. Dispensing belt 165, moves through sump 164 to pick up the oil, belt 165 being driven by motor 166. A blanket-like wick 167 carries the oil from belt 165 to the surface of fusing roll 160.

Pressure roll 161 is supported within an upper pivotal section 168 of housing 162. This enables pressure roll 161 to be moved into and out of operative contact fusing roll 160. Cam shaft 169 in the lower portion of fuser housing 162 serves to move housing section 168 and pressure roll 161 into operative relationship with fusing roll 160 against a suitable bias (not shown). Cam shaft 169 is coupled to main motor 34 through an electromagnetically operated one revolution clutch 159.

Fuser section 168 is evacuated, conduit 170 coupling housing section 168 with vacuum pump 152. The ends of housing section 168 are separated into vacuum compartments opposite the ends of pressure roll 161 thereunder to cool the roll ends where smaller size copy sheets 3 are being processed. Vacuum valve 171 in conduit 172 regulates communication of the vacuum compartments with vacuum pump 152 in response to the size sheets as sensed by side guide sensors 108, 109 in paper trays 100, 102.

Fuser roll 160 is driven from main motor 34. Pressure roll 161 is drivingly coupled to fuser roll 160 for rotation therewith.

Thermostat 174 in fuser housing 162 controls operation of heating rod 163 in response to temperature. Sensor 175 protects against fuser over-temperature. To protect against trapping of a sheet in fuser 150 in the event of a jam, sensor 176 is provided.

Following fuser 150, the sheet is carried by post fuser transport 180 to either discharge transport 181 or, where duplex or two sided copies are desired, to return transport 182. Sheet sensor 183 monitors passage of the sheets from fuser 150. Transports 180, 181 are driven from main motor 34. Sensor 181' monitors transport 181 for jams. Suitable retaining means may be provided to retain the sheets on transports 180, 181.

A deflector 184, when extended routes sheets on transport 180 onto conveyor roll 185 and into chute 186 leading to return transport 182. Solenoid 179, when energized raises deflector 184 into the sheet path. Return transport 182 carries the sheets back to auxiliary tray 102. Sensor 189 monitors transport 182 for jams. The forward stop 187 of tray 102 are supported for oscillating movement. Motor 188 drives stop 187 to oscillate stops 187 back and forth and tap sheets returned to auxiliary tray 102 into alignment for refeeding.

To invert duplex copy sheets following fusing of the second or duplex image, a displaceable sheet stop 190 is provided adjacent the discharge end of chute 186. Stop 190 is pivotally supported for swinging movement into and out of chute 186. Solenoid 191 is provided to move stop 190 selectively into or out of chute 186. Pinch roll pairs 192, 193 serve to draw the sheet trapped in chute 186 by stop 190 and carry the sheet forward onto discharge transport 181. Further description of the inverter mechanism may be found in U.S. Pat. No. 3,856,295, issued Dec. 24, 1974, to John H. Looney.

Output tray 195 receives unsorted copies. Transport 196 a portion of which is wrapped around a turn around roll 197, serves to carry the finished copies to tray 195. Sensor 194 monitors transport 196 for jams. To route copies into output tray 105, a deflector 198 is provided. Deflector solenoid 199, when energized, turns deflector 198 to intercept sheets on conveyor 181 and route the sheets onto conveyor 196.

When output tray 195 is not used, the sheets are carried by conveyor 181 to sorter 14.

SORTER

Figure 13:
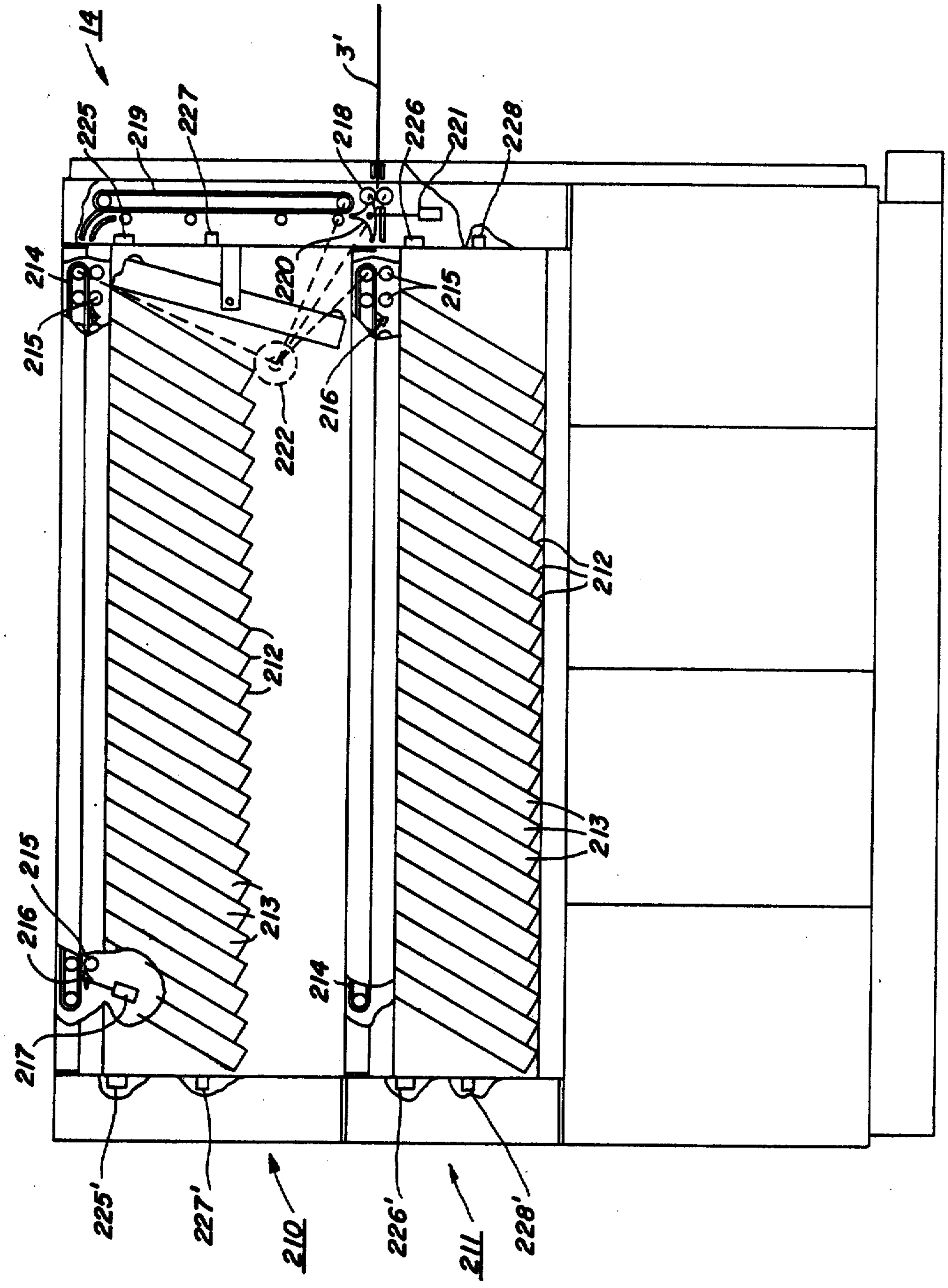
FIG. 13 is an enlarged view showing details of the copy sorter for the apparatus shown in FIG. 1*a;*

Referring particularly to FIG. 13, sorter 14 comprises upper and lower bin arrays 210, 211. Each bin array 210, 211 consists of series of spaced downwardly inclined trays 212, forming a series of individual bins 213 for receipt of finished copies 3'. Conveyors 214 along the top of each bin array, cooperate with idler rolls 215 adjacent the inlet to each bin to transport the copies into juxtaposition with the bins. Individual deflectors 216 at each bin cooperate, when depressed, with the adjoining idler roll 215 to turn the copies into the bin associated therewith. An operating solenoid 217 is provided for each deflector.

A driven roll pair 218 is provided at the inlet to sorter 14. A generally vertical conveyor 219 serves to bring copies 3' to the upper bin array 210. Entrance deflector 220 routes the copies selectively to either the upper or lower bin array 210, 211 respectively. Solenoid 221 operates deflector 220.

Motor 222 is provided for each bin array to drive the conveyors 214 and 219 of upper bin array 210 and conveyor 214 of lower bin array 211. Roll pair 218 is drivingly coupled to both motors.

To detect entry of copies 3' in the individual bins 213, a photoelectric type sensor 225, 226 is provided at one end of each bin array 210, 211 respectively. Sensor lamps 225', 226' are disposed adjacent the other end of the bin array. To detect the presence of copies in the bins 213, a second set of photoelectric type sensors 227, 228 is provided for each bin array, on a level with tray cutout 229. Reference lamps 227', 228' are disposed opposite sensors 227, 228.

DOCUMENT HANDLER

Figure 14:
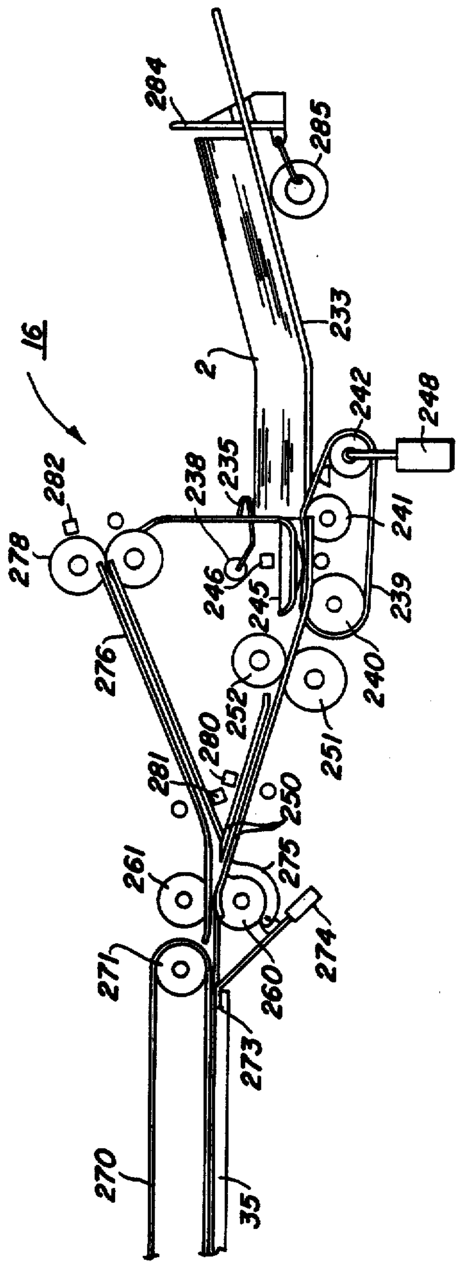
FIG. 14 is a schematic view showing details of the document handler for the apparatus shown in FIG. 1*a;*
Figure 15:
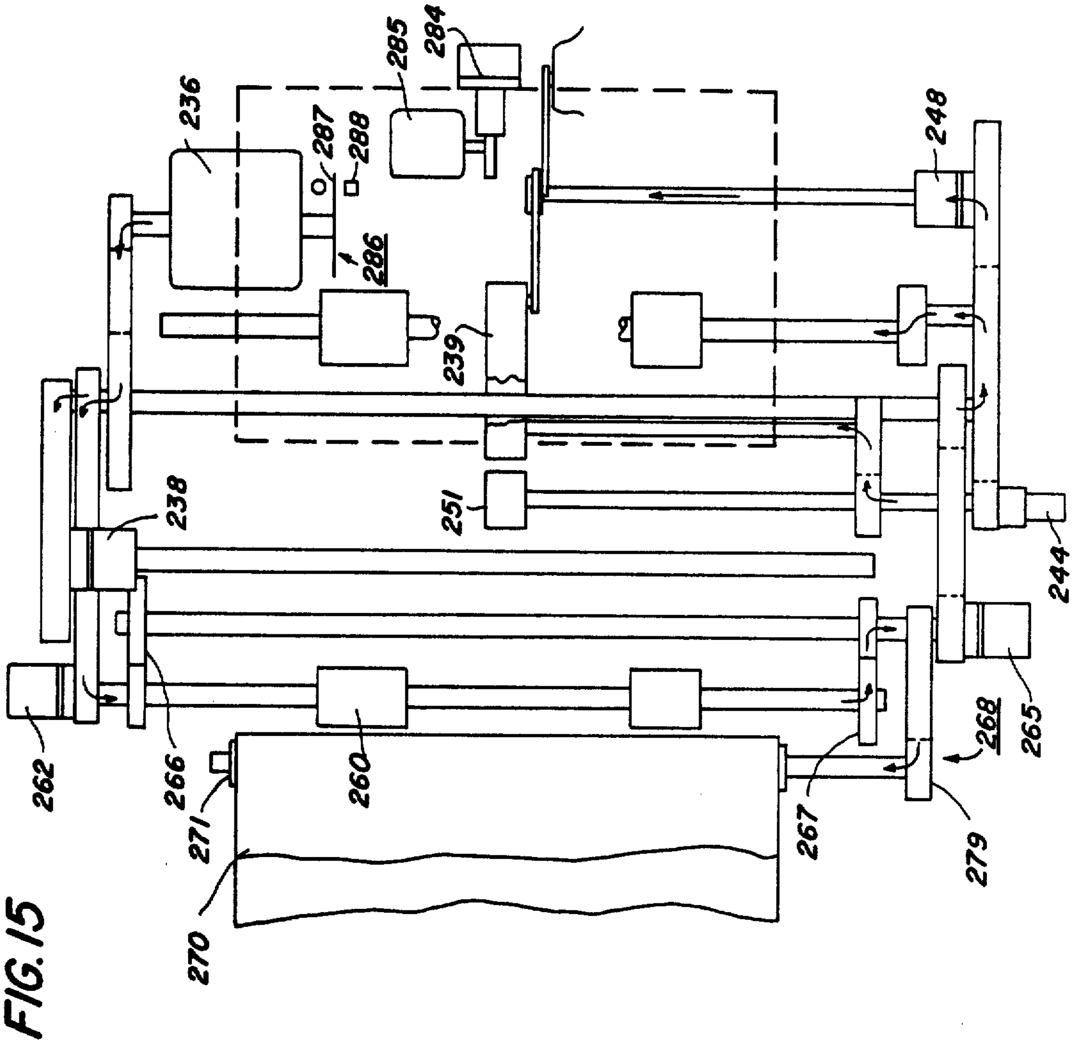
FIG. 15 is a view showing details of the drive mechanism for the document handler shown in FIG. 14.

Referring particularly to FIGS. 14 and 15, document handler 16 includes a tray 233 into which originals or documents 2 to be copied are placed by the operator following which a cover (not shown) is closed. A movable bail or separator 235, driven in an oscillatory path from motor 236 through a solenoid operated one revolution clutch 238, is provided to maintain document separation.

A document feed belt 239 is supported on drive and idler rolls 240, 241 and kicker roll 242 under tray 233, tray 233 being suitably apertured to permit the belt surface to project therewithin. Feed belt 239 is driven by motor 236 through electromagnetic clutch 244. Guide 245, disposed near the discharge end of feed belt 239, cooperates with belt 239 to form a nip between which the documents pass.

A photoelectric type sensor 246 is disposed adjacent the discharge end of belt 239. Sensor 246 responds on failure of a document to feed within a predetermined interval to actuate solenoid operated clutch 248 which raises kicker roll 242 and increase the surface area of feed belt 239 in contact with the documents.

Document guides 250 route the document fed from tray 233 via roll pair 251, 252 to platen 35. Roll 251 is drivingly coupled to motor 236 through electromagnetic clutch 244. Contact of roll 251 with roll 252 turns roll 252.

Roll pair 260, 261 at the entrance to platen 35 advance the document onto platen 35, roll 260 being driven through electromagnetic clutch 262 in the forward direction. Contact of roll 260 with roll 261 turns roll 261 in the document feeding direction. Roll 260 is selectively coupled through gearset 268 with motor 236 through electromagnetic clutch 265 so that on engagement of clutch 265 and disengagement of clutch 262, roll 260 and roll 261 therewith turn in the reverse direction to carry the document back to tray 233. One way clutches 266, 267 permit free wheeling of the roll drive shafts.

The document leaving roll pair 260, 261 is carried by platen feed belt 270 onto platen 35, belt 270 being comprised of a suitable flexible material having an exterior surface of xerographic white. Belt 270 is carried about drive and idler rolls 271, 272. Roll 271 is drivingly coupled to motor 236 for rotation in either a forward or reverse direction through clutches 262, 265. Engagement of clutch 262 operates through belt and pulley drive 279 to drive belt in the forward direction, engagement of clutch 265 operates through drive 279 to drive belt 270 in the reverse direction.

To locate the document in predetermined position on platen 35, a register 273 is provided at the platen inlet for engagement with the document trailing edge. For this purpose, control of platen belt 270 is such that following transporting of the document onto plate 35 and beyond register 273, belt 270 is reversed to carry the document backwards against register 273.

To remove the document from platen 35 following copying, register 273 is retracted to an inoperative position. Solenoid 274 is provided for moving register 273.

A document deflector 275, is provided to route the document leaving platen 35 into return chute 276. For this purpose, platen belt 270 and pinch roll pair 260, 261 are reversed through engagement of clutch 265. Discharge roll pair 278, driven by motor 236, carry the returning document into tray 233.

To monitor movement of the documents in document handler 16 and detect jams and other malfunctions, photoelectric type sensors 246 and 280, 281 and 282 are disposed along the document routes.

To align documents 2 returned to tray 233, a document patter 284 is provided adjacent one end of tray 233. Patter 284 is oscillated by motor 285.

Figure 1B:
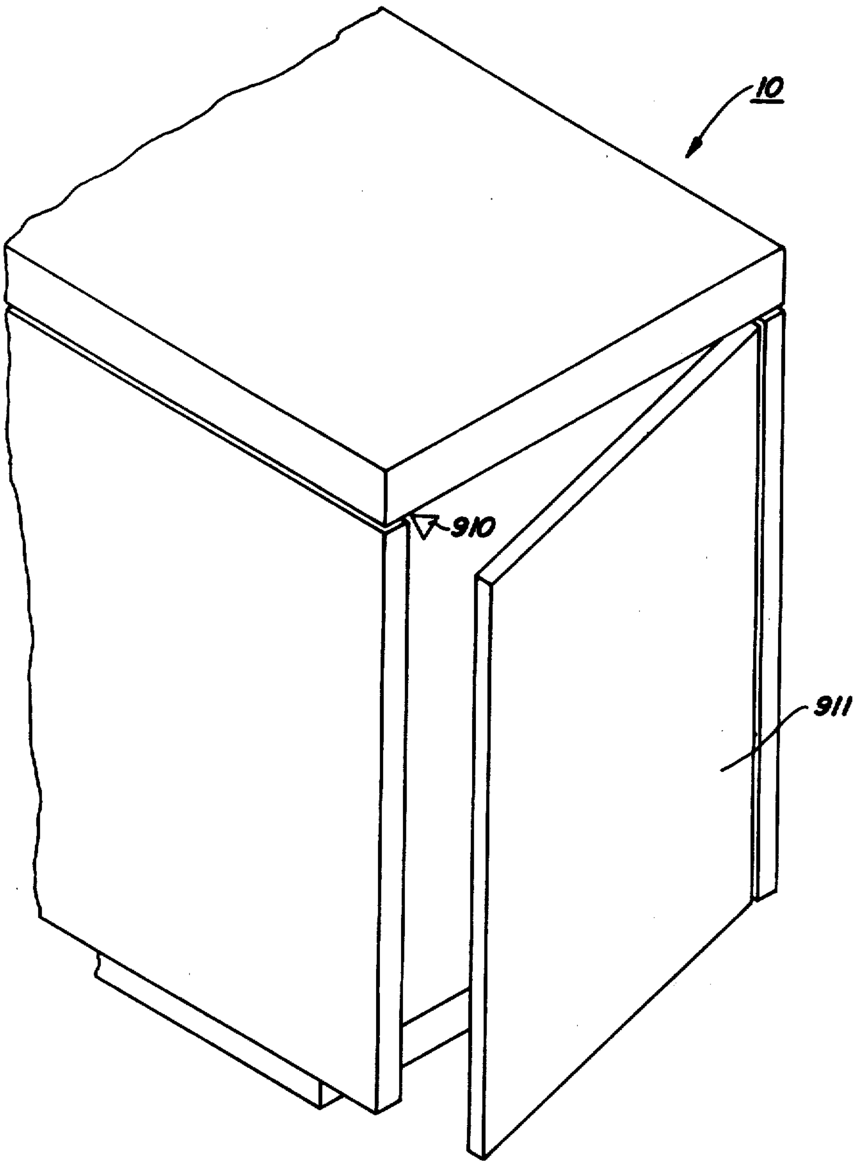

To provide the requisite operational synchronization between host machine 10 and controller 18 as will appear, processor or machine clock 202 is provided. Referring particularly to FIG. 1, clock 202 comprises a toothed disc 203 drivingly supported on the output shaft of main drive motor 34. A photoelectric type signal generator 204 is disposed astride the path followed by the toothed rim of disc 203, generator 204 producing, whenever drive motor 34 is energized, a pulse like signal output at a frequency correlated with the speed of motor 34, and the machine components driven therefrom.

As described, a second machine clock, termed a pitch reset clock 138 herein, and comprising timing switch 146 is provided. Switch 146 cooperates with sheet register fingers 141 to generate an output pulse once each revolution of fingers 141. As will appear, the pulse like output of the pitch reset clock is used to reset or resynchronize controller 18 with host machine 10.

Referring to FIG. 15, a document handler clock 286 consisting of apertured disc 287 on the output shaft of document handler drive motor 236 and cooperating photoelectric type signal generator 288 is provided. As in the case of machine clock 202, document handler clock 286 produces a pluse

CONTROLLER

Figure 16:
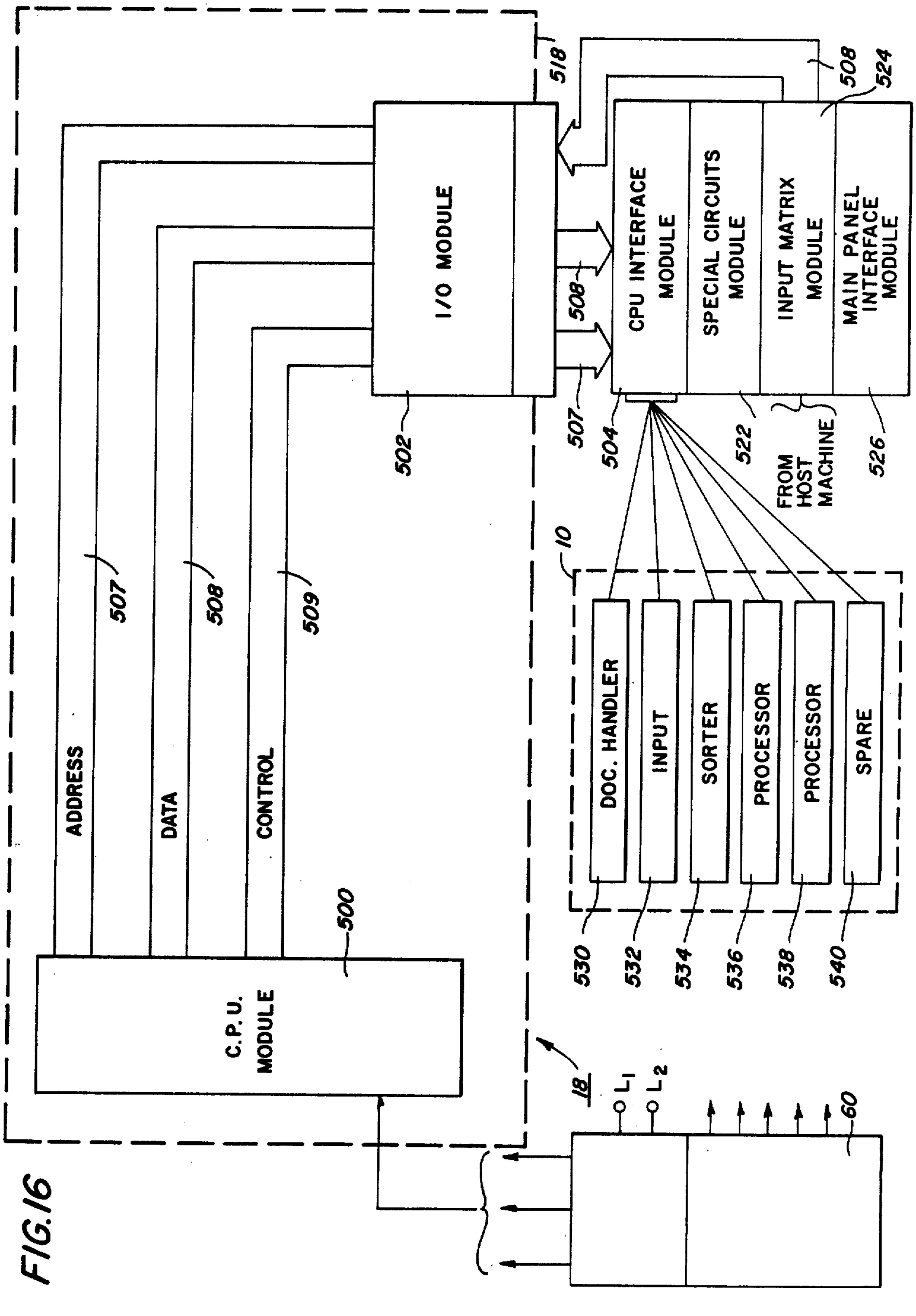
FIG. 16 is a block diagram of the controller for the apparatus shown in FIG. 1*a;*

Referring to FIG. 16 controller 18 includes a Computer Processor Unit (CPU) Module 500, Input/Output (I/O) Module 502, and Interface 504. Address, Data, and Control Buses 507, 508, 509 respectively operatively couple CPU Module 500 and I/O Module 502. CPU Module 500 and I/O Module 502 are disposed within a shield 518 to prevent noise interference.

Inferface 504 couples I/O Module 502 with special circuits module 522, input matrix module 524, and main panel interface module 526. Module 504 also couples I/O Module 502 to operating sections of the machine, namely, document handler section 530, input section 532, sorter section 534 and processor sections 536, 538. A spare section 540, which may be used for monitoring operation of the host machine, or which may be later utilized to control other devices, is provided.

Figure 17:
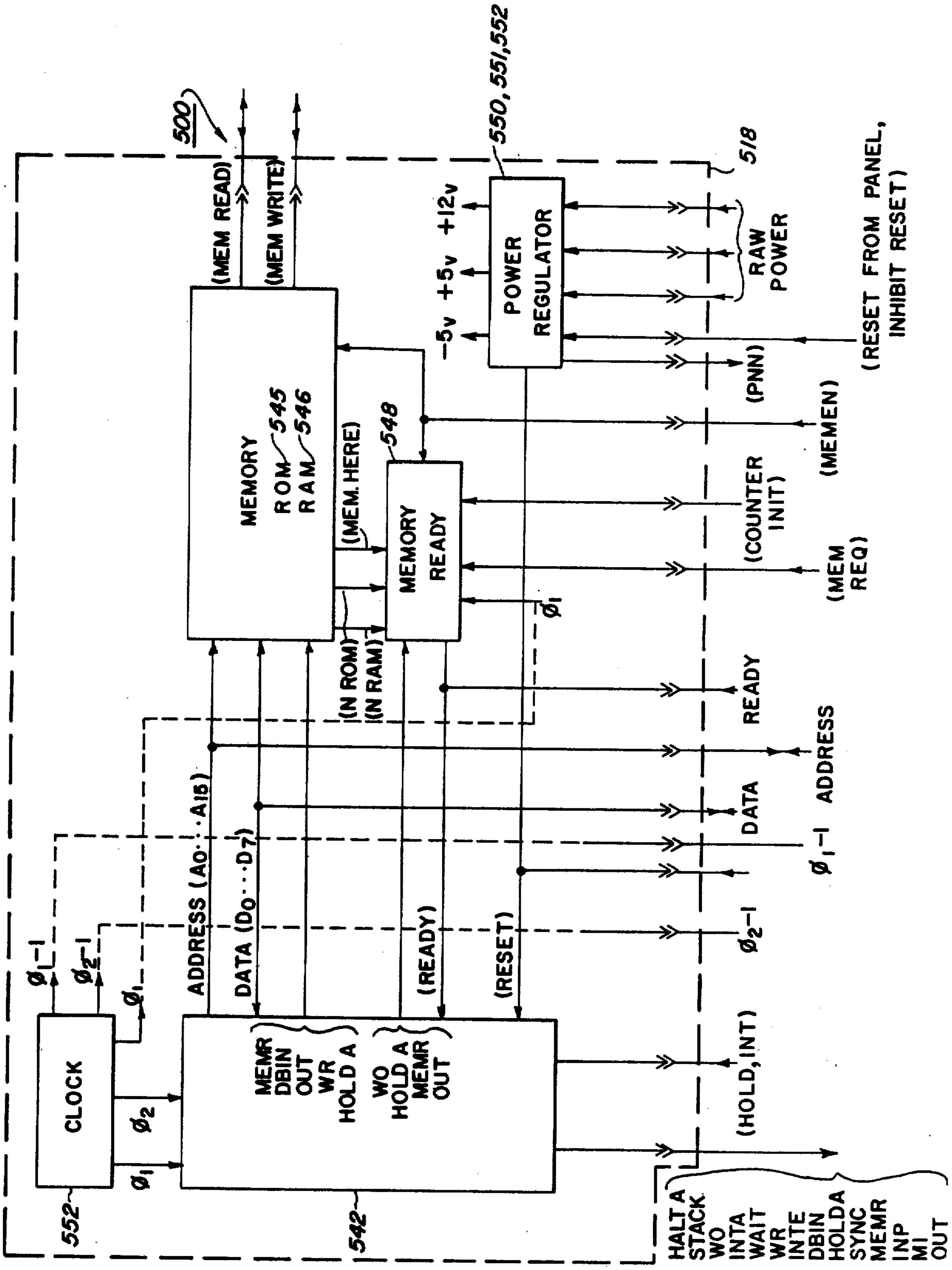
FIG. 17 is a block diagram of the controller CPU.

Referring to FIGS. 17, 18, CPU module 500 comprises a processor 542 such as an Intel 8080 microprocessor manufactured by Intel Corporation, Santa Clara, California, 16K Read Only Memory (herein ROM) and 2K Random Access Memory (herein RAM) sections 545, 546, Memory Ready section 548, power regulator section 550, and onboard clock 552. Bipolar tri-state buffers 510, 511 in Address and Data buses 507, 508 disable the bus on a Direct Memory Access (DMA) signal (HOLD A) as will appear. While the capacity of memory sections 545, 546 are indicated throughout as being 16K and 2K respectively, other memory sizes may be readily contemplated.

Referring paticularly to FIG. 19, clock 552 comprises a suitable clock oscillator 553 feeding a multi-bit (Qa – Qn) shift register 554. Register 554 includes an internal feedback path from one bit to the serial input of register 554. Output signal waveforms $\phi_1$, $\phi_2$, $\phi_{1\text{-}1}$ and $\phi_{2\text{-}1}$ are produced for use by the system.

Referring to FIG. 20, the memory bytes in ROM section 545 are implemented by Address signals (Ao – A 15) from processor 542, selection being effected by 3 to 8 decode chip 560 controlling chip select 1 (CS-1) and a 1 bit selection (A 13) controlling chip select 2 (CS-2). The most significant address bits (A 14, A 15) select the first 16K of the total 64K bytes of addressing space. The memory bytes in RAM section 546 are implemented by Address signals (Ao – A 15) through selector circuit 561. Address bit A 10 serves to select the memory bank while the reamining five most significant bits (A 11 - A 15) select the last 2 K bytes out of the 64K bytes of addressing space. RAM memory section 546 includes a 40 bit output buffer 546', the output of which is tied together with the output from ROM memory section 545 and goes to tri-state buffer 562 to drive Data bus 508. Buffer 562 is enabled when either memory section 545 or 546 is being addressed and either a (MEM READ) or DMA (HOLD A) memory request exists. An enabling signal (MEMEN) is provided from the machine control or service panel (not shown) which is used to permit disabling of buffer 562 during servicing of CPU Module 500. Write control comes from either processor 542 (MEM WRITE) or from DMA (HOLD A) control. Tri-state buffers 563 permit Refresh Control 605 of I/O Module 502 to access MEM READ and MEM WRITE control channels directly on a DMA signal (HOLD A) from processor 542 as will appear.

Referring to FIG. 21, memory ready section 548 provides a READY signal to processor 542. A binary counter 566, which is initialized by a SYNC signal ($\phi$,) to a prewired count as determined by input circuitry 567, counts up at a predetermined rate. At the maximum count, the output at gate 568 comes true stopping the counter 566. If the cycle is a memory request (MEM REQ) and the memory location is on board as determined by the signal (MEM HERE) to tri-state buffer 569, a READY signal is sent to processor 542. Tri-state buffer 570 in MEM REQ line permits Refresh Control 605 of I/O Module 502 to access the MEM REQ channel directly on a DMA signal (HOLD A) from processor 542 as will appear.

Referring to FIG. 22, power regulators 550, 551, 552 provide the various voltage levels, i.e. +5v, +12v, and −5v D.C. required by the module 500. Each of the three on board regulators 550, 551, 552 employ filtered D.C. inputs. Power Not Normal (PNN) detection circuitry 571 is provided to reset processor 542 during the power up time. Panel reset is also provided via PNN. An enabling signal (INHIBIT RESET) allows completion of a write cycle in Non Volatile (N.V.) Memory 610 of I/O Module 502.

Referring to FIGS. 18, 20, 21, and the DMA timing chart (FIG. 18*a*) data transfer from RAM section 546 to host machine 10 is effected through Direct Memory Access (DMA), as will appear. To initiate DMA, a signal (HOLD) is generated by Refresh Control 605 (FIG. 23*a*). On acceptance, processor 542 generates a signal HOLD ACKNOWLEDGE (HOLD A) which works through tri-state buffers 510, 511 and through buffers 563 and 570 to release Address bus 507, Data bus 508 and MEM READ, MEM WRITE, and MEM REQ channels (FIGS. 20, 21) to Refresh Control 605 of I/O Module 502.

Referring to FIG. 23, I/O module 502 interfaces with CPU module 500 through bi-directional Address, Data and Control buses 507, 508, 509. I/O module 502 appears to CPU module 500 as a memory portion. Data transfers between CPU and I/O modules 500, 502, and commands to I/O module 502 except for output refresh are controlled by memory reference instructions executed by CPU module 500. Output refresh which is initiated by one of several uniquely decoded memory reference commands, enables Direct Memory Access (DMA) by I/O Module 502 to RAM section 546.

I/O module 502 includes Matrix Input Select 604 (through which inputs from the host machine 10, are received), Refresh Control 605, Nonvolatile (NV) memory 610, Interrupt Control 612, Watch Dog Timer and Failure Flag 614 and clock 570.

A Function Decode Section 601 receives and interprets commands from CPU section 500 by decoding information on address bus 507 along with control signals from processor 542 on control bus 509. On command, decode section 601 generates control signals to perform the function indicated. These functions include (a) controlling tri-state buffers 620 to establish the direction of data flow in Data bus 508; (b) strobing data from Data bus 508 into buffer latches 622; (c) controlling multiplexer 624 to put data from Interrupt Control 612, Real Time clock register 621, Matrix Input Select 604 or N.V. memory 610 onto data bus 508; (d) actuating refresh control 605 to initiate a DMA operation; (e) actuating buffers 634 to enable address bits Ao - A 7 to be sent to the host machine 10 for input matrix read operations; (f) commanding operation of Matrix Input Select 604; (g) initiating read or write operation of N.V. memory 610 through Memory Control 638; (h) loading Real Time clock register 621 from data bus 508; and (i) resetting the Watch Dog timer or setting the Fault Failure flag 614. In addition, section 601 includes logic to control and synchronize the READY control line to CPU module 500, the READY line being used to advise module 500 when data placed on the Data Bus by I/O Module 502 in valid.

Watch dog timer and failure flag 614, which serves to detect certain hardwired and software malfunctions, comprises a free running counter which under normal circumstances is periodically reset by an output refresh command (REFRESH) from Function Decode Section 601. If an output refresh command is not received within a preset time interval, (i.e. 25m sec) a fault flip flop is set and a signal (FAULT) sent to the host machine 10. The signal (FAULT) also raises the HOLD line to disable CPU Module 500. Clearing of the fault flip flop may be by cycling power or generating a signal (RESET). A selector (not shown) may be provided to disable (DISABLE) the watch dog timer when desired. The fault flip flop may also be set by a command from the CPU Module to indicate that the operating program detected a fault.

Matrix Input Select 604 has capacity to read up to 32 groups of 8 discrete inputs from host machine 10. Lines $A_2$ through $A_7$ of Address bus 507 are routed to host machine 10 via CPU Interface Module 504 to select the desired group of 8 inputs. The selected inputs from machine 10 are received via Input Matrix Module 524 (FIG. 28) and are placed by matrix 604 onto data bus 508 and sent to CPU Module 500 via multiplexer 624. Bit selection is effected by lines $A_O$ through $A_2$ of Address bus 507.

Output refresh control 604, when initiated, transfers either 16 or 32 sequential words from RAM memory output buffer 546' to host machine 10 at the predetermined clock rate in line 574. Direct Memory Access (DMA) is used to facilitate transfer of the data at a relatively high rate. On a Refresh signal from Function Decode Section 601, Refresh Control 605 generates a HOLD signal to processor 542. On acknowledgement (HOLD A) processor 542 enters a hold condition. In this mode, CPU Module 500 releases address and data buses 507, 508 to the high impedance state giving I/O module 502 control thereover. I/O module 502 then sequentially accesses the 32 memory words from output buffer 546' (REFRESH ADDRESS) and transfers the contents to the host machine 10. CPU Module 500 is dormant during this period.

A control signal (LOAD) in line 607 along with the predetermined clock rate determined by the clock signal (CLOCK) in line 574 is utilized to generate eight 32 bit serial words which are transmitted serially via CPU Interface Module 504 to the host machine remote locations where serial to parallel transformation is performed. Alternatively, the data may be stored in addressable latches and distributed in parallel directly to the required destinations.

N.V. memory 610 comprises a predetermined number of bits of non-volatile memory stored in I/O Module 502 under Memory Control 638. N.V. memory 610 appears to CPU module 500 as part of the CPU module memory complement and therefore may be accessed by the standard CPU memory reference instruction set. Referring particularly to FIG. 24, to sustain the contents of N.V. memory 610 should system power be interrupted, one or more rechargeable batteries 635 are provided exterior to I/O module 502. CMOS protective circuitry 636 couples batteries 635 to memory 610 to preserve memory 610 on a failure of the system power. A logic signal (INHIBIT RESET) prevents the CPU Module 500 from being reset during the N.V. memory write cycle interval so that any write operation in progress will be completed before the system is shut down.

For tasks that require frequent servicing, high speed response to external events, or synchronization with the operation of host machine 10, a multiple interrupt system is provided. These comprise machine based interrupts, herein referred to as Pitch Reset, Machine, and Document Handler interrupts. A fourth clock driven interrupt, the Real Time interrupt, is also provided.

Referring particularly to FIGS. 23(*b*) and 34, the highest priority interrupt signal, Pitch Reset signal 640, is generated by the signal output of pitch reset clock 138. The clock signal is fed via optical isolator 645 and digital filter 646 to edge trigger flip flop 647.

The second highest priority interrupt signal, machine clock signal 641, is sent directly from machine clock 202 through isolation transformer 648 to a phase locked loop 649. Loop 649, which serves as bandpath filter and signal conditioner, sends a square wave signal to edge trigger flip flop 651. The second signal output (LOCK) serves to indicate whether loop 649 is locked onto a valid signal input or not.

The third highest priority interrupt signal, Document Handler Clock signal 642, is sent directly from document handler clock 286 via isolation transformer 652 and phase locked loop 653 to flip flop 654. The signal (LOCK) serves to indicate the validity of the signal input to loop 653.

The lowest priority interrupt signal, Real Time Clock signal 643, is generated by register 621. Register 621 which is loaded and stored by memory reference instructions from CPU module 500 is decremented by a clock signal in line 643 which may be derived from I/O Module clock 570. On the register count reaching zero, register 621 sends an interrupt signal to edge trigger flip flop 656.

Setting of one or more of the edge trigger flip flops 647, 651, 654, 656 by the interrupt signals 640, 641, 642, 643 generates a signal (INT) via priority chip 659 to processor 54 of CPU Module 500. On acknowledgement, processor 542, issues a signal (INTA) transferring the status of the edge trigger flip flops 647, 651, 654, 656 to a four bit latch 660 to generate an interrupt instruction code (RESTART) onto the data bus 508.

Each interrupt is assigned a unique RESTART instruction code. Should an interrupt of higher priority be triggered, a new interrupt signal (INT) and RESTART instruction code are generated resulting in a nesting of interrupt software routines whenever the interrupt recognition circuitry is enabled within the CPU 500.

Priority chip 659 serves to establish a handling priority in the event of simultaneous interrupt signals in accordance with the priority schedule described.

Once triggered, the edge trigger flip flop 647, 651, 654, or 656 must be reset in order to capture the next occurrence of the interrupt associated therewith. Each interrupt subroutine serves, in addition to performing the functions programmed, to reset the flip flops (through the writing of a coded byte in a uniquely selected address) and to re-enable the interrupt (through execution of a re-enabling instruction). Until re-enabled, initiation of a second interrupt is precluded while the first interrupt is in progress.

Lines 658 permit interrupt status to be interrogated by CPU module 500 on a memory reference instruction.

I/O Module 502 includes a suitable pulse generator or clock 570 for generating the various timing signals required by module 502. Clock 570 is driven by the pulse-like output $\phi_1$, $\phi_2$ of processor clock 552 (FIG. 19*a*). As described, clock 570 provides a reference clock pulse (in line 574) for synchronizing the output refresh data and is the source of clock pulses (in line 643) for driving Real Time register 621.

CPU interface module 504 interfaces I/O module 502 with the host machine 10 and transmits operating data stored in RAM section 546 to the machine. Referring particularly to FIG. 25 and 26, data and address information are inputted to module 504 through suitable means such as optical type couplers 700 which convert the information to single ended logic levels. Data in bus 508 on a signal from Refresh Control 605 in line 607 (LOAD), is clocked into module 546 at the reference clock rate in line 574 parallel by bit, serial by byte for a present byte length, with each data bit of each successive byte being clocked into a separate data channel DO - D7. As best seen in FIG. 25, each data channel DO - D7 has an assigned output function with data channel DO being used for operating the front panel lamps 830 in the digital display, (see FIG. 32), data channel D1 for special circuits module 522, and remaining data channels D2 - D7 allocated to the host machine operating sections 530, 532, 534, 536, 538 and 540. Portions of data channels D1 - D7 have bits reserved for front panel lamps and digital display.

Since the bit capacity of the data channels D2 - D7 is limited, a bit buffer 703 is preferably provided to catch any bit overflow in data channels D2 - D7.

Inasmuch as the machine output sections 530, 532, 534, 536, 538 and 540 are electrically a long distance away, i.e. remote, from CPU interface module 504, and the environment is electrically "noisy", the data stream in channels D2 - D7 is transmitted to remote sections 530, 532, 534, 536, 538 and 540 via a shielded twisted pair 704. By this arrangement, induced noise appears as a differential input to both lines and is rejected. The associated clock signal for the data is also transmitted over line 704 with the line shield carrying the return signal currents for both data and clock signals.

Data in channel $D_1$ destined for special circuits module 522 is inputted to shift register type storage circuitry 705 for transmittal to module 522. Data is also inputted to main panel interface module 526. Address information in bus 507 is converted to single ended output by couplers 700 and transmitted to Input Matrix Module 524 to address host machine inputs.

CPU interface module 504 includes fault detector circuitry 706 for monitoring both faults occurring in host machine 10 and faults or failures along the buses, the latter normally comprising a low voltage level or failure in one of the system power lines. Machine faults may comprise a fault in CPU module 500, a belt mistrack signal from sensor 27 (see FIG. 2), opening one of the machine doors or covers as responded to by conventional cover interlock sensors (not shown), a fuser over temperature as detected by sensor 175, etc. In the event of a bus fault, a reset signal (RESET) is generated automatically in line 709 to CPU module 500 (see FIGS. 17 and 18) until the fault is removed. In the event of a machine fault, a signal is generated by the CPU in line 710 to actuate a suitable relay (not shown) controlling power to all or a portion of host machine 10. A load disabling signal (LOAD DISBL) is inputted to optical couplers 700 via line 708 in the event of a fault in CPU module 500 to terminate input of data to host machine 10. Other fault conditions are monitored by the software background program. In the event of a fault, a signal is generated in line 711 to the digital display on control console 800 (via main panel interface module 526) signifying a fault.

Referring particularly to FIGS. 25 and 27, special circuits module 522 comprises a collection of relatively independent circuits for either monitoring operation of and/or driving various elements of host machine 10. Module 522 incorporates suitable circuitry 712 for amplifying the output of sensors 225, 226, 227, 228 and 280, 281, 282 of sorter 14 and document handler 16 respectively; circuitry 713 for operating fuser release clutch 159; and circuitry 714 for operating main and auxiliary paper tray feed roll clutches 130, 131 and document handler feed clutch 244.

Additionally, fuser detection circuitry 715 monitors temperature conditions of fuser 150 as responded to by sensor 174. On overheating of fuser 150, a signal (FUS-OT) is generated to turn heater 163 off, actuate clutch 159 to separate fusing and pressure rolls 160, 161; trigger trap solenoid 158 to prevent entrance of the next copy sheet into fuser 150, and initiate a shutdown of host machine 10. Circuitry 715 also cycles fuser heater 163 to maintain fuser 150 at proper operating temperatures and signals (FUS-RDUT) host machine 10 when fuser 150 is ready for operation.

Circuitry 716 provides closed loop control over sensor 98 which responds to the presence of a copy sheet 3 on belt 20. On a signal from sensor 98, solenoid 97 is triggered to bring deflector 96 into intercepting position adjacent belt 20. At the same time, a backup timer (not shown) is actuated. If the sheet is lifted from the belt 20 by deflector 96 within the time allotted, a signal from sensor 99 disables the timer and a mis strip type jam condition of host machine 10 is declared and the machine is stopped. If the signal from sensor 99 is not received within the allotted time, a sheet on selenium (SOS) type jam is declared and an immediate machine stop is effected.

Circuitry 718 controls the position (and hence the image reduction effected) by the various optical elements that comprise main lens 41 in response to the reduction mode selected by the operator and the signal inputs from lens position responsive sensors 116, 117, 118. The signal output of circuitry 718 serves to operate lens drive motor 43 as required to place the optical elements of lens 41 in proper position to effect the image reduction programmed by the operator.

Referring to FIG. 28, input matrix module 524 provides analog gates 719 for receiving data from the various host machine sensors and inputs (i.e. sheet sensors 135, 136; pressure sensor 157; etc), module 524 serving to convert the signal input to a byte oriented output for transmittal to I/O module 502 under control of Input Matrix Select 604. The byte output to module 524 is selected by address information inputted on bus 507 and decoded on module 524. Conversion matrix 720, which may comprise a diode array, converts the input logic signals of "0" to logic "1" true. Data from input matrix module 524 is transmitted via optical isolators 721 and Input Matrix Select 604 of I/O module 502 to CPU Module 500.

Referring particularly to FIG. 29, main panel interface module 526 serves as interface between CPU interface module 504 and operator control console 800 for display purposes and as interface between input matrix module 524 and the console switches. As described, data channels DO - D7 have data bits in each channel associated with the control console digital display or lamps. This data is clocked into buffer circuitry 723 and from there, for digital display, data in channels D1 - D7 is inputted to multiplexer 724. Multiplexer 724 selectively multiplexes the data to HEX to 7 segment converter 725. Software controlled output drivers 726 are provided for each digit which enable the proper display digit in response to the data output of converter 725. This also provides blanking control for leading zero suppression or inter digit suppression.

Buffer circuitry 723 also enables through anode logic 728 the common digit anode drive. The signal (LOAD) to latch and lamp driver control circuit 729 regulates the length of the display cycle.

For console lamps 830, data in channel DO is clocked to shift register 727 whose output is connected by drivers to the console lamps. Access by input matrix module 524 to the console switches and keyboard is through main panel interface module 526.

The machine output sections 530, 532, 534, 536, 538, 540 are interfaced with I/O module 502 by CPU interface module 504. At each interrupt/refresh cycle, data is outputted to sections 530, 532, 534, 536, 538, 540 at the clock signal rate in line 574 over data channels D2, D3, D4, D5, D6, D7 respectively.

Referring to FIG. 30, wherein a typical output section i.e. document handler section 530 is shown, data inputted to section 530 is stored in shift register/latch circuit combination 740, 741 pending output to the individual drivers 742 associated with each machine component. Preferably d.c. isolation between the output sections is maintained by the use of transformer coupled differential outputs and inputs for both data and clock signals and a shielded twisted conductor pair. Due to transformer coupling, the data must be restored to a d.c. waveform. For this purpose, control recovery circuit 744, which may comprise an inverting/non-inverting digital comparator pair and output latch is provided.

The LOAD signal serves to lockout input of data to latches 741 while new data is being clocked into shift register 740. Removal of the LOAD signal enables commutation of the fresh data to latches 741. The LOAD signal also serves to start timer 745 which imposes a maximum time limit within which a refresh period (initiated by Refresh Control 605) must occur. If refresh does not occur within the prescribed time limit, timer 745 generates a signal (RESET) which sets shift register 740 to zero.

With the exception of sorter section 534 discussed below, output sections 532, 536, 538 and 540 are substantially identical to document handler section 530.

Referring to FIG. 31 wherein like numbers refer to like parts, to provide capacity for driving the sorter deflector solenoids 221, a decode matrix arrangement consisting of a Prom encoder 750 controlling a pair of decoders 751, 752 is provided. The output of decoders 751, 752 drive the sorter solenoids 221 of upper and lower bin arrays 210, 211 respectively. Data is inputted to encoder 750 by means of shift register 754.

Referring now to FIG. 32, control console 800 serves to enable the operator to program host machine 10 to perform the copy run or runs desired. At the same time, various indicators on console 800 reflect the operational condition of machine 10. Console 800 includes a bezel housing 802 suitably supported on host machine 10 at a convenient point with decorative front or face panel 803 on which the various machine programming buttons and indicators appear. Programming buttons include power on/off buttons 804, start print (PRINT) button 805, stop print (STOP) button 806 and keyboard copy quantity selector 808. A series of feature select buttons consisting of auxiliary paper tray button 810, two sided copy button 811, copy lighter button 814, and copy darker button 815, are provided.

Additionally, image size selector buttons 818, 819, 820; multiple or single document select buttons 822, 823 for operation of document handler 14; and sorter sets or stacks buttons 825, 826 are provided. An on/off service selector 828 is also provided for activation during machine servicing.

Indicators comprise program display lamps 830 and displays such as READY, WAIT, SIDE 1, SIDE 2, ADD PAPER, CHECK STATUS PANEL, PRESS FAULT CODE, QUANTITY COMPLETED, CHECK DOORS, UNLOAD AUX TRAY, CHECK DOCUMENT PATH, CHECK PAPER PATH, and UNLOAD SORTER. Other display information may be envisioned.

OPERATION

As will appear, host machine 10 is conveniently divided into a number of operational states. The machine control program is divided into Background routines and Foreground routines with operational control normally residing in the Background routine or routines appropriate to the particular machine state then in effect. The output buffer 546' of RAM memory section 546 is used to transfer/refresh control data to the various remote locations in host machine 10, control data from both Background and Foreground routines being inputted to buffer 546' for subsequent transmittal to host machine 10. Transmittal/refresh of control data presently in output buffer 546' is effected through Direct Memory Access (DMA) under the aegis of a Machine Clock interrupt routine.

Foreground routine control data which includes a Run Event Table built in response to the particular copy run or runs programmed, is transferred to output buffer 546' by means of a multiple prioritized interrupt system wherein the Background routine in process is temporarily interrupted while fresh Foreground routine control data is inputted to buffer 546' following which the interrupted Background routine is resumed.

The operating program for host machine 10 is divided into a collection of foreground tasks, some of which are driven by the several interrupt routines and background or non-interrupt routines. Foreground tasks are tasks that generally require frequent servicing, high speed response, or synchronization with the host machine 10. Background routines are related to the state of host machine 10, different background routines being performed with different machine states. A single background software control program (STATCHK), (TABLE I) composed of specific sub-programs associated with the principal operating states of host machine 10 is provided. A byte called STATE contains a number indicative of the current operating state of host machine 10. The machine STATES are as follows:

| STATE NO. | MACHINE STATE | CONTROL SUBR. |
|---|---|---|
| 0 | Software Initialize | INIT |
| 1 | System Not Ready | NRDY |
| 2 | System Ready | RDY |
| 3 | Print | PRINT |
| 4 | System Running, Not Print | RUNNPRT |
| 5 | Service | TECHREP |

Referring to FIG. 33, each STATE is normally divided into PROLOGUE, LOOP and EPILOGUE sections. As will be evident from the exemplary program STATCHK reproduced in TABLE I, entry into a given STATE (PROLOGUE) normally causes a group of operations to be performed, these consisting of operations that are performed once only at the entry into the STATE. For complex operations, a CALL is made to an applications subroutine therefor. Relatively simpler operations (i.e. turning devices on or off, clearing memory, presetting memory, etc.) are done directly.

Once the STATE PROLOGUE is completed, the main body (LOOP) is entered. The program (STATCHK) remains in this LOOP until a change of STATE request is received and honored. On a change of STATE request, the STATE EPILOGUE is entered wherein a group of operations are performed, following which the STATE moves into the PROLOGUE of the next STATE to be entered.

Referring to FIGS. 34a and 34b and the exemplary program (STATCHK) in TABLE I, on actuation of the machine POWER-ON button 804, the software Initialize STATE (INIT) is extered. In this STATE, the controller is initialized and a software controlled self test subroutine is entered. If the self test of the controller is successfully passed, the System Not Ready STATE (NRDY) is entered. If not, a fault condition is signalled.

In the System Not Ready STATE (NRDY), background subroutines are entered. These include setting of Ready Flags, control registers, timers, and the like; turning on power supplies, the fuser, etc., initializing the Fault Handler, checking for paper jams (left over form a previous run), door and cover interlocks, fuser temperatures, etc. During this period, the WAIT lamp on console 800 is lit and operation of host machine 10 precluded.

When all ready conditions have been checked and found acceptable, the controller moves to the System Ready State (RDY). The READY lamp on console 800 is lit and final ready checks made. Host machine 10 is now ready for operation upon completion of input of a copy run program, loading of one or more originals 2 into document handler 16 (if selected by the operator), and actuation of START PRINT button 805. As will appear hereinafter, the next state is PRINT wherein the particular copy run programmed is carried out.

Following the copy run, (PRINT), the controller normally enters the System Not Ready state (NRDY) for rechecking of the ready conditions. If all are satisfied, the system proceeds to the System Ready State (RDY) unless the machine is turned off by actuation of POWER OFF button 804 or a malfunction inspired shutdown is triggered. The last state (TECH REP) is a machine servicing state wherein certain service routines are made available to the machine/repair personal, i.e. Tech Reps.

A description of the aforementioned data transfer system is found in copending application Ser. No. 677,473, filed April 15, 1976, incorporated by reference herein.

To identify faults in the diverse host machine components, the master operating program for the machine 10 includes a routine for checking the condition of an array of fault flags. Each flag in the array is associated with and represents a particular machine fault. Signal lamps 851 (PRESS FAULT CODE), 852 (CHECK STATUS) and 853 (CHECK DOORS) are provided on control console 800 for fault identification. A specific identifying code is assigned to each fault to permit the fault to be pin pointed. A display arrangement is provided on console 800 (FIG. 32) using the copy count numerical display of the coded number. A suitable chart (not shown) is provided to relate the different coded numbers with the proper machine component.

Additionally, a status panel 901, which comprises a schematic of the paper feed path (see FIG. 1a) is provided on the underside of transport 900, cover 900 being suitably mounted for lifting movement for access to the transport 182 therebelow as well as when viewing the status panel 901. A series of lamps 903, located at strategic points along the paper path schematic, are selectively lit to display the particular place or places in the paper path where a fault exists. Raising of cover 900 to expose the paper path schematic and lamps 903 is in response to lighting of signal lamp 852 (CHECK STATUS) on console 800. To provide a permanent record or history of the faults that occur during the life of host machine 10, a record is kept in non-volatile memory 610 of at least some fault occurrences.

As described earlier, sensors are associated with various of the machine operating components to sense the operating status of the component. For example, a series of of sheet jam sensors 133, 134, 139, 144, 176, 183, 179, 194 are disposed at strategic points along the path of copy sheets 3 to detect a sheet jam of other feeding failure (See FIG. 12). Other sensors 280, 281 and 282 monitor document handler 16 and sensors 225, 226, sorter 14 (See FIGS. 14, 13). Conditions within fuser 150 are responded to by detector 174 while other detectors 157 monitor pressures in the machine vacuum system (FIG. 12). Sensors 98, 99 guard against the presence of sheets 3 on belt 20 following transfer (See FIG. 10).

Additional sensors 910 monitor the several exterior doors and covers of host machine 10 such as transport cover 900 and door 911 to trigger an alarm should a cover be open or ajar (See FIG. *1b*). As will be understood, other sensing and monitoring devices may be provided for various operating components of host machine 10. Those shown and described herein are therefore to be considered exemplary only.

Referring particularly to drawings, FIG. 36 and TABLE II, the routine for scanning the array of fault flags (FLT SCAN) is initiated from time to time as part of the background program of host machine 10. Initially, paper path sensors 133, 134, 139, etc. are polled to determine if a paper jam exists (JAM SCAN) in the sheet transport path. The starting address of the fault array (ADDR OF FLT TBL) and the total number of fault flags to be scanned (FLT CNT) are obtained. The flag counter (B) is set to the total number of fault flags and fault flag counter (E) is set to zero.

Scanning of the fault flag array (SCAN) is then initiated, the first fault flag obtained, and the flag pointer (H) indexed to the next flag. The flag is tested (TEST FLAG) and if set, indicating the existance of a fault, the fault counter (E) is incremented. A query is made as to whether readout of both code and status lamps 851, 852 are required (FLT CDPL) and the particular lamp or lamps (FLT LAMP) determined.

It is understood that the code readout is obtained on numerical display 830 of control console 800 while the lamp display is obtained through the actuation of the prescribed jam lamp 903 on status panel 901 of cover 900.

The flag counter (B) is decremented and the foregoing loop is repeated until the last flag of the array has been checked at which point the flag counter (B) is zero. A query is made if any flags have been set (FLAGS SET), and if so, the fault signal lamp (PRESS FAULT CODE) 851 on console 800 is lit and the fault ready flag reset. If not, the fault code lamp is held off and the fault ready flag set. The number of fault flags set are saved (FLT TOT).

When the machine operator, notified that one or more faults exist by lamp 851 (PRESS FAULT CODE) on console 800, desires to identify the fault, fault display button 850 may be depressed to produce a coded number on copy count numerical display 830. If lamp 852 (CHECK STATUS) is lit, transport cover 900 may be raised to identify, by means of lamps 903, the fault condition in the sheet transport system. If the fault is not in the sheet transport system, identification can be effected only by depressing fault display button 850.

The fault display (FLT DISP) subroutine shown in FIG. 37 and TABLE III, which is entered on depressing of fault display button 851, queries whether or not any faults exist (FLT TOT) and if so, a check is made to determine if the fault code is already display (FLT SHOW). If, not, the next fault is looked for (FLT FIND), the code for that fault (FLT DCTL) obtained, and display requested (DISPL IST).

If the fault code is already displayed and the display button 851 remains depressed, the old display is continued. If there are no faults (FLT TOT = 0), no display is made and the display request flags (DSPL FLT; FLT SHOW, DSPL IST) are cleared.

As long as fault display button 850 is depressed the fault code, identifying the specific fault, appears on console 800. To determine if additional faults beside the one displayed exist, the operator momentarily releases button 850. When re-expressed, scanning of the fault flag array for the next fault (if any) is resumed. If a second fault is found, the code number for that fault is displayed. If no other fault exists, the scanning loop returns to the first fault and the code for that fault is again displayed on console 800.

Where the fault exists in the machine paper path, the code display therefor on console 800 may be fetched either by depressing fault display button 850 or raising transport cover 900.

Referring to the subroutine shown in FIG. 38 (FLT COVR) TABLE IV, where the fault consists of a jam or malfunction in the machine paper path, a check is made to determine if fault display button 850 has been actuated (DSPL FLT). If so, display of the fault code is made as described heretofore in connection with FIG. 36. If button 850 has not been depressed a check is made to determine if the fault is a processor jam (PROC JAM). The status of cover 900 is checked (TCVR OPEN) and whether or not a new display is requested by cover 900 (FLT CSHW). With cover 900 open and a display requested, the fault flag is found (FLT CFIND) and the fault code obtained (FLT DCTL). Display of the fault code on numerical display 830 (DSPL IST) is made.

If the malfunction is confined to the area of host machine 10 other than the paper feed path, or if top cover 900 is not opened, no display (under this routine) is made, and the fault flags (FLT C SHW; DSPL IST) are cleared (RESET).

Figure 39B:
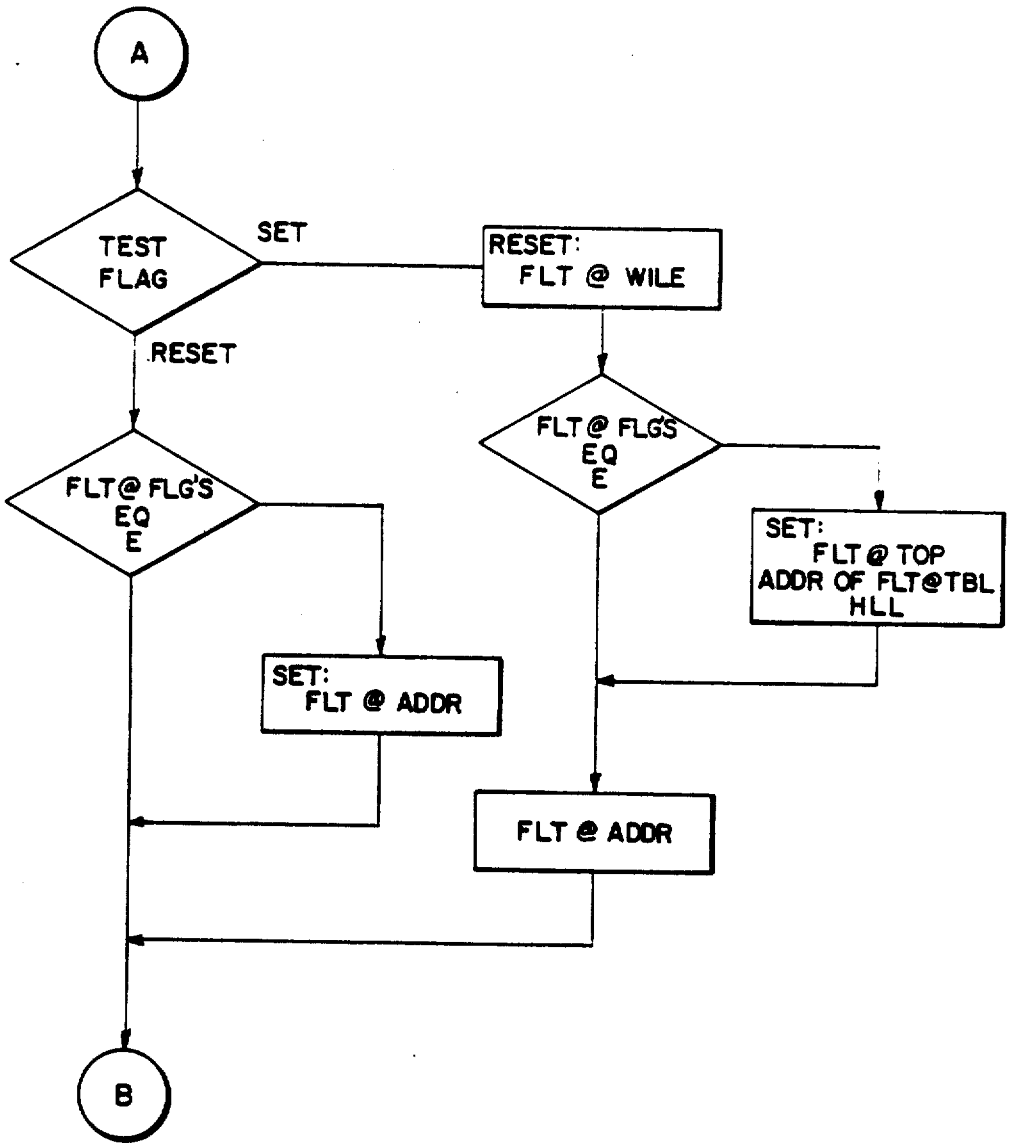

In the subroutine (TABLE V) to determine which fault is to be displayed (FLT FIND), schematically shown in FIGS. 39*a* and 39*b*, on entry, a fault while loop flag (FLT WILE) is set and the address to begin searching for the next flag (FLT ADDR) obtained. On entering the loop, a check is made to determine if the fault pointer is at the top of the fault table (FLT TOP). If not, the fault number (FLT BCD) is obtained. The fault counter is incremented (INCR A), the fault flag is obtained (GET FLAG), and the flag tested (TEST FLAG). If the flag is set, the loop control flag (FLT WILE) is reset, a check is made for the end of the fault array (FLT FLGS EQ E), and the address of the next flag (FLT ADDR) obtained. In the event the fault flag is not set, a check is made to determine if the flag was the last flag in the table, and the loop repeated until the last flag in the array (FLT FLGS EQ E) has been checked.

After finding the fault flag (FLT FIND), the Fault Code display loop (FLT DCTL) is entered (FIG. 40, Table VI). In this subroutine the fault flag pointer (FLT NVM), the base address of the fault table (ADDR OF FLT TBL), and the address of the display (ADDR OF DISPLAY) are fetched and the display word (FC DIGIT) obtained.

As described, on entry into the fault scan routine (FLT SCAN) a check is made to determine of a jam exists in the machine paper path. For this purpose the paper jam sensors 133, 134, 139, 144, 176, 183, 179 and 194 are polled for the presence of a copy sheet 3.

Referring to the schematic routine of FIG. 41 (JAM SCAN) and TABLE VII, the jam switch bytes (JSW BYTE) are tested and a check made to determine if any jam switch bits (JSW BITS) are set. If so, the address of the first jam flag is obtained (ADDR OF JAM FLAG) and the bit counter (B) set. If any bits remain ($B \neq 0$), the bit is obtained (GET BIT) and tested (TEST BIT). If set, the fault flag corresponding thereto is set. The counter (B) is decremented and the address incremented. The loop is repeated until the counter (B) reaches zero and the routine is exited.

As described, on a fault, one of the status lamps 851 (PRESS FAULT CODE), 852 (CHECK STATUS) and 853 (CHECK DOORS) on console 800 is lit. In the lamp selection routine (FLT LAMP) of FIG. 42 and TABLE VIII, a check is made to determine if the status panel flag is set (STATUS PNL FLG). If so, a check is made to determine if the fault is a processor jam (PROC JAM) and if not, the fault panel lamp routine (FLT SPNL) of FIG. 43 is entered. If the jam is a processor jam, the routine is exited.

If the status panel flag (STATUS PNL FLAG) is not set, a doors fault (CHECK DOORS FLAG) is looked for. If a door fault is found, the lamp 853 (CHECK DOORS) is turned on. If no door faults exists the routine is exited.

Where the jam or malfunction lies in the sheet transport path as indicated by lighting of lamp 852 (CHECK STATUS) on console 800, individual lamps 903 on status panel 901 (see FIG. 1) are lit to identify the point where the fault has occurred. The fault panel lamp routine (FLT SPNL) of FIG. 43 and TABLE IX is entered for this purpose. In this routine, checks are made to determine if the jam flags for face up tray 195, fuser 150, sheet register 146, and transport 149 are set. A check is made to determine if duplex copies are programmed (2SDC FLAG) and if so, inverter 184, return transport 182, and auxiliary transport 147, jam checks are made. If duplex copies are not programmed, and the auxiliary tray is programmed (AX FLAG), auxiliary transport 147 is checked (B-X-JAM). A check is made for a jam at belt cleaning station 86 (SOS JAM) and the routine exited.

To provide a permanent record of the number of times various faults occur in host machine 10, a portion of nonvolatile memory 610 (FIG. **23*a*) is set aside for this purpose. Each time a selected fault occurs, i.e. setting of the fuser overtemperature fault flag in response to an overtemperature condition in fuser 150 as responded to by sensor 174, a counter in non-volatile memory 610 set aside for this purpose is incremented by one. In this way, a permanent record of the total number of times the particular fault has occurred is kept in non-volatile memory 610 and is available for various purposes such as servicing host machine 10**.

In addition to recording the number of times certain faults occur, non-volatile memory 610 is used to store the number and type of copies made on host machine 10 as will appear. It is understood that the type and number of fault occurrences stored in non-volatile memory 610 may be varied as well as the type of other machine operating information, and that the listing given herein is exemplary only.

As explained heretofore, on completion of a copy run or on detection of a fault, host machine 10 comes to a stop. Stopping of host machine 10 may be through a cycle down procedure wherein the various operating components of machine 10 come to a stop when no longer needed, as at the completion of a copy run, or through an emergency stop wherein the various operating components are brought to a premature stop, as in the case of a fault condition. Conveniently, the routine for updating information stored in non-volatile memory may be entered at that time.

Referring to **44*b*, and 44*c*** (HIST FILE) and TABLE X, on entry of the non-volatile memory updating routine (HIST FLE), the address of the non-volatile memory counters for recording paper path jams (NVM PAPER PATH FLT CONTROLS) and the address of the paper path fault flags (PAPER PATH FLT TBL FLAGS) are obtained, and a loop through the paper path fault flags entered. Each paper path fault flag is checked and if set a counter updating subroutine (HST BCNT) is called to update the count on the non-volatile memory counter for that fault. The loop is exited when the last paper path fault flag has been checked and the non-volatile memory counter therefor updated (as appropriate).

In a similar manner, the non-volatile memory counters for reset and error faults, fuser and cleaning (SOS) station faults, sheet registration faults, and sorter faults are updated as appropriate.

Following updating of the non-volatile memory fault counters, counters associated with the copy production of host machine 10 are updated (HST DCNT). For this, the non-volatile memory counter recording the number of sheets delivered to sorter 14, to face up tray 195, and to auxiliary tray 102 (when making duplex copies) are updated, followed by updating of the counters recording the number of times flash lamps 37 are operated, both as an absolute total and as a function of simplex (side 1) or duplex (side 2) copying. Following this the routine is exited.

In the fault counter updating routine (HSTBCNT — FIG. 45 and TABLE XI), the address of the counter is fetched (FETCH NVM COUNTER LS NIBBLE), updated, and stored. A check is made for overflow out of the counter LS Nibble, and the counter loaded to the new count.

In the non-volatile memory digit counter updating routine (HST DCNT - TABLE XII), the current count of the counter digit breakdowns (i.e. units, tens, hundreds, etc) are fetched, starting with the units digit and updated. An overflow check is made with provision for carrying the overflow over into the succeeding digit grouping. The non-volatile memory counters are then loaded with the new number and the routine exited.

It is understood that the non-volatile memory fault and digit counters may be updated in different sequences and at different times from that described and that fault and machine operating conditions other than or in addition to those described in non-volatile memory 610.

TABLE I

STATE CHECKER ROUTINE (STATCHK)

| | | | | |
|---|---|---|---|---|
| | | INITIALIZATION STATE BACKGROUND- PROLOG | | |
| 001D6 | | INIT: EQ | | |
| | | INITIALIZATION STATE BACKGROUND- WHILE: LOOP | | |
| 001D6 | 3A08FE | WHILE: | XBYT,STATE:,EQ,O | DO INIT LOOP WHILE COND EXISTS |
| 001D9 | FE00 | | | |
| 001DB | C2EE01 | | | |
| 001DE | CDF306 | CALL | SELFTEST | CALL CONTROLLER SELF TEST SUBR |
| 001E1 | 78 | IF: | XBYT,B,EQ,O | DID CONTROLLER PASS SELF TEST |
| 001E2 | FE00 | | | |
| 001E4 | C2EB01 | | | |
| 001E7 | 2108FE | INCBYT | STATE: | YES, MOVE TO NOT-READY STATE |

TABLE I-continued

STATE CHECKER ROUTINE (STATCHK)

| | | | | |
|---|---|---|---|---|
| 001EA | 34 | | | |
| | | ENDIF | | |
| 001EB | C3D601 | ENDWHILE | | |
| | | INITIALIZATION STATE BACKGROUND- EPILOG | | |
| 001EE | 2184F7 | LXI | H,RDYFLGS: | H&L =B =ADDR OF FIRST RDY FLAG |
| 00F1 | 060A | MVI | B,RDYFNUM: | B= NUMBER OF RDY FLAGS |
| 001F3 | 1680 | MVI | D,X'80' | D-REG TO SET FLAGS |
| 001F5 | 78 | WHILE: | XBYT,B,NE,O | DO LOOP = TO # IN B-REG |
| 001F6 | FE00 | | | |
| 001F8 | Ca0102 | | | |
| 001FB | 72 | MOV | M,D | SET FLAG |
| 001FC | 23 | INX | H | H&L = ADDR OF NEXT FLAG |
| 001FD | 05 | DCR | B | DECR LOOP COUNTER |
| 001FE | C3F501 | ENDWHILE | | |
| | | LOOP TO SET ALL RDY FLAGS | | |
| 00201 | 3E80 | SFLG | 2SD*ENAB | |
| 00203 | 325FF4 | | | |
| 00206 | 3E80 | SFLG | PROG*RDY | SET PROG ROUTINE READY |
| 00208 | 3287F7 | | | |
| 00208 | 3E80 | SFLG | DSPL*SEL | INIT PROG TO DISPLAY QTY SELECT |
| 0020D | 3234F4 | | | |
| 00210 | 2106FE | LXI | H,DIVD10: | H&L = ADDR OF 100 MSEC CNTR |
| 00213 | 360A | MVI | M,10 | PRESET TO 10 |
| 00215 | 2120F8 | LXI | H,TMRBASE: | H&L = ADDR OF 1ST 10 MSEC TIMER |
| 00218 | AF | XRA | A | A = 0 (SET 'Z' CONDITION CODE) |
| 00219 | C | ADI | TIMCNT1: + TIMCNT2: | A = TOTAL # OF TIMERS (10 & 100) |
| 00218 | 1601 | MVI | D,1 | SET ALL TIMERS TO TERMINAL CNT |
| 0021D | CA2602 | WHILE | CC,Z,C | WHILE # TIMERS .NE. 0... |
| 00220 | 72 | MOV | M,D | HALT THE PRESENT TIMER |
| 00221 | 23 | INX | H | MOVE TO NEXT TIMER LOC |
| 00222 | 3D | DCR | A | DECRM LOOP CNTR (# OF TIMERS) |
| 00223 | C31D02 | ENDWHILE | | |
| 00226 | 2121F7 | LXI | H,FLT*TBL | INITIALIZE WHERE FLT HANDLER |
| 00229 | 2279F8 | SHLD | FLT*ADDR | STARTS TO LOOK FOR FAULTS |
| 0022C | 3E80 | SFLG | FLT*TOP | USED TO INITIALIZE FAULT VALUE |
| 0022E | 325EF4 | | | |
| 00231 | 21CB01 | LXI | H,EV*STBY: | H&L = ADDR OF STBY EVENT TABLE |
| 00234 | 2250F8 | SHLD | EV*PTR: | SAVE FOR MACH CLK ROUTINE |
| 00237 | 2EF0 | MVI | A,X'FO' | LOAD 'RESET INTERRUPTS' DATA |
| 00239 | 3200E6 | STA | RSINTFF: | RESET ALL INTERRUPT FLIP-FLOPS |
| 0023C | FB | EI | | ENABLE INTERRUPT SYSTEM |
| 0023D | 21DCFF | SOBIT | PFO$OFF | TURN OFF PITCH FADE-OUT LAMP |
| 0024D | 3E20 | | | |
| 00242 | F3 | | | |
| 00243 | B6 | | | |
| 00244 | 77 | | | |
| 00245 | FB | | | |
| 00246 | 2131FF | SOBIT | 24V$SPL | TURN ON 24 VOLT SUPPLY |
| 00249 | 3E20 | | | |
| 0024B | F3 | | | |
| 0024C | B6 | | | |
| 0024D | 77 | | | |
| 0024E | FB | | | |
| 0024F | 3E47 | STIM | ILK*TIME,7000 | SET BLOWER START-UP DELAY |
| 00251 | 322FF8 | | | |
| 00254 | C9 | RET | | RETURN TO STATE CHECKER |
| | | SYSTEM NOT-READY STATE BACKGROUND- PROLOG | | |
| 0032C | DC5C03 | NRDY: CALL | NRDY:SSL | DO SLW-SCAN BKGD AT LEAST ONCE |
| | | SYSTEM NOT-READY STATE BACKGROUND- WHILE: LOOP | | |
| 00255 | 3A08FE | NRDY: WHILE: | XBYT,STATE:,EQ,1 | DO NRDY LOOP WHILE COND EXISTS |
| 00258 | FE01 | | | |
| 0025A | C28002 | | | |
| 0025D | CD2C06 | CALL | STBYBKG: | CALL COMMON STBY BKGND SUBRIS |
| 00260 | CD4B06 | CALL | DELAY | |
| 00263 | CD0000 | CALL | FLT*DISP | DISPLAY FAULT CODE |
| 00266 | CD0000 | CALL | RED*BGND | CONTROL LENS IN NRDY: STATE |
| 00269 | CD0000 | CALL | SOS*SUS | SOS JAM DETECTION |
| 0026C | CD0000 | CALL | BLK*NRDY | BLINK THE WAIT LAMP |
| 0026F | CD205 | CALL | RDYTEST: | CALL READY CONDITION TEST SUBR |
| 00272 | 3A09F4 | IF: | FLG,ALL*RDY,T | ARE ALL READY CONDITIONS OK |
| 00275 | 07 | | | |
| 00276 | D27D02 | | | |
| 00279 | 2108FE | INCBYT | STATE: | YES, MOVE TO RDY STATE |
| 0027C | 34 | | | |
| | | ENDIF | | |
| 0027D | C35502 | ENDWHILE | | |
| | | SYSTEM NOT-READY STATE BACKGROUND. EPILOG | | |
| 00280 | 21E9FF | COBIT | WAIT$ | TURN OFF WAIT LAMP |
| 00283 | 3EFE | | | |
| 00285 | FE | | | |
| 00286 | A6 | | | |
| 00287 | 77 | | | |
| 00288 | FB | | | |
| 00289 | C9 | RET | | RETURN TO STATE CHECKER |
| | | SYSTEM READY STATE BACKGROUND- PROLOG | | |
| 0028A | 21E7FF | RDY: SOBIT | READY$ | TURN ON READY LAMP |
| 0028D | 3E01 | | | |
| 0028F | F3 | | | |
| 00290 | B6 | | | |
| 00291 | 77 | | | |
| 00292 | FB | | | |
| 00293 | AF | CFLG | STRT:PRT | DISALLOW PRINT UNTIL SWSK CALLS |
| 00294 | 324EF4 | | | |

TABLE I-continued

STATE CHECKER ROUTINE (STATCHK)

```
                    SYSTEM READY STATE BACKGROUND. WHILE: LOOP
00297   3A08FE      WHILE:          XBYT,STATE:,EQ,2        DO RDY LOOP WHILE COND EXISTS
0029A   FE02
0029C   C2C602
0029F   CD2C06      CALL            STBYBKG:                CALL COMMON STBY BKGND SUBRIS
002A2   CD4B06      CALL            DELAY
002A5   CD0000      CALL            SFT*CALC                CALC SHIFTED IMAGE VALUES
002A8   CDD205      CALL            RDYTEST:                CALL READY CONDITION TEST SUBR
002AB   2108FE      LXI             H,STATE:                H&I = ADDR OF STATE:
002AE   3A09F4      IF:             FLG,ALL*RDY,F           ARE ALL READY CONDITIONS OK
002B1   07
002B2   DABA02
002B5   3601        MVI             M,1                     NO, LOAD 1 INTO STATE: (NRDY)
002B7   C3C302      ELSE:                                   ALL READY CONDITIONS MET
002BA   3A4EF4      IF:             FLG,STRT:PRT,T          HAS 'START PRINT' BEEN PUSHED
002BD   07
002BE   D2C302
002C1   3603        MVI             M,3                     YES, LOAD 3 INTO STATE: (PRINT)
                    ENDIF
                    ENDIF
002C3   C39702      ENDWHILE
                    SYSTEM READY STATE BACKGROUND- EPILOG
002C6   21E7FF      COBIT           READY$                  TURN OFF READY LAMP
002C9   3EFE
002CB   F3
002CC   A6
002CD   77
002CE   FB
002CF   C9          RET                                     RETURN TO STATE CHECKER
        PRINT STATE BACKGROUND- PROLOG 1
002D0   AF          PRINT: XRA      A                       CLR A-REG FOR USE AS CN3R
002D1   47          MOV             B,A                     CLR B-REG (0'S INTO SHIFTREG)
002D2   2100F8      LXI             H,SHIFTREG              H&L = START ADDR OF SHIFTREG
002D5   FE20        WHILE:          XBYT,A,LT,32            WHILE STILL IN SR...(CLR SR)
002D7   D2E002
002DA   70          MOV             M,B                     CLR PRESENT SR LOCATION
002DB   23          INX             H                       MOVE TO NEXT SR LOCATION
002DC   3C          INR             A                       INCRM LOOP CNTR
002DD   C3D502      ENDWHILE
002E0   3E80        SFLG            910*DONE                ALLOW FIRST PITCH RESET
002E2   3260F4
002E5   3E80        SFLG            SRSK*FLG                SIGNAL NEW SR VALUE REQ'D
002E7   321CF4
002EA   AF          XRA             A
002EB   3207FE      STA             CYCUPCT:                INIT CYCLE-UP CNTR TO 0
002EE   3205FE      STA             SR*VALU:                INIT 'NEW SR VALUE' TO 0
002F1   3E03        MVI             A,3
002F3   320AFE      STA             NOIMGCT:                INIT 'NO IMAGE CNTR' TO 3
002F6   CD0000      CALL            SRSK                    SHIFT REG SCHEDULER (INIT SR#0)
002F9   CD0000      CALL            TBLD*PRT                BUILD NEW PITCH TABLE
002FC   3E51        STIM            SYS:TIMR,800            INIT 'OVER-RUN EVENT' TIMER
002FE   3221F8
00301   21F5FF      SOBIT           PRNT$RLY                TURN ON PRINT RELAY (PRINT)
00304   3E08
00306   F3
00307   B6
00308   77
00309   FB
0030A   21DCFF      COBIT           PFO$OFF                 TURN ON FADE-OUT LAMP
0030D   3EDF
0030F   F3
00310   A6
00311   77
00312   FB
00313   AF          CFLG            NORM*DN:                CLR NORMAL SHUTDOWN REQUEST
00314   3210F4
00317   AF          CFLG            SL1*DLY                 CLR SIDE 1 DELAY FLAG
00318   3216F4
0031B   AF          CFLG            TIME*DN:                CLR TIMED SHUTDOWN REQUEST FLAG
0031C   324BF7
0031F   AF          CFLG            IMGMADE:                CLR 1st IMAGE MADE FLAG
00320   320FF4
00323   AF          CFLG            CYCL*DN:                CLR CYCLE-DOWN REQUEST FLAG
00324   3249F7
00327   AF          CFLG            IMED*DN:                CLR IMMED SHUTDOWN REQUEST FLAG
00328   324AF7
0032B   AF          CFLG            SD1*TIMO                CLR SIDE 1 TIME OUT FLAG
0032C   3207F4
0032F   AF          CFLG            PROC*JAM                CLEAR IN CASE THERE WAS A JAM
00339   CD0000      CALL            PAP*SIZE CHECK PAPER WIDTH FOR FUSER
0033C   CD0000      CALL            PROG*UP                 PROG INITIALIZATION SUBR
0033F   CD0000      CALL            CLBK*SPR                COLOR BKGRD HI BIAS AT SRT PRT
00342   CD0000      CALL            SET*UP                  INITIALIZE ITEMS FOR PAPER PATH
00345   CD0000      CALL            FDR*PRT                 CHECK FEEDER SELECTION
                    CALL TO EDGE*FB MUST BE AFTER CALL TO PAP*SIZE
00348   CD0000      CALL            EDGE*FO                 DETERMINE WHICH EDGE FADE OUT
                    PRINT STATE BACKGROUND- WHILE: LOOP
0034B   3A08FE      WHILE:          XBYT,STATE:,EQ,3        DO PRINT WHILE COND EXISTS
0034E   FE03
00350   C27404
00353   3A07FE      IF:             XBYT,CYCUPCT:,EQ,3      IS CYCLE-UP CNTR = 3
00356   FE03
00358   C26303
```

TABLE I-continued

STATE CHECKER ROUTINE (STATCHK)

| | | | | |
|---|---|---|---|---|
| 00358 | 3E80 | SFLG | PRT*PRO2 | YES, SET 'PINT PROLOG 2' FLAG |
| 0035D | 3220F4 | | | |
| 00360 | C37D03 | ORIF: | XBYT,A,EQ,4 | NO, IS CYCLE-UP CNTR = 4 |
| 00363 | FE04 | | | |
| 00365 | C27D03 | | | |
| 00368 | 3A20F4 | ANDIF: | FLG,PRT*PRO2,T | YES, AND IS PROLOG 2 FLAG SET |
| 0036B | 07 | | | |
| 0036C | D27D03 | | | |
| 0036F | AF | CFLG | PRT*PRO2 | YES, DO PROLOG 2 and CLR FLAG |
| 00370 | 3220F4 | | | |
| | | PRINT STATE BACKGROUND- PROLOG 2 | | |
| 00373 | 3A0FF4 | IF: | FLG,IMGMADE:,T | HAS 1ST IMAGE BEEN MADE |
| 00376 | 07 | | | |
| 00377 | D27D03 | | | |
| 0037A | CD0000 | CALL | PROG*UP | YES, CALL PROG INITIALIZATION |
| | | ENDIF | | |
| | | ENDIF | | |
| 0037D | CD0000 | CALL | SRSK | SHIFT REG SCHEDULER SUBR |
| 00380 | CD0000 | CALL | PRT*SWS | PRINT SWITCH SCAN SUBR |
| 00389 | CD4B06 | CALL | DELAY | |
| 0038C | CD0000 | CALL | READY*CK | CONTROL READY LAMP IN PRINT |
| 0038F | CD0000 | CALL | DSPL*CTL | CONTROL DIGITAL DISPLAY |
| 00392 | CD0000 | CALL | RLTIM*DO | COMPLETE PROG PITCH EVENTS |
| 00395 | CD0000 | CALL | FUS*RDUT | TEST FUSER FOR UNDER-TEMP |
| 00398 | CD0000 | CALL | OIL*MSFD | STOP OIL IS MISFEED |
| 0039B | CD0000 | CALL | SOS*JMDT | SOS PRT JAM CHECK |
| 003A1 | CD0000 | CALL | MANL*DN | CHECK MANUAL DN SW |
| 003A4 | CD0000 | CALL | NM*ELV*P | MONITOR MAIN TRAY IN PRINT |
| 003A7 | CD0000 | CALL | TON*DIS | TONER DISPENSE ROUTINE |
| 003AA | CD0000 | CALL | DVLMB*JM | DVL OPERATION IF MISFEED |
| 003AD | CD0000 | CALL | SETJ6T0G | CHECK JAM6 FOR EXIT OF COPY |
| 003B0 | CD0000 | CALL | FDR*BK*R | RESET FEEDER HARDWARE |
| 003B3 | CD0000 | CALL | FDR*BKF1 | 1ST SHEET FAULT DETECT (FDR) |
| 003B6 | CD0000 | | | |
| 003B9 | 2108FE | LXI | H,STATE: | H&L = ADDR OF STATE: BYTE |
| 003BC | 3A4AF7 | IF: | FLG,IMED*DN:,T | IS IMMED SHUTDOWN REQUESTED |
| 003BF | 07 | | | |
| 003C0 | D2C703 | | | |
| 003C3 | 34 | INR | M | YES, MOVE TO RUNNPRT: STATE |
| 003C4 | C34B04 | ELSE: | | IMMED SHUTDOWN NOT REQUESTED |
| 003C7 | 3A0AFE | LDA | NOIMGCT: | PREPARE TO TEST 'NO IMAGE CNTR' |
| 003CA | 47 | MOV | B,A | B = <NO IMAGE CNTR> |
| 003CB | 3A49F7 | IF: | FLG,CYCL*DN:,T | IS CYCLE-DOWN REQUESTED |
| 003CE | 07 | | | |
| 003CF | D2F803 | | | |
| 003D2 | 3A0FF4 | IF: | FLG,IMGMADE*,F | YES, HAS 1ST IMAGE BEEN MADE |
| 003D5 | 07 | | | |
| 003D6 | DADD03 | | | |
| 003D9 | 34 | INR | M | NO, MOVE TO RUNNPTR: STATE |
| 003DA | C3F503 | ORIF: | FLG,SD1*TIMEO,T | IS PROC MAKING SIDE 1'S - DUPLEX |
| 003DD | 3A07F4 | | | |
| 003E0 | 07 | | | |
| 003E1 | D2EE03 | | | |
| 003E4 | 78 | IF: | XBYT,B,GE,16 | YES, WERE THERE>15 NO IMAGES |
| 003E5 | FE10 | | | |
| 003E7 | DAEB03 | | | |
| 003EA | 34 | INR | M | YES, MOVE TO RUNNPRT: STATE |
| | | ENDIF | | |
| 003EB | C3F503 | ORIF: | XBYT,B,GE,13 | WERE THERE>12 NO IMAGES |
| 003EE | 78 | | | |
| 003EF | FE0D | | | |
| 003F1 | DAF503 | | | |
| 003F4 | 34 | INR | M | YES, MOVE TO RUNNPRT: STATE |
| | | ENDIF | | |
| 003F5 | C34B04 | ORIF: | FLG,NORM*DN:,T | IS A NORMAL SHUTDOWN REQUESTED |
| 003F8 | 3A10F4 | | | |
| 003FB | 07 | | | |
| 003FC | D20A04 | | | |
| 003FF | 3A0FF4 | ANDIF: | FLG,IMGMADE:,F | YES, AND ARE O IMAGES FLASHED |
| 00402 | 07 | | | |
| 00403 | DA0A04 | | | |
| 00406 | 34 | INR | M | YES, MOVE TO RUNNPRT: STATE |
| 00407 | C34B04 | ORIF: | FLG,SD1*TIMO,T | IS PROC MAKING SIDE 1'S- DUPLEX |
| 0040A | 3A07F4 | | | |
| 0040D | 07 | | | |
| 0040E | D22C04 | | | |
| 00411 | 3A39F4 | IF: | FLG,ADH*MUTF,F | YES, IS ADH IN MULT FEED MODE |
| 00414 | 07 | | | |
| 00415 | DA2204 | | | |
| 00418 | 78 | IF: | XBYT,B,GE,36 | NO, WERE THERE>35 NO IMAGES |
| 00419 | FE24 | | | |
| 00418 | DA1F04 | | | |
| 0041E | 34 | INR | M | YES, MOVE TO RUNNPRT: STATE |
| | | ENDIF | | |
| 0041F | C32904 | ELSE: | | |
| 00422 | 78 | IF: | XBYT,B,GE,16 | WERE THERE>15 NO IMAGES |
| 00423 | FE10 | | | |
| 00425 | DA2904 | | | |
| 00428 | 34 | INR | M | YES, MOVE TO RUNNPRT: STATE |
| | | ENDIF | | |
| | | ENDIF | | |
| 00429 | C34B04 | ORIF: | FLG,ADH*MUTF,F | IS ADH NOT IN MULTIPLE FEED |
| 0042C | 3A39F4 | | | |

TABLE I-continued

STATE CHECKER ROUTINE (STATCHK)

| | | | | |
|---|---|---|---|---|
| 0042F | 07 | | | |
| 00430 | DA4404 | | | |
| 00433 | 3A38F4 | ANDIF: | FLG,ADH*SINF,F | YES, AND IS IT NOT IN SINGLE |
| 00436 | 07 | | | |
| 00437 | DA4404 | | | |
| 0043A | 78 | IF: | XBYT,B,GE,21 | NO, WERE THERE >20 NO IMAGES |
| 0043B | FE15 | | | |
| 0043D | DA4104 | | | |
| 00440 | 34 | INR | M | YES, MOVE TO RUNNPRT: STATE |
| | | ENDIF | | |
| 00441 | C34BO4 | ELSE: | | ADH IS SELECTED |
| 00444 | 78 | IF: | XBYT,B,GE,13 | WERE THERE> 12 NO IMAGES |
| 00445 | FEOD | | | |
| 00447 | DA4BO4 | | | |
| 0044A | 34 | INR | M | YES, MOVE TO RUNNPRT: STATE |
| | | ENDIF | | |
| | | ENDIF | | |
| | | PRINT STATE BACKGROUND-EPILOG | | |
| 0044B | 3A10F4 | IF: | FLG,NORM*DN:,F | IS NORMAL SHUTDOWN REQUESTED |
| 0044E | 07 | | | |
| 0044F | DA6304 | | | |
| 00452 | 3A49F7 | ANDIF: | FLG,CYCL*DN:,F | NO, IS CYCLE-DOWN REQUESTED |
| 00455 | 07 | | | |
| 00456 | DA6304 | | | |
| 00459 | 3A16F4 | ANDIF: | FLG,SD1*DLY,F | NO, IS PROC DEAD CYCLING |
| 0045C | 07 | | | |
| 0045D | DA6304 | | | |
| 00460 | C37104 | ELSE: | | 1 OR BOTH COND'S REQUESTED |
| 00463 | 3E02 | MVI | A,2 | LOAD 2 INTO CYCLE-UP CNTR TO |
| 00465 | 3207FE | STA | CYCUPCT: | FORCE THE CYCLE-UP MODE AGAIN |
| 00468 | 21DAFF | COBIT | ILLM$SPL | ILLM SPL OFF DURING DEAD CYCLE |
| 0046B | 3EF7 | | | |
| 0046D | F3 | | | |
| 0046E | A6 | | | |
| 0046F | 77 | | | |
| 00470 | FB | | | |
| | | ENDIF | | |
| 00471 | C34BO3 | ENDWHILE | | |
| 00474 | 21F5FF | COBIT | PRNT$RLY | TURN OFF PRINT RELAY |
| 00477 | 3EF7 | | | |
| 00479 | F3 | | | |
| 0047A | A6 | | | |
| 0047B | 77 | | | |
| 0047C | FB | | | |
| 0047D | AF | CFLG | TBLD*FIN | SIGNAL NEW PITCH TABLE REQ'D |
| 0047E | 325DF4 | | | |
| 00481 | 21CB01 | LXI | H,EV*STBY: | H&L = ADDR STBY EVENT TABLE |
| 00484 | 2250F8 | SHLD | EV*PTR: | SAVE FOR MACH CLK ROUTINE |
| 00487 | 21DCFF | COBIT | PFO$OFF | TURN OFF FADE-OUT LAMP |
| 0048A | 3EDF | | | |
| 0048C | F3 | | | |
| 0048D | A6 | | | |
| 0048E | 77 | | | |
| 0048F | FB | | | |
| 00490 | 21EEFF | COBIT | EFO$11 | CLEAR 11 in EDGE FADE-OUT LAMP |
| 00493 | 3EF7 | | | |
| 00495 | F3 | | | |
| 00496 | A6 | | | |
| 00497 | 77 | | | |
| 00498 | FB | | | |
| 00499 | 21D9FF | COBIT | EFO$12$5 | CLEAR 12.5 IN EDGE FADE-OUT |
| 0049C | 3EF7 | | | |
| 0049E | F3 | | | |
| 0049F | A6 | | | |
| 004AO | 77 | | | |
| 004A1 | FB | | | |
| 004A2 | CALL | FUSNTRDY | TURN OFF FUSER STUFF | |
| CD0000 | | | | |
| 004A5 | CD0000 | CALL | SOS*STBY | CLEAR SOS ENABLE |
| 004A8 | 21EEFF | COBIT | DTCK$EDG | |
| 004AB | 3EBF | | | |
| 004AD | F3 | | | |
| 004AE | A6 | | | |
| 004AF | 77 | | | |
| 004BO | FB | | | |
| 004B1 | 21F6FF | COBIT | XER$CURR | TURN OFF TRANSFER CIRCUIT |
| 004B4 | 3EBF | | | |
| 004B6 | F3 | | | |
| 004B7 | A6 | | | |
| 004B8 | 77 | | | |
| 004B9 | FB | | | |
| 004BA | 21F0FF | COBIT | ZER$LOAD | RELEASE TRANSFER ROLL |
| 004BD | 3EDF | | | |
| 004BF | F3 | | | |
| 004CO | A6 | | | |
| 004C1 | 77 | | | |
| 004C2 | FB | | | |
| 004C3 | 21F3FF | COBIT | AX$WT | TURN OFF AUXILIARY TRAY WAIT |
| 004C6 | 3EFD | | | |
| 004C8 | F3 | | | |
| 004C9 | A6 | | | |
| 00004CA | 77 | | | |
| 004CB | FB | | | |

TABLE I-continued

| | | | | |
|---|---|---|---|---|
| | | | STATE CHECKER ROUTINE (STATCHK) | |
| 004CC | 21F4FF | COBIT | MN$WT | TURN OFF MAIN TRAY WAIT |
| 004CF | 3EFD | | | |
| 004D1 | F3 | | | |
| 004D2 | A6 | | | |
| 004D3 | 77 | | | |
| 004D4 | FB | | | |
| 004D5 | 21FBFF | COBIT | AXFD$INT | TURN OFF AUXILIARY FEEDER |
| 004D8 | 3EFD | | | |
| 004DA | F3 | | | |
| 004DB | A6 | | | |
| 004DC | 77 | | | |
| 004DD | FB | | | |
| 004DE | 21FAFF | COBIT | MNFD$INT | TURN OF MAIN FEEDER |
| 004E1 | 3EFD | | | |
| 004E3 | F3 | | | |
| 004E4 | A6 | | | |
| 004E5 | 77 | | | |
| 004E6 | FB | | | |
| 004E7 | 21DAFF | COBIT | ILLM$SPL | TURN OFF ILLUMINATION LAMP SUPPLY |
| 004EA | 3EF7 | | | |
| 004EC | F3 | | | |
| 004ED | A6 | | | |
| 004EE | 77 | | | |
| 004Ef | FB | | | |
| 004F0 | CD0000 | CALL | DVL*NRDY | TURNS OFF DVL IF JAM |
| 004F3 | C9 | RET | | RETURN TO STATE CHECKER |
| | | SYSTEM RUNNING, NOT PRINT STATE BACKGROUND- WHILE: LOOP | | |
| 004F4 | 3A08FE | RUNNPRT WHILE: | XBYT,STATE:,EQ,4 | DO RUNNPRT WHILE COND EXISTS |
| 004F7 | FEO4 | | | |
| 004F9 | C28805 | | | |
| 004FC | CD0000 | CALL | READY*CK | CONTROL READY LAMP IN RUNNPRT: |
| 004FF | CD0000 | CALL | DSPL*CTL | CONTROL DIGITAL DISPLAY |
| 00502 | CD0000 | CALL | RLTIM*D0 | COMPLETE PROG PITCH EVENTS |
| 00505 | CD0000 | CALL | ILK*CK | |
| 00508 | CD0000 | CALL | RILK*CK | |
| 00508 | CD0000 | CALL | FUS*RDUT | TEST FUSER FOR UNDER-TEMP |
| 0050E | CD0000 | CALL | MANL*DN | CHECK MANUAL DN SW |
| 00511 | CD0000 | CALL | MN*ELV*S | MONITORS MAIN TRAY IN SDBY |
| 00514 | CD4B06 | CALL | DELAY | |
| 00517 | CD0000 | CALL | SETJ6TOG | CHECK JAM6 SW FOR EXIT OF COPY |
| 0051A | 3A58F4 | IF: | FLG,SRT*SETF,T | IS SRT SELECTED (SETS MADE) |
| 0051D | 07 | | | |
| 0051E | D23205 | | | |
| 00521 | 3A6EF4 | ANDIF: | FLG,SRT*COPY,F | YES, AND ARE SRT COPIES ,NE.0 |
| 00524 | 07 | | | |
| 00525 | DA3205 | | | |
| 00528 | 3A6CF4 | ANDIF: | FLG,SRT*JAM,F | YES, AND IS SRT JAM-FREE |
| 0052B | 07 | | | |
| 0052C | DA3205 | | | |
| | | ALL TESTS PASSED- STAY IN RUNNPRT: STATE | | |
| 0052F | C38505 | ORIF: | FLG,SRT*STKF,T | IS SRT SELECTED (STKS MODE) |
| 00532 | 3A59F4 | | | |
| 00535 | 07 | | | |
| 00536 | D24A05 | | | |
| 00539 | 3A6EF4 | ANDIF: | FLG,SRT*COPY,F | YES, AND ARE SRT COPIES ,NE.0 |
| 0053C | 07 | | | |
| 0053D | DA4A05 | | | |
| 00540 | 3A6CF4 | ANDIF: | FLG,SRT*JAM,F | YES, AND IS SRT JAM-FREE |
| 00543 | 07 | | | |
| 00544 | DA4A05 | | | |
| | | ALL TESTS PASSED- STAY IN RUNNPRT: STATE | | |
| 00547 | C38505 | ORIF: | FLG,SD1*TIMO,T | ARE SIDE 1 COPIES GOING TO AUX |
| 0054A | 3A07F4 | | | |
| 0054D | 07 | | | |
| 0054E | D25C05 | | | |
| 00551 | 3AF1FF | ANDIF: | OBIT,RET$MOT,T | YES, AND IS RETURN PATH MOTOR ON |
| 00554 | E608 | | | |
| 0556 | CA5C05 | | | |
| | | ALL TESTS PASSED- STAY IN RUNNPRT: STATE | | |
| 00559 | C38505 | ORIF: | FLG,SYS:TIME,T | HAS TIMER BEEN INITIATED (PLL |
| 0055C | 3A1FF4 | | | |
| 0055F | 07 | | | |
| 00560 | D27305 | | | |
| | | | | UNLOCKED LAST TIME THRU) |
| 00563 | 3A21F8 | IF: | TIM,SYS:TIMR,L | YES, IS TIMER TIMED OUT |
| 00566 | D601 | | | |
| 00568 | C27005 | | | |
| 0056B | 3E01 | MVI | A,1 | YES, LOAD 1 INTO STATE: FORCING |
| 0056D | 3208FE | STA | STATE: | MOVE TO NRDY STATE |
| | | ENDIF | | |
| 00570 | C38505 | ORIF: | XBYT,RIS#BYT,AND,PLL,NZ | TIMER NOT USED: IS PLL LOCKED |
| 00573 | 3A0036 | | | |
| 00576 | E610 | | | |
| 00578 | CA8505 | | | |
| 00578 | 3E1F | STIM | SYS:TIMR,300 | NO, SET TIMER TO 300 MSEC |
| 0057D | 3221F8 | | | |
| 00580 | 3E80 | SFLG | SYS:TIMF | SET 'TIMER IN USE' FLAG |
| 00582 | 321FF4 | | | |
| | | ENDIF | | |
| 00585 | C3F404 | ENDWHILE | | |
| | | SYSTEM RUNNING, NOT PRINT STATE BACKGROUND-EPILOG | | |
| 00588 | CD0000 | CALL | DEL*CK | CALC COPIES DELIVERED INFO |
| 00588 | 21F3FF | COBIT | FUS$TRAP | INSURE FUSER TRAP SOL OFF |

TABLE I-continued

STATE CHECKER ROUTINE (STATCHK)

| | | | | | |
|---|---|---|---|---|---|
| 0058E | 3EDF | | | | |
| 00590 | F3 | | | | |
| 00591 | A6 | | | | |
| 00592 | 77 | | | | |
| 00593 | FB | | | | |
| 00594 | C9 | RET | | | RETURN TO STATE CHECKER |
| | | TECH REP STATE BACKGROUND- WHILE: LOOP | | | |
| 00595 | 3A08FE | TECHREP: WHILE | | XBYT,STATE:,EQ,5 | DO TECHREP WHILE COND EXISTS |
| 00598 | FE05 | | | | |
| 0059A | C2AB05 | | | | |
| 0059D | CD0000 | CALL | | ILK*CK | |
| 005A0 | CD0000 | CALL | | NRILK*CK | |
| 005A3 | 3E01 | MVI | | A,1 | LOAD 1 INTO STATE: TO FORCE A |
| 005A5 | 3208FE | STA | | STATE: | CHANGE TO NRDY STATE |
| 005A8 | C39505 | ENDWHILE | | | |
| 005AB | C9 | RET | | | RETURN TO STATE CHECKER |

TABLE II

SCAN FAULT FLAGS / LOOP

| | | | | | |
|---|---|---|---|---|---|
| 01008 | 3A4CF7 | FLT*SCAN IF: | | FLG,PROC*JAM,F | CHECK FOR PROCESSOR JAM |
| 01008 | 07 | | | | |
| 0100C | DA1210 | | | | |
| 0100F | CDCB10 | CALL | | JAM*SCAN | LOOK FOR PAPER ON SWITCHES |
| | | ENDIF | | | |
| 01012 | 2121F7 | LXI | | H,FLT*TBL | GET STARTING ADDR OF FLAG ARRAY |
| 01015 | 3A0210 | LDA | | FLT*CNT | GET NO. OF FLAGS |
| 01018 | 47 | MOV | | B,A | |
| 01019 | 1E00 | MVI | | E,0 | ZERO FAULT COUNTER |
| 01018 | 53 | MOV | | D,E | ZERO CASE COUNTER |
| 0101C | 78 | WHILE: | | VBYT,B,NZ | SCAN FLAGS |
| 01010 | Fe00 | | | | |
| 0101F | CA3810 | | | | |
| 01022 | 14 | INR | | D | INCREMENT COUNTER |
| 01023 | 7E | MOV | | A,M | GET FLAG |
| 01024 | 23 | INX | | H | POINT TO NEXT FLAG |
| 01025 | 07 | RLC | | | |
| 01026 | D23410 | IF: | | CC,C,S | TEST FLAG |
| 01029 | 1C | INR | | E | FLAG IS SET, COUNT IT |
| 0102A | 3A0110 | IF: | | XBYT,FLT*CDPL,GE,D | ARE BOTH CODE AND LAMPS REQD |
| 0102D | BA | | | | |
| 0102E | DA3410 | | | | |
| 01031 | CD0000 | CALL | | FLT*LAMP | DETERMINE WHICH LAMPS |
| | | ENDIF | | | |
| | | ENDIF | | | |
| 01034 | 05 | DCR | | B | DECREMENT FLAG COUNT |
| 01035 | C31C10 | ENDWHILE | | | |
| 01038 | 7B | IF: | | VBYT,E,NZ | ARE ANY FLAGS SET |
| 01039 | FE00 | | | | |
| 01038 | CA4810 | | | | |
| 01038 | 2181FF | SOBIT | | PRES$FCD | PRESS FAULT CODE LAMP ON |
| 01041 | 3E01 | | | | |
| 01043 | F3 | | | | |
| 01044 | B6 | | | | |
| 01045 | 77 | | | | |
| 01046 | FB | | | | |
| 01047 | AF | CFLG | | FLT*RDY | RESET FLAG, INDICATE FAULT |
| 01048 | 327BF7 | | | | |
| 01048 | C35C10 | ELSE: | | | NO FLAGS SET |
| 01404E | 21F1FF | COBIT | | PRES$CD | PRESS FAULT CODE LAMP - OFF |
| 01051 | 3EFE | | | | |
| 01053 | F3 | | | | |
| 01054 | A6 | | | | |
| 01055 | 77 | | | | |
| 01056 | FB | | | | |
| 01057 | 3E80 | SFLG | | FLT*RDY | SET FLAG, NO FAULT PRESENT |
| 01059 | 328BF7 | | | | |
| | | ENDIF | | | |
| 0105C | 7B | MOV | | A,E | YES |
| 0105D | 321DF8 | STA | | FLT*TOT | SAVE NO. OF FLAGS SET |
| 01060 | C9 | RET | | | |

TABLE III

DISPLAY FAULT CODE / LOOP - NOT READY

| | | | | | |
|---|---|---|---|---|---|
| 02B09 | 3A32F4 | FLT*DISP IF: | | FLG,DSPL*FLT,T | DISPLAY FLT CODE WAS PUSHED |
| 02B0C | 07 | | | | |
| 02B0D | D24C2B | | | | |
| 02B10 | 3A22FE | IF: | | VBYT,FLT*TOT,NZ | FAULTS EXIST |
| 02B13 | FE00 | | | | |
| 02B15 | CA3928 | | | | |
| 02B18 | 2E6A | ANDIF: | | 1BIT,FAULT#CD,T | BUTTON STILL PUSHED |
| 02B1A | CD0000 | | | | |
| 02B1D | D2392B | | | | |
| 02B20 | 3A0EF4 | IF: | | FLG,FLT*SHOW,F | CHECK IF CODE ALREADY DISPLAYED |
| 02B23 | 07 | | | | |
| 02B24 | DA362B | | | | |
| 02B27 | CD952B | CALL | | FLT*FIND | LOOK FOR NEXT FAULT IN TABLE |
| 02B2A | CD0A2C | CALL | | FLT*DCTL | GET FAULT CODE,PREP FOR DISPLAY |

TABLE III-continued

DISPLAY FAULT CODE / LOOP - NOT READY

| | | | | |
|---|---|---|---|---|
| 02B2D | AF | CFLG | DSPL*1ST | REQUEST DISPLAY OF FAULT CODE |
| 02B2E | 3231F4 | | | |
| 02B31 | 3E80 | SFLG | FLT*SHOW | FAULT CODE READY FOR DISPLAY |
| 02B33 | 320EF4 | | | |
| | | ENDIF | | |
| 02B36 | C23C2B | ELSE: | | |
| 02B39 | 3A6FF4 | IF: | FLG,FLT*CSHW,F | |
| 02B3C | 07 | | | |
| 02B3D | DA4C2B | | | |
| 02B40 | AF | CFLG | DSPL*1ST | CALL FOR OLD DISPLAY |
| 02B41 | 3231F4 | | | |
| 02B44 | AF | CFLG | DSPL*FLT | DO NOT DISPLAY FAULT CODE |
| 02B45 | 3232F4 | | | |
| 02B48 | AF | CFLG | FLT*SHOW | |
| 02B49 | 320EF4 | | | |
| | | ENDIF | | |
| | | ENDIF | | |
| | | ENDIF | | |
| 02B4C | C9 | RET | | |

TABLE IV

FAULT DISPLAY - TOP COVER CONTROL / LOOP - NOT READY

| | | | | |
|---|---|---|---|---|
| 02B4D | 3A0EF4 | FLT*COVR IF: | FLG,FLT*SHOW,F | CHECK IF DISP FAULT CODE PUSHED |
| 02B50 | 07 | | | |
| 02B51 | DA942B | | | |
| 02B54 | 3A7CF7 | IF: | FLG,PROC*JAM,T | CHECK FOR PROCESSOR JAM |
| 02B57 | 07 | | | |
| 02B58 | D2812B | | | |
| 02B58 | 2EF9 | ANDIF: | IBIT,TCVR#OPN,T | CHECK IF TOP COVER IS OPEN |
| 02B5D | CD0000 | | | |
| 02B60 | D2812B | | | |
| 02B63 | 3A6FF4 | IF: | FLG,FLT*CSHAW,F | CHECK IF DISPLAY REQ BY COVER |
| 02B66 | 07 | | | |
| 02B67 | DA7E2B | | | |
| 02B6A | CD8B2B | CALL: | FLT*CFND | FIND WHICH FLAG IS SET |
| 02B6D | CD0A2C | CALL: | FLT*DCTL | GET FAULT CODE |
| 02B70 | 3F80 | SFLG | FLT*CSHW | |
| 02B72 | 326FF4 | | | |
| 02B75 | 3E80 | SFLG | DSPL*FLT | REQUEST DISPLAY OF FAULT CODE |
| 02B77 | 3232F4 | | | |
| 02B74 | AF | CFLG | DSPL:1ST | |
| 02B7B | 3231F4 | | | |
| | | ENDIF | | |
| 02B73 | C3842B | ELSE: | | |
| 02B81 | 3A7FF4 | IF: | FLG,FLT*CSHW,T | CHECK IF DISPLAY NOT REQUIRED |
| 02B84 | 07 | | | |
| 02B85 | D2942B | | | |
| 02B88 | AF | CFLG | FLT*CSHW | CLEAR FLAGS |
| 02B89 | 326FF4 | | | |
| 02B8C | AF | CFLG | DSPL*1ST | |
| 02B8D | 3231F4 | | | |
| 02B90 | AF | CFLG | DSPL*FLT | |
| 02B91 | 3232F4 | | | |
| | | ENDIF | | |
| | | ENDIF | | |
| | | ENDIF | | |
| 02B94 | C9 | RET | | |

TABLE V

DETERMINE WHICH FAULT IS TO BE DISPLAYED / SUBR

| | | | | |
|---|---|---|---|---|
| 02B95 | 3E80 | FLT*FIND SFLG | FLT*WILE | SET WHILE: LOOP CONTROL FLAG |
| 02B97 | 3205F4 | | | |
| 02B9A | 2A79F8 | LHLD | FLT*ADDR | GET ADDRESS OF FLAG |
| 02B9D | 3A05F4 | WHILE: | FLG,FLT*WILE,T | |
| 02BA0 | 07 | | | |
| 02BA1 | 02EA2B | | | |
| 02BA4 | 3A5EF4 | IF: | FLG,FLT*TOP,T | CHECK IF AT TOP OF TABLE |
| 02BA7 | 07 | | | |
| 02BA8 | D2B32B | | | |
| 02BAB | AF | CFLG | FLT*TOP | |
| 02BAC | 325EF4 | | | |
| 02BAF | AF | XRA | A | |
| 02BB0 | C3B62B | ELSE: | | |
| 02BB3 | 3A34FE | LDA | FLT*NUM | GET FAULT POINTER |
| | | ENDIF | | |
| 02BB6 | 30 | INR | A | INCREMENT FAULT CODE |
| 02BB7 | 3234FE | STA | FLT*NUM | STORE IT |
| 02BBA | 5F | MOV | E,A | |
| 02BBB | 7E | MOV | AM, | GET FLAG |
| 02BBC | 23 | INX | H | INCREMENT FLAG ADDRESS |
| 02BBD | 07 | RLC | | |
| 02BBE | D2D92B | IF: | CC,C,S | TEST FLAG |
| 02BC1 | AF | CFLG | FLT*WILE | RESET LOOP CONTROL FLAG |
| 02BC2 | 3205F4 | | | |
| 02BC5 | 7B | IF: | XBYT,E,EQ,FLT*FLGS | CHECK FOR END OF FAULT ARRAY |
| 02BC6 | FE50 | | | |
| 02BC8 | C2D32B | | | |

TABLE V-continued

| | | | | |
|---|---|---|---|---|
| | | DETERMINE WHICH FAULT IS TO BE DISPLAYED / SUBR | | |
| 02BCB | 3E80 | SFLG | FLT*TOP | |
| 02BCD | 325EF4 | | | |
| 02BD0 | 2121F7 | LXI | H,FLT*TBL | GET STARTING ADDR OF ARRAY |
| | | ENDIF | | |
| 02BD3 | 2279F8 | SHLD | FLT*ADDR | SAVE IT |
| 02BE6 | C3E72B | ELSE: | | |
| 02BD9 | 7B | IF: | XBYT,E,EQ,FLT*FLGS | CHECK FOR END OF TABLE |
| 02BDA | FF50 | | | |
| 02BDC | C2E72B | | | |
| 02BDF | 3F80 | SFLG | FLT*TOP | |
| 02BE1 | 325FF4 | | | |
| 02BE4 | 2121F7 | LXI | H,FLT*TBL | POINT TO TOP OF ARRAY |
| | | ENDIF | | |
| | | ENDIF | | |
| 02BE7 | C39D2B | ENDWHILE | | |
| 02BEA | C9 | RET | | |

TABLE VI

| | | | | |
|---|---|---|---|---|
| | | GET DISPLAY DATA FROM TABLE / SUBR | | |
| 017D1 | 3AD017 | FLT*DCTL LDA | FLT*NUM | GET FLAT NO., USE AS POINTER |
| 017D4 | 3D | DCR | A | DECREMENT |
| 017D5 | 07 | RLC | | DOUBLE RESULTANT POINTER |
| 017D6 | 1600 | MVI | D,O | SET UP INDEX |
| 017D8 | 5F | MOV | E,A | |
| 017D9 | 218818 | LXI | H,FLT*DTBL | GET BASE ADDR OF DATA TABLE |
| 017DC | 19 | DAD | D | ADD INDEX |
| 017DD | 7E | MOV | A,M | GET LSD |
| 017DE | 3276F8 | STA | FLT*DSPL | STORE IN DISPLAY WORD (LSD) |
| 017B1 | 23 | INX | H | |
| 017B2 | 7E | MOV | A,M | GET MSD |
| 017B3 | 1176F8 | LXI | D,FLT*DSPL | |
| 017B6 | | INX | D | |
| 017B7 | 12 | STAX | D | STORE IN DISPLAY WORD (MSU) |
| 017B8 | 3E07 | MVI | A,7 | USE 100'S, 10'S, 1'S DIGITS |
| 017EA | 3278F8 | STA | FC*DIGIT | SAVE DIGIT BLANKING BITS |
| 017BD | C9 | RET | | |

TABL VII

| | | | | |
|---|---|---|---|---|
| | | LOOK FOR PAPER ON JAM SWITCHES - STANDBY / SUBR | | |
| 02D30 | 2ED7 | JAM*SCAN RIBYT | JSW*BYTE | TEST PAPER PATH JAM SWITCHES |
| 02D32 | CD0000 | | | |
| 02D35 | 3233FE | STA | JSW*BITS | SAVE CONTENTS OF BYTE |
| 02D38 | FE00 | IF: | VBYT,A,NZ | CHECK IF ANY BITS ARE SET |
| 02D3A | CA5A2D | | | |
| 02D3D | 2121F7 | LXI | H,FLT*TRL | GET ADDR OF 1st JAM FLAG |
| 02D40 | 0607 | MVI | B,7 | SCAN 7 BITS |
| 02D42 | 78 | WHILE: | VBYT,B,NZ | CHECK IF MORE BITS TO SCAN |
| 02D43 | FF00 | | | |
| 02D45 | CA5A2D | | | |
| 02D48 | 3A33FE | LDA | JSW*BITS | |
| 02D4B | OF | RRC | | GET BIT |
| 02D4C | 3233FE | STA | JSW*BITS | |
| 02D4F | D2552D | IF: | CC,C,S | TEST BIT |
| 02D52 | 3E80 | MVI | A,X'80' | LOAD MASK |
| 02D54 | 77 | MOV | M,A | SET FLAG |
| | | ENDIF | | |
| 02D55 | 05 | DCR | B | DECREMENT BIT COUNT |
| 02D56 | 23 | INX | H | INCREMENT ADDR |
| 02D57 | C3422D | ENDWHILE | | |
| | | ENDIF | | |
| 02D5A | C9 | RET | | |

TABLE VIII

| | | | | |
|---|---|---|---|---|
| | | TURN ON LAMPS ASSOCIATED WITH FAULT CODES / SUBR | | |
| 02C20 | E5 | FLT*LAMP PUSH | H | SAVE H AND L REGISTERS |
| 02C2A | 7A | IF: | XBYT,D,LE,10 | CHECK IF STATUS PANEL FLAG SET |
| 02C2B | FE0A | | | |
| 02C2D | DA332C | | | |
| 02C30 | C23D2C | | | |
| 02C33 | 3A7CF7 | ANDIF: | FLG,PROC*JAM,T | CHECK FOR PROCESSOR JAM |
| 02C36 | 07 | | | |
| 02C37 | D23D2C | | | |
| 02C3A | CD4E2C | CALL | FLT*SPNL | |
| | | ENDIF | | |
| 02C3D | 7A | IF: | XBYT,D,GE,22 | LOOK FOR CHECK DOORS FAULT |
| 02C3E | FE16 | | | |
| 02C40 | DA4C2C | | | |
| 02C43 | 2q3FFF | SOBIT | C$DOORS | TURN ON CHECK DOORS LAMP |
| 02C46 | 3E01 | | | |
| 02C48 | F3 | | | |
| 02C49 | B6 | | | |
| 02C4A | 77 | | | |
| 02C4B | FB | | | |
| | | ENDIF | | |

TABLE VIII-continued

| | | TURN ON LAMPS ASSOCIATED WITH FAULT CODES / SUBR | | |
|---|---|---|---|---|
| 02C4C | E1 | POP | H | GET H AND L REGISTERS |
| 02C4D | C9 | RET | | |

TABLE IX

| | | TURN ON STATUS PANEL LAMPS / SUBR | | |
|---|---|---|---|---|
| 01817 | 21BAFF | FLT*SPNL SOBIT | C$STATUS | CHECK STATUS PANEL |
| 0181A | 3E01 | | | |
| 0181C | F3 | | | |
| 0181D | B6 | | | |
| 0181E | 77 | | | |
| 0181F | FB | | | |
| 01820 | 210000 | SOBIT | FACE$JAM | FACE UP |
| 01823 | 3E00 | | | |
| 01825 | F3 | | | |
| 01826 | B6 | | | |
| 01827 | 77 | | | |
| 01828 | FB | | | |
| 01829 | 21B2FF | SOBIT | FUS$JAM | FUSER |
| 0182C | 3E20 | | | |
| 0123E | F3 | | | |
| 0182F | B6 | | | |
| 01830 | 77 | | | |
| 01831 | FB | | | |
| 01832 | 21F7FF | SOBIT | REG$JAM | REGISTRATION |
| 01835 | 3E20 | | | |
| 01837 | F3 | | | |
| 01838 | B6 | | | |
| 01839 | 77 | | | |
| 0183A | FB | | | |
| 0183B | 21B4FF | SOBIT | C$X$JAM | C TRANSPORT |
| 0183E | 3E20 | | | |
| 01840 | F3 | | | |
| 01841 | B6 | | | |
| 01842 | 77 | | | |
| 01843 | FB | | | |
| 01844 | 3A13F4 | IF: | FLG,2SD*FLAG,T | CHECK FOR 2 SIDED COPY |
| 01847 | 07 | | | |
| 01848 | D26718 | | | |
| 0184B | 21EBFF | SOBIT | INVT$JAM | INVERTER |
| 0184E | 3E20 | | | |
| 01850 | F3 | | | |
| 01851 | B6 | | | |
| 01852 | 77 | | | |
| 01853 | FB | | | |
| 01854 | 3A14F4 | IF: | FLG,SIDE*1,T | |
| 01857 | 07 | | | |
| 01858 | D26418 | | | |
| 0185B | 21BOFF | SOBIT | RETX$JAM | RETURN TRANSPORT |
| 0185E | 3E20 | | | |
| 01860 | F3 | SOBIT | F$X$JAM | B TRANSPORT |
| 01861 | B6 | | | |
| 01862 | 77 | | | |
| 01863 | FB | | | |
| | | ENDIF | | |
| 01864 | C37718 | ELSE: | | |
| 01867 | 3A15F4 | IF: | FLG,AX*FLAG,F | CHECK FOR AUX TRAY SELECT |
| 0186A | 07 | | | |
| 0185B | DA/718 | | | |
| 0186E | 21E8FF | SOBIT | B$X$JAM | B TRANSPORT |
| 01871 | 3E20 | | | |
| 01873 | F3 | | | |
| 01874 | B6 | | | |
| 01875 | 77 | | | |
| 01876 | FB | | | |
| | | ENDIF | | |
| | | ENDIF | | |
| 01877 | 3A2CF7 | IF: | FLG,SOS*JAM,T | CHECK FOR SOS JAM |
| 0187A | 07 | | | |
| 0187B | D28718 | | | |
| 0187E | 21F4FF | SOBIT | SOS$JAM | SOS |
| 01881 | 3E20 | | | |
| 01883 | F3 | | | |
| 01884 | B6 | | | |
| 01885 | 77 | | | |
| 01886 | FB | | | |
| | | ENDIF | | |
| 01887 | C9 | RET | | |

TABLE X

| | | HISTORY FILE | | |
|---|---|---|---|---|
| 00019 | 2110E2 | HIST*FLE LXI | H,NV*TAB1 | LOAD MEM POINTER WITH BEGINING PATH JAM COUNTERS |
| 0001C | 1121F7 | LXI | D,FLT*TAB1 | LOAD POINTER WITH BEGINING OF PAPER PATH FAULT TABLE |
| 0001F | 3F2A | MVI | A,FLT*TB1F | LOAD ACCUM WITH LSBYTE OF THE END OF THE PAPER PATH FAULT TABLE |
| 00021 | BB | WHILE: | XBYT,A,GE,E | LOOP UNTIL THROUGH FAULT TABLE |

TABLE X-continued

HISTORY FILE

| | | | | |
|---|---|---|---|---|
| 00022 | DA2D00 | | | |
| 00025 | CD0000 | CALL | HST*BNCT | CALL ROUTINE TO UPDATE A COUNTER NUMEM DEPENDING ON D7 BIT OF MEMORY |
| 00028 | 3E2A | MVI | A,FLT*B1F | PREPARE FOR END OF TABLE TEST |
| 0002A | C32100 | ENDWHILE | | |
| 0002D | 2124E2 | LXI | H,NV*TAB2 | LOAD POINTER WITH START OF RESET AND COUNT ERROR COUNTERS |
| 00030 | 114FF7 | LXI | D,FLT*TAB2 | LOAD POINTER WITH START OF RESET AND COUNT ERROR FAULT TABLE |
| 00033 | 3F52 | MVI | A,FLT*TB2F | LOAD ACCUM WITH END OF 2ND FAULT |
| 00035 | BB | WHILE: | XBUT,A,GE,F | LOOP UNTIL THROUGH 2ND FAULT TABLE |
| 00036 | DA4100 | | | |
| 00039 | CD0000 | CALL | HST*BCNT | |
| 0003C | 3E52 | MVI | A,FLT*TB2F | |
| 0003E | C33500 | ENDWHILE | | |
| 00041 | 2140E2 | LXI | H,NV*TAR4 | LOAD PNT WITH STRT OF FUSER UNDER TEMP AND CLEAN SOS COUNTERS |
| 00044 | 1148F7 | LXI | D,FLT*TAB4 | LOAD PNTR WITH STRT OF FUS UNDER TEMP AND CLN SOS FAULT TABLE |
| 00047 | 3F48 | MVI | A,FLT*TB4F | SET UP END OF FAULT TABLE |
| 00049 | BB | WHILE: | XBYT,A,GE,F | LOOP UNTIL THROUGH FAULT TABLE |
| 0004A | DA5500 | | | |
| 0004D | CD0000 | CALL | HST*BCNT | |
| 00050 | 3F48 | MVI | A,FLT*TB4F | |
| 00052 | C34900 | ENDWHILE | | |
| 00055 | 2142E2 | LXI | H,NV*TAB5 | START PRINTER AT BEG OF FEEDER |
| 00058 | 1158F6 | LXI | D,FLT*TAB5 | STRT PNTR AT BEG OF FEEDER FLT |
| 0005B | 3F5A | MVI | A,FLT*TB5F | SET UP END OF FEEDER FLT TABLE |
| 0005D | BR | WHILE: | XBYT,A,GE,F | LOOP UNTIL THROUGH FAULT TABLE |
| 0005E | DA6900 | | | |
| 00061 | CD0000 | CALL | HST*BCNT | |
| 00064 | 0F5A | MVI | A,FLT*185F | |
| 00064 | C35D00 | ENDWHILE | | |
| 00069 | 3A74F4 | IF: | FLG,SRT*SF1,T | COUNT SORTER JAMS IF SELECTED |
| 0006C | 07 | | | |
| 0006D | 07 | | | |
| 00070 | 115BF6 | LXI | D,FLT*TAB6 | SET PNT TO STRT OF SRT JAM FLAG |
| 00073 | 3F5C | MVI | A,FLT*TB6F | |
| 00075 | BB | WHILE: | XBYT,A,GE,F | |
| 00076 | DA8100 | | | |
| 00079 | CD0000 | CALL | HST*BCNT | |
| 0007C | 3F5C | MVI | A,FLT*TB6F | |
| 0007E | C37500 | ENDWHILE | | |
| | | ENDIF | | |
| 00081 | AF | XRA | A | CLEAR ACCUM FOR ZERO TEST |
| 00082 | 2AB3F8 | 1HLD | SDFL*HST | FETCH BCD CNT OF SHEETS DELIVERED |
| 00085 | B5 | ORA | 1 | |
| 00086 | B4 | ORA | H | DO NOT UPDATE NVCOUNTER OF NO. SHEETS DELIVERED TO SRT DURING LAST JOB |
| 00087 | CA9300 | IF: | CC,Z,C | |
| 0008A | 114CE2 | LXI | D,NV*CNT1 | SET POINTER TO SORTER NV COUNTER |
| 0008D | CD0901 | CALL | HST*DCNT | CALL ROUTINE TO UPDATE 6 DIGIT |
| 00090 | 22B3F8 | SHLD | SDFL*HST | CLEAR BCD CNT OF SHEETS DELIVERED |
| | | ENDIF | | |
| 00093 | 2Ab5F8 | LHLD | FDFL*HST | BCD COUNT OF SHEETS DEL TO FACE UP TRAY |
| 00096 | B5 | ORA | L | |
| 00097 | B4 | ORA | H | |
| 00098 | CAA400 | IF: | CC,Z,C | CHECK FOR ZERO COUNT IN LAST JOB |
| 0009B | 1152E2 | LXI | D,NV*CNT2 | SET POINTER TO FACEUP NV COUNTER |
| 0009E | CD0901 | CALL | HST*DCNT | UPDATE NVCOUNTER WITH CURRENT COUNT |
| 000A1 | 22B5F8 | SHLD | FDEL*HST | CLEAR FACEUP COUNT FROM LAST JOB |
| | | ENDIF | | |
| 000A4 | 2AB7F8 | LHLD | ADFL*HST | BCD COUNT OF AUX TRAY DELIVERED |
| 000A7 | B4 | ORA | H | |
| 000A8 | B5 | ORA | L | |
| 000A9 | CAB500 | IF: | CC,Z,C | SKIP UPDATE IF COUNT IS ZERO |
| 000AC | 1158E2 | LXI | D,NV*CNT3 | SET POINTER TO AUX TRAY NV COUNTER |
| 000AF | CD0901 | CALL | HST*DCNT | UPDATE NV COUNTER WITH CURRENT COUNT |
| 000B2 | 22B7F8 | SHLD | ADEL*HST | CLEAR CURRENT AUX TRAY COUNT |
| | | ENDIF | | |
| 000B5 | 2A89F8 | LHLD | TFLH*HST | BCD COUNT OF TOTAL FLASHES |
| 000B8 | B4 | ORA | H | |
| 000B9 | B5 | ORA | L | |
| 000BA | CACF00 | IF: | CC,Z,C | |
| 000BD | 115EE2 | LXI | D,NV*CNT4 | NVCOUNTER OF TOTAL FLASHES |
| 000CO | CD0901 | CALL | HST*DCNT | |
| 000C3 | 2AB9F8 | LHLD | TFLH*HST | |
| 000C6 | 1170E2 | LXI | D,NV*CNTF | NVCOUNTER OF TOTAL FLASHES ON D |
| 000C9 | CD0901 | CALL | HST*DCNT | |
| 000CC | 22B9F8 | SHLD | TFLH*HST | |
| | | ENDIF | | |
| 000CF | 2ABBF8 | LHLD | 2FLH*HST | BCD CNTR OF TOTAL SIDE 2 FLSH |
| 000D2 | B4 | ORA | H | |
| 000D3 | B5 | ORA | L | |
| 000D4 | CAE000 | IF: | CC,Z,C | UPDATE NVCNTR IF CURRENT CNT NO |
| 000D7 | 1164E2 | LXI | D,NV*CNT5 | |
| 000DA | CD0901 | CALL | HST*DCNT | |
| 000DD | 22BBF8 | SHLD | 2FLH*HST | |
| | | ENDIF | | |
| 000E0 | C9 | RET | | |

TABLE XI

HISTORY - B COUNTER ROUTINE

| | | | | |
|---|---|---|---|---|
| 00000 | 1A | HST*BCNT I DAX | D | FETCH FLAG TO ACCUM |
| 00001 | 07 | RLC | | SET/CLEAR CARRY BIT |
| 00002 | 7E | MOV | A,M | FETCH LSNIBBLE OF COUNTER |
| 00003 | CF00 | ACI | O | UPDATE WITH CARRY |
| 00005 | 77 | MOV | M,A | STORE UPDATED NIBBLE |
| 00006 | BE | CMP | M | CHECK FOR OVERFLOW |
| 00007 | 23 | INX | H | MOVE POINTER TO MSNIBBLE |
| 00008 | CA1600 | IF: | CC,Z,C | IF OVERFLOW OUT OF LSNIBBLE |
| 0000B | 34 | INR | M | INCREMENT MSNIBBLE |
| 0000C | AF | XRA | A | |
| 0000D | BF | CMP | M | TEST MSNIBBLE FOR ZERO |
| 0000E | C21600 | IF: | CC,Z,C | IF ZERO THE COUNTER OVERFLOWED |
| 00011 | 2F | CMA | | |
| 00012 | 77 | MOV | M,A | LOAD MSNIBBLE WITH 'F' |
| 00013 | 2B | DCX | H | |
| 00014 | 77 | MOV | M,A | LOAD LSNIBBLE WITH 'F' |
| 00015 | 23 | INX | H | RESTORE NV POINTER |
| | | ENDIF | | |
| | | ENDIF | | |
| 00016 | 23 | INV | H | MOV POINTER TO LSNIBBLE OF NEXT FLAG |
| 00017 | 13 | INX | D | MOV POINTER TO NEXT FLAG |
| 00018 | C9 | RET | | |

TABLE XII

HISTORY - D COUNTER ROUTINE

| | | | | |
|---|---|---|---|---|
| 00109 | EB | HST*DCNT XCHG | | SWAP CURRENT CNT AND POINTER TO |
| 0010A | 7B | MOV | A,F | LOAD UNIT/TENS DIGITS OF CURRENT |
| 0010B | 86 | ADD | M | |
| 0010C | 27 | DAA | | |
| 0010D | 77 | MOV | M,A | UPDATE UNITS DIGITS(LSNIB) OF NV |
| 0010E | D21201 | IF: | CC,C,S | CHECK FOR OVERFLOW |
| 00111 | 14 | INR | D | INC HUND/THOU DIGIT IF OVERFLOW |
| | | ENDIF | | |
| 00112 | AF | XRA | M | MASK OF UPDATED CURRENT TENS DIGIT |
| 00113 | CD4101 | CALL | HST*DCTS | UPDATE TENS DIGIT AND SET OVERFLOW |
| 00116 | CA1A01 | IF: | CC,Z,C | |
| 00119 | 37 | STC | | INDICATE OVERFLOW BY SETTING CA |
| | | ENDIF | | |
| 0011A | 7A | MOV | A,D | FETCH CURRENT HUND/THOU DIGIT |
| 0011B | 23 | INX | H | MOVE POINTER TO HUNDREDS NIBBLE |
| 0011C | 8E | ADC | M | UPDATE WITH CURRENT + OVERFLOW |
| 0011D | 27 | DAA | | |
| 0011E | 77 | MOV | M,A | STORE UPDATE |
| 0011F | D22401 | IF: | CC,C,S | CHECK FOR OVERFLOW |
| 00122 | EF01 | XRI | 1 | COMPLEMENT DO BIT TO SET OVERFLOW |
| | | ENDIF | | |
| 00124 | AF | XRA | M | MASKOFF 1000'S NIB/SET OVERFLOW |
| 00125 | CD4101 | CALL | HST*DCTS | UPDATE THOU DIGIT AND SET OVERFLOW |
| 00128 | CD4101 | CALL | HST*DCTS | UPDATE 10K DIGIT WITH OVERFLOW |
| 0012B | CD4101 | CALL | HST*DCTS | UPDATE 100 K DIGIT WITH OVERFLOW |
| 0012E | CA3E01 | IF: | CC,Z,C | CHECK FOR OVERFLOW FROM 100K DIGIT |
| 00131 | 2F | CMA | | |
| 00132 | 77 | MOV | M,A | LOAD 100K DIGIT WITH 'F' |
| 00133 | 2B | DCX | H | |
| 00134 | 77 | MOV | M,A | LOAD 10K DIGIT WITH 'F' |
| 00135 | 2B | DCX | H | |
| 00136 | 77 | MOV | M,A | LOAD 1K DIGIT WITH 'F' |
| 00137 | 2B | DCX | H | |
| 00138 | 77 | MOV | M,A | LOAD 100 DIGIT WITH 'F' |
| 00139 | 2B | DCX | H | |
| 0013A | 77 | MOV | M,A | LOAD 10 DIGIT WITH 'F' |
| 0013B | 2B | DCX | H | |
| 0013C | 77 | MOV | M,A | LOAD UNIT DIGIT WITH 'F' |
| 0013D | AF | XRA | A | CLEAR ACCUM TO CLEAR REG PAIR |
| | | ENDIF | | |
| 0013E | 67 | MOV | H,A | SET UP REGISTER PAIR TO CLEAR C |
| 0013F | 7F | MOV | L,A | |
| 00140 | C9 | RET | | |

Referring particularly to the timing chart shown in FIG. 41, an exemplary copy run wherein three copies of each of two simplex or one-sided originals in duplex mode is made. Referring to FIG. 32, the appropriate button of copy selector 808 is set for the number of copies desired, i.e. 3 and document handler button 822, sorter select button 825 and two sided (duplex) button 811 depressed. The originals, in this case, two simplex or one-sided originals are loaded into tray 233 of document handler 16 (FIG. 14) and the Print button 805 depressed. On depression of button 805, the host machine 10 enters the PRINT state and the Run Event Table for the exemplary copy run programmed is built by controller 18 and stored in RAM section 546. As described, the Run Event Table together with Background routines serve, via the multiple interrupt system and output refresh (through D.M.A.) to operate the various components of host machine 10 in integrated timed relationship to produce the copies programmed.

During the run, the first original is advanced onto platen 35 by document handler 16 where, as seen in FIG. 41, three exposures (1ST FLASH SIDE 1) are made producing three latent electrostatic images on belt 20 in succession. As described earlier, the images are developed at developing station 28 and transferred to individual copy sheets fed forward (1ST FEED SIDE 1) from main paper tray 100. The sheets bearing the images are carried from the transfer roll/belt nip by vacuum transport 155 to fuser 150 where the images are fixed. Following fusing, the copy sheets are routed by deflector 184 to return transport 182 and carried to auxiliary tray 102. The image bearing sheets entering tray 102 are aligned by edge patter 187 in preparation for refeeding thereof.

Following delivery of the last copy sheet to auxiliary tray 102, the document handler 16 is activated to remove the first original from platen 35 and bring the second original into registered position on platen 35. The second original is exposed three times (FLASH SIDE 2), the resulting images being developed on belt 20 at developing station 28 and transferred to the opposite or second side of the previously processed copy sheets which are now advanced (FEED SIDE 2) in timed relationship from auxiliary tray 102. Following transfer, the side two images are fused by fuser 150 and routed, by gate 184 toward stop 190, the latter being raised for this purpose. Abutment of the leading edge of the copy sheet with stop 190 causes the sheet trailing edge to be guided into discharge chute 186, effectively inverting the sheet know bearing images on both sides. The inverted sheet is fed onto transport 181 and into sorter 14 where the sheets are placed in successive ones of the first three trays 212 of either the upper of lower arrays 210, 211 respectively depending on the disposition of deflector 220.

Other copy run programs, both simplex and duplex with and without sorter 14 and document handler 16 may be envisioned.

While the invention has been described with reference to the structure disclosed, it is not confined to the details set forth, but is intended to cover such modifications or changes as may come within the scope of the following claims.

What is claimed is:

1. In a reproduction machine for producing copies, the combination of:

control means for operating said machine to produce copies, said control means including a memory section; means for monitoring operation of said machine, said monitoring means generating a fault signal on the occurrence of a predetermined machine fault; and fault storing means for storing in said control means memory section each occurrence of said fault signal whereby to provide a record of the number of times said fault occurs.

2. The machine according to claim 1 in which said monitoring means includes plural fault monitors for monitoring operation of said machine, said fault monitors generating individual fault signals on the occurrence of the fault monitored;

said fault storing means storing each occurrence of said fault signals in said control means memory section, said fault storing means including means for identifying said fault signals.

3. The machine according to claim 2 in which said control means memory section includes non-volatile memory means, said fault storing means storing said fault signals in said non-volatile memory means whereby to provide a permanent record of the number and type of machine faults.

4. The machine according to claim 1 in which said control means includes means responsive to said fault signal for interrupting operation of said machine.

* * * * *